United States Patent [19]

Mizuta et al.

[11] Patent Number: 5,280,574
[45] Date of Patent: Jan. 18, 1994

[54] TEXT DOCUMENT MANAGEMENT METHOD ADAPTED FOR GENERATING PLURAL TEXT DOCUMENTS DERIVED FROM THE SAME ORIGINAL TEXT DOCUMENT

[75] Inventors: Yoko Mizuta, Suginami; Keiji Kojima, Kodaira, both of Japan

[73] Assignee: Hitachi, Ltd., Tokyo, Japan

[21] Appl. No.: 526,573

[22] Filed: May 21, 1990

[30] Foreign Application Priority Data

May 26, 1989 [JP] Japan .................................. 1-131347

[51] Int. Cl.⁵ .......................................... G06F 15/62
[52] U.S. Cl. .................................... 395/146; 395/145
[58] Field of Search .............................. 395/145-149

[56] References Cited

U.S. PATENT DOCUMENTS 4,748,678  5/1988  Takeda et al. .................. 395/145 X
5,025,396  6/1991  Parks et al. ..................... 395/148 X

FOREIGN PATENT DOCUMENTS 59-178567  4/1984  Japan .......................... G06F 15/20

OTHER PUBLICATIONS

Showman, Peter S. "An Object-Based User Interface for the HP NewWave Environment," Hewlett-Packard Journal, Aug. 1989, pp. 9-17.

Primary Examiner—Heather R. Herndon
Assistant Examiner—Almis Jankus
Attorney, Agent, or Firm—Fay, Sharpe, Beall, Fagan, Minnich & McKee

[57] ABSTRACT

A text documents managing method comprising the steps of subjecting an original document registered beforehand to a first arrangement designated by a user, thereby to generate a first derived document. The first arrangement is registered as a set of derived document information items on the original document. The above steps are repeated in relation to a second arrangement designated for generating a second derived document by the user. The user selects one of the plurality of sets of derived document information items which have been registered in relation to the original document. The original document is subjected again to the arrangement expressed by the selected set of derived document information items, thereby to reproduce the corresponding derived document.

14 Claims, 89 Drawing Sheets

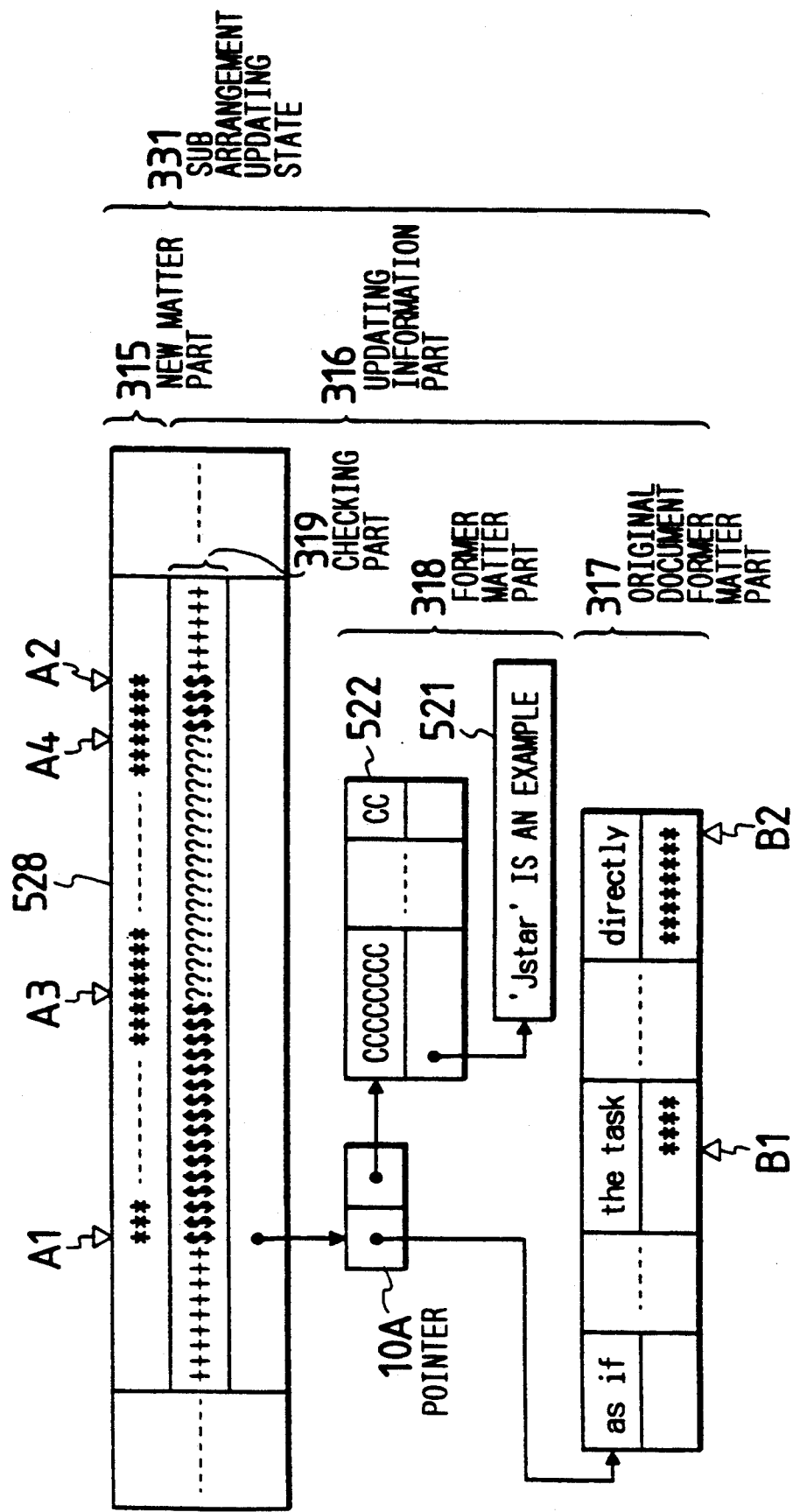

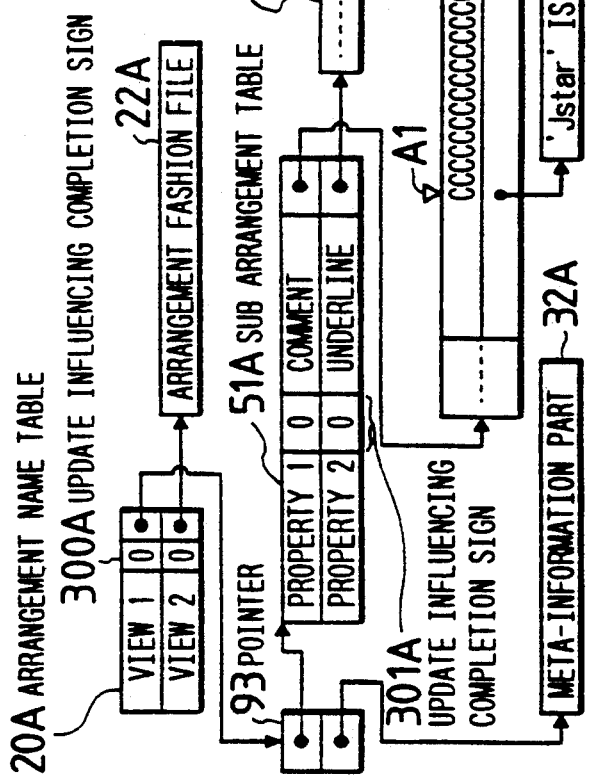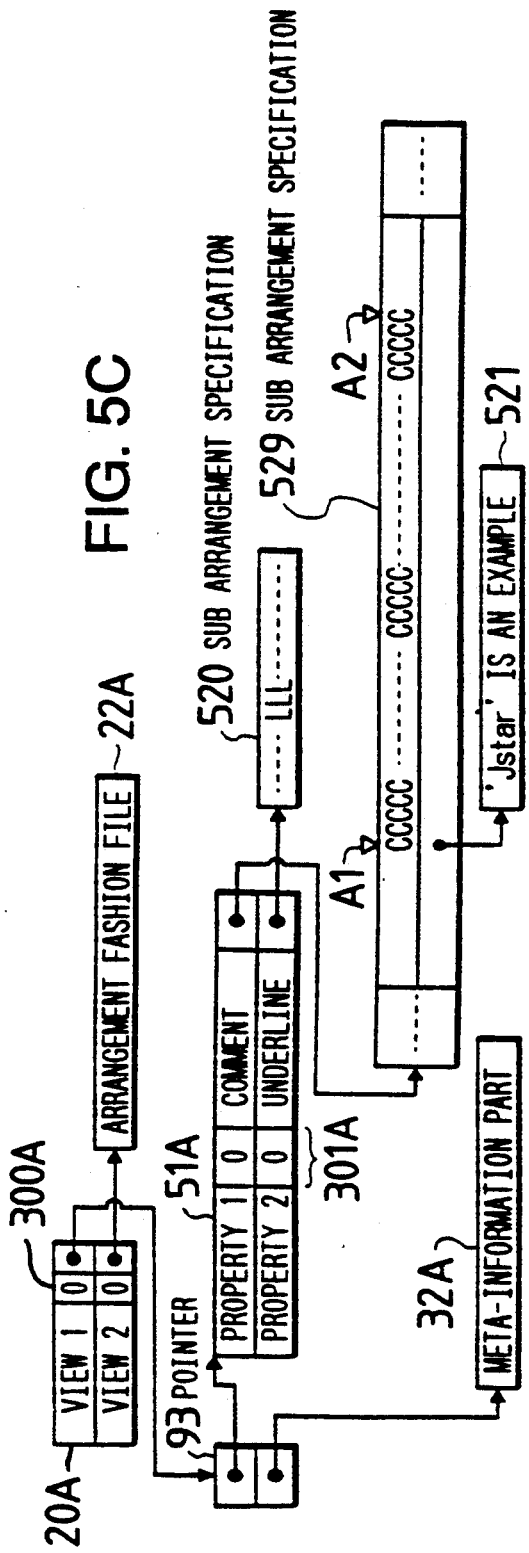

FIG. 5B

- 22A ARRANGEMENT FASHION FILE
- 520 SUB ARRANGEMENT SPECIFICATION: LLL
- 301A PROPERTY 1, PROPERTY 2 / COMMENT, UNDERLINE
- 51A
- 32A META-INFORMATION PART
- 20A VIEW 1, VIEW 2
- 300A
- 93 POINTER
- 528
- A1, A2, A3, A4
- 522 CCCCCCC / CC
- 521 'Jstar' IS AN EXAMPLE
- 10A POINTER
- 315 NEW MATTER PART
- 316 UPDATING INFORMATION PART
- 319 CHECKING PART
- 318 FORMER MATTER PART
- 317 ORIGINAL DOCUMENT FORMER MATTER PART
- 331 SUB ARRANGEMENT UPDATING STATE
- B1 as if … the task ***
- B2 … directly *******

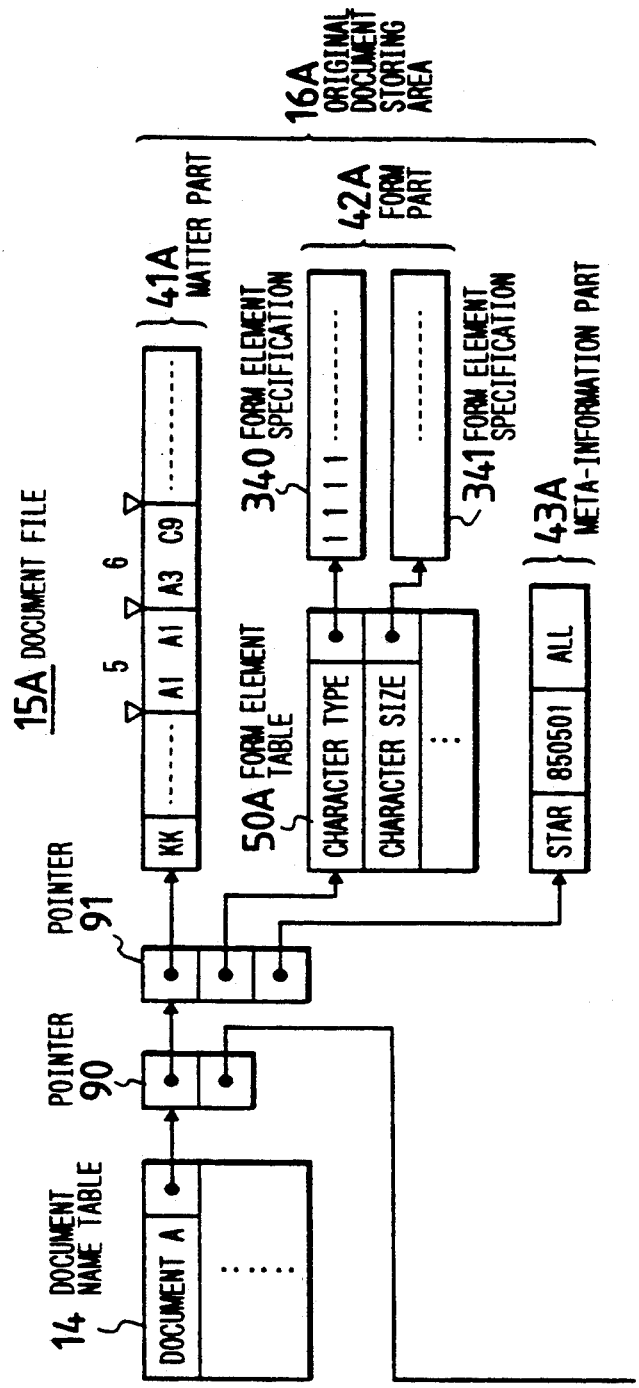
FIG. 9A1

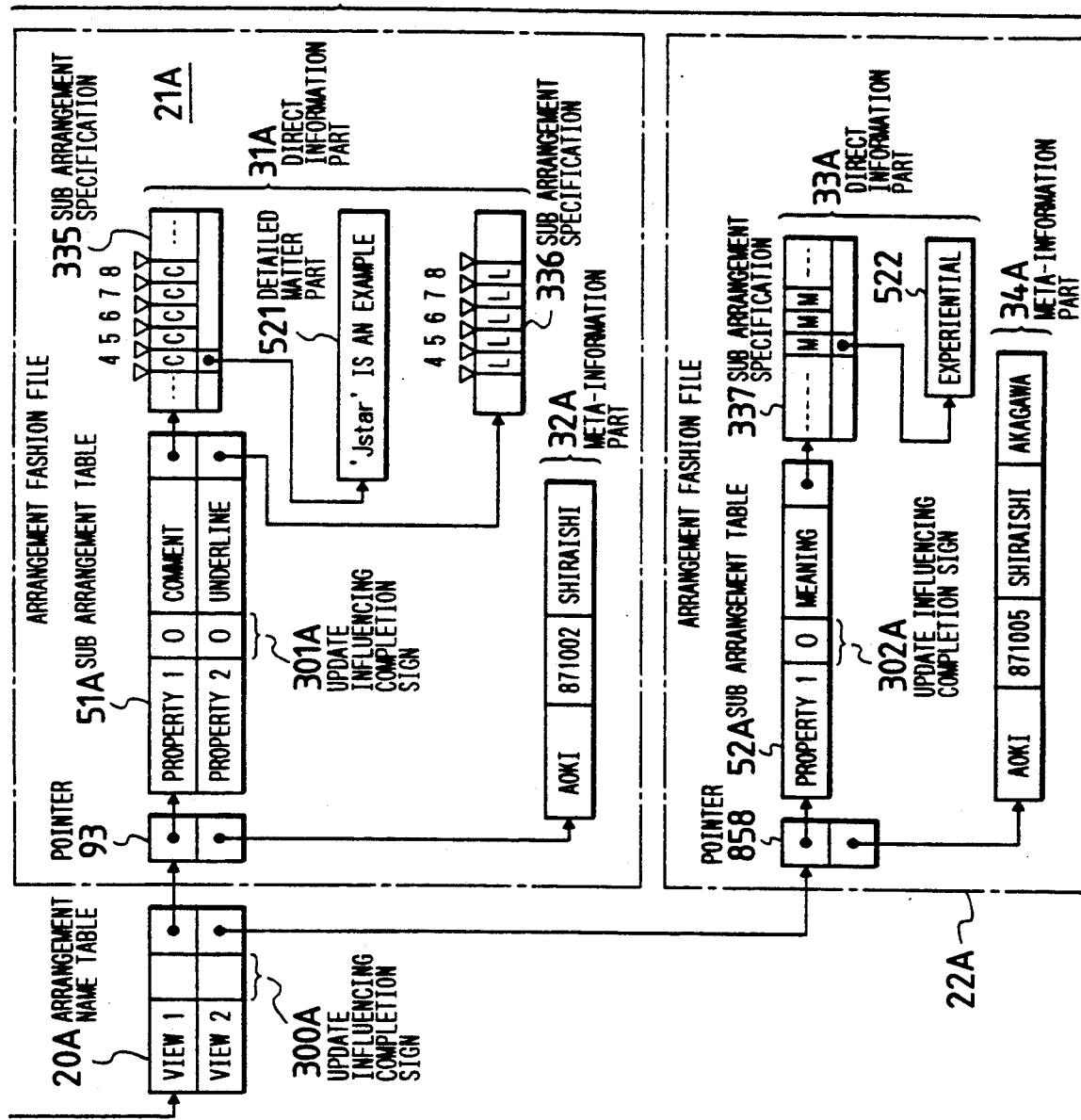
FIG. 9A2

FIG. 10

12 KNOWLEDGE BASE

| 101 SUB ARRANGEMENT KIND PART | 102 SUB ARRANGEMENT UPDATING PATTERN PART | 103 SUB ARRANGEMENT UPDATED PATTERN PART | |
|---|---|---|---|
| UNDERLINE | L | L | |
| UNDERLINE | L * L | L L L | ~104 |
| UNDERLINE | L * | ? | |
| UNDERLINE | * L | ? | |
| COMMENT | C | C | ~105 |
| COMMENT | C * C | ? | ~106 |
| COMMENT | C * | ? | |
| COMMENT | * C | ? | |
| ANOTHER DOCUMENT | R | R | |
| ANOTHER DOCUMENT | R * R | ? | |
| ANOTHER DOCUMENT | R * | ? | |
| ANOTHER DOCUMENT | * R | ? | |
| ⋮ | ⋮ | ⋮ | |

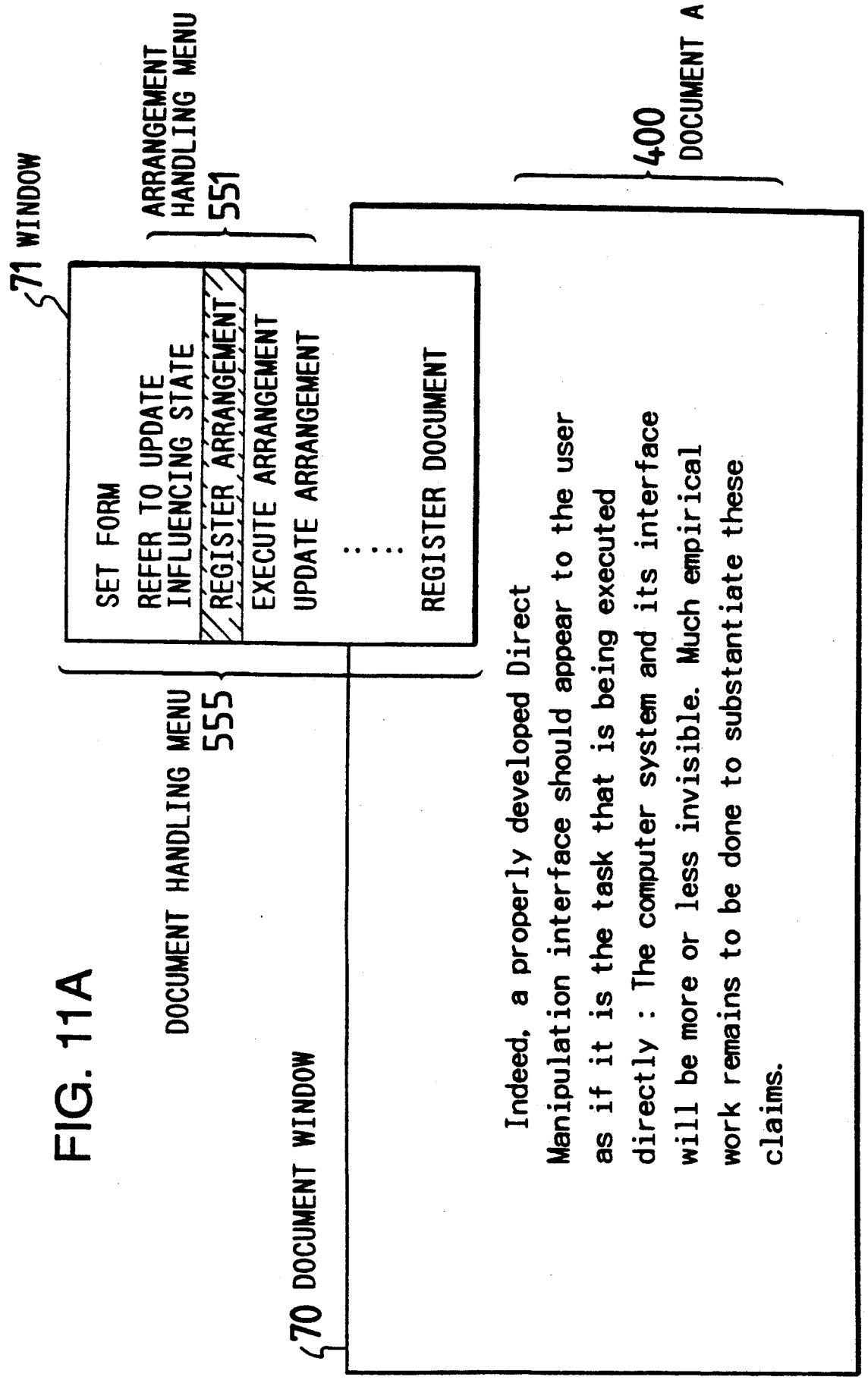

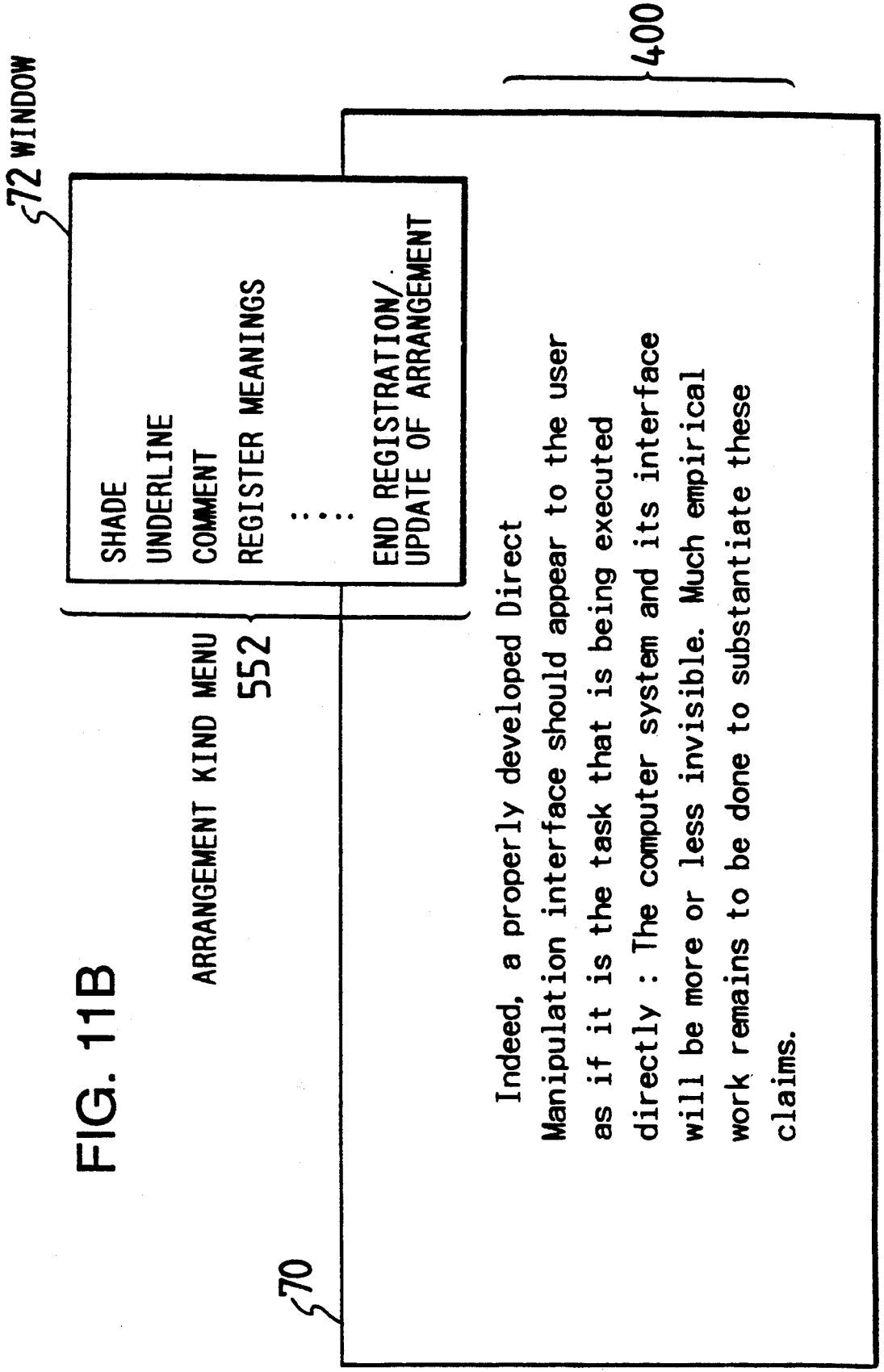

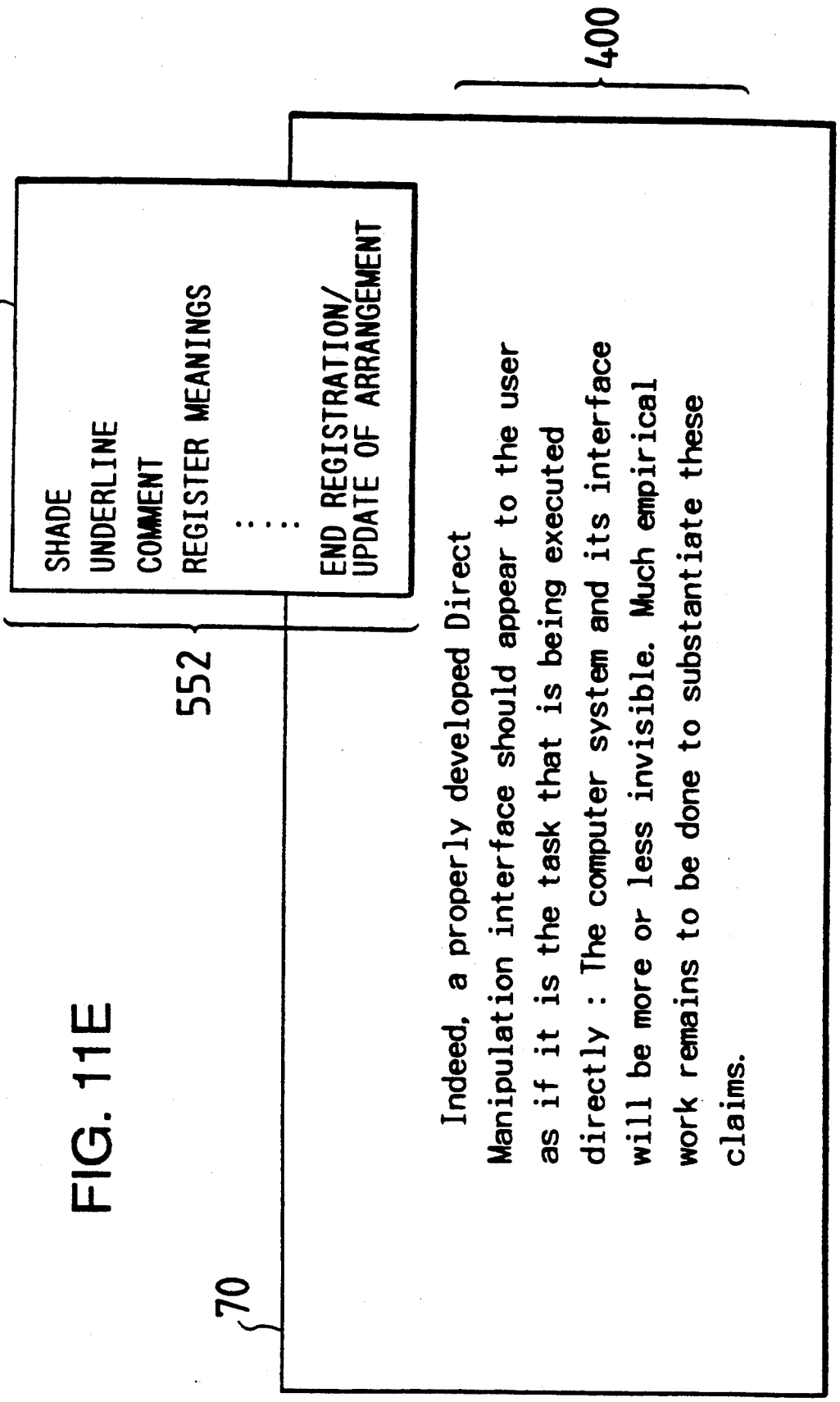

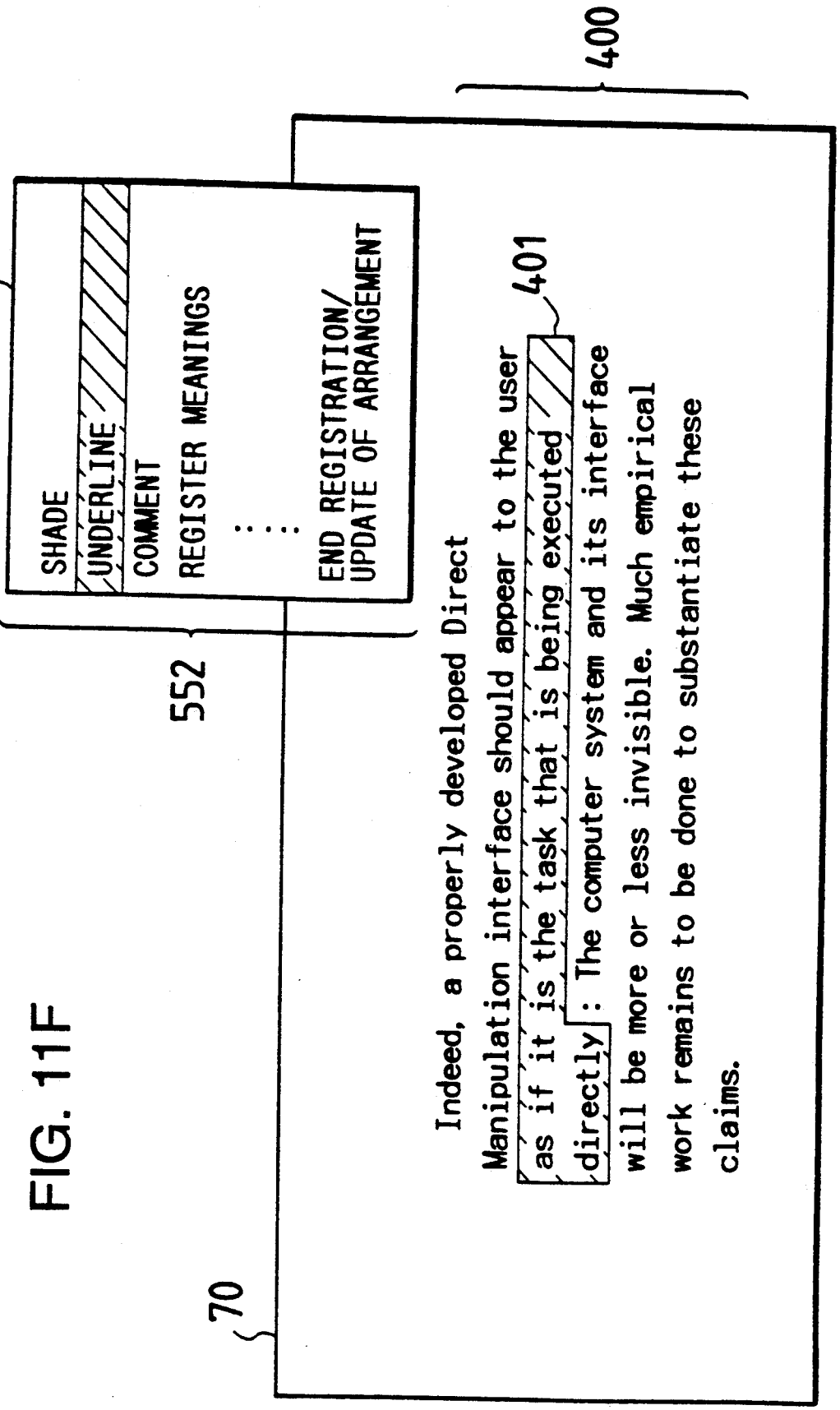

FIG. 11H

Indeed, a properly developed Direct
Manipulation interface should appear to the user
as if it is the task that is being executed
directly : The computer system and its interface
will be more or less invisible. Much empirical
work remains to be done to substantiate these
claims.

70

400

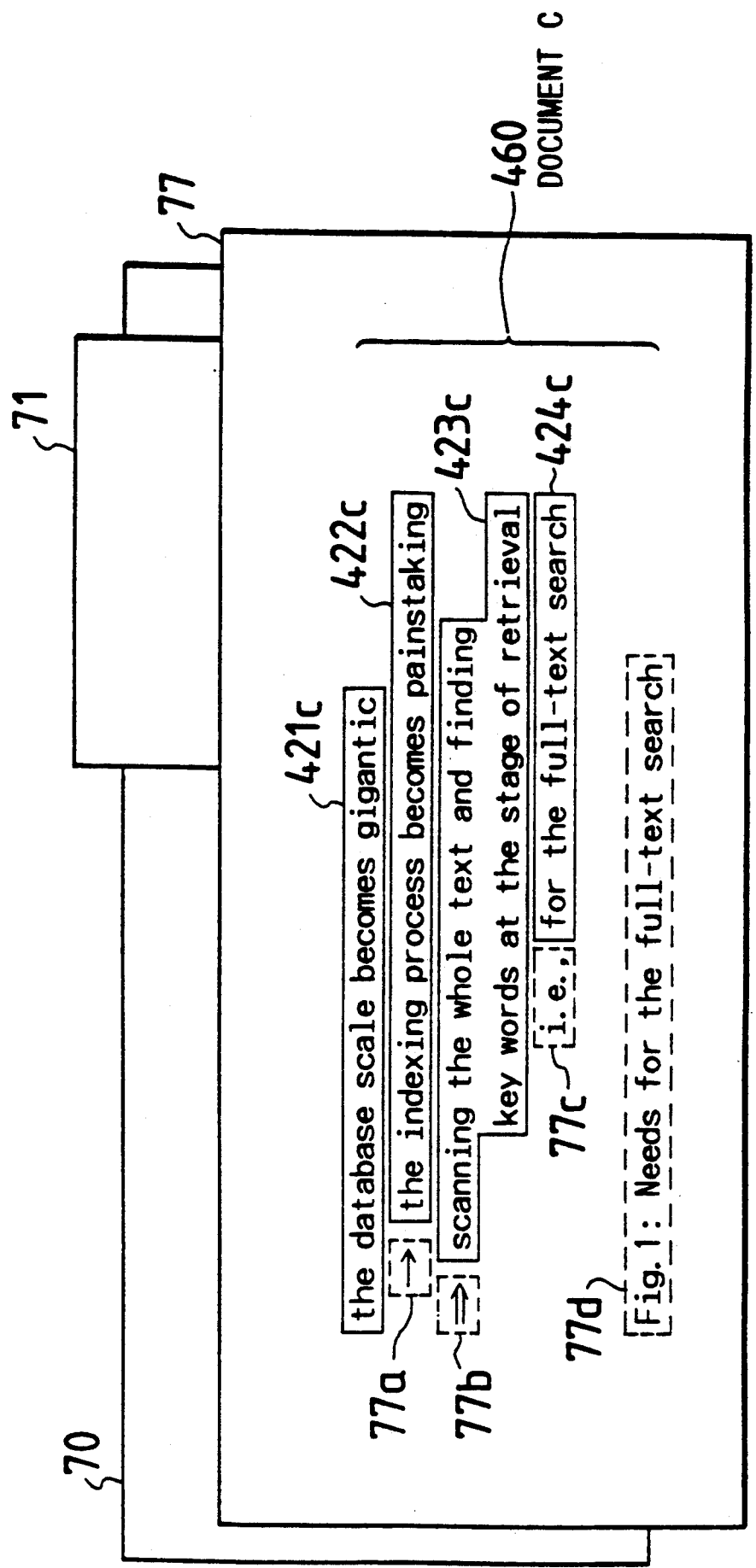

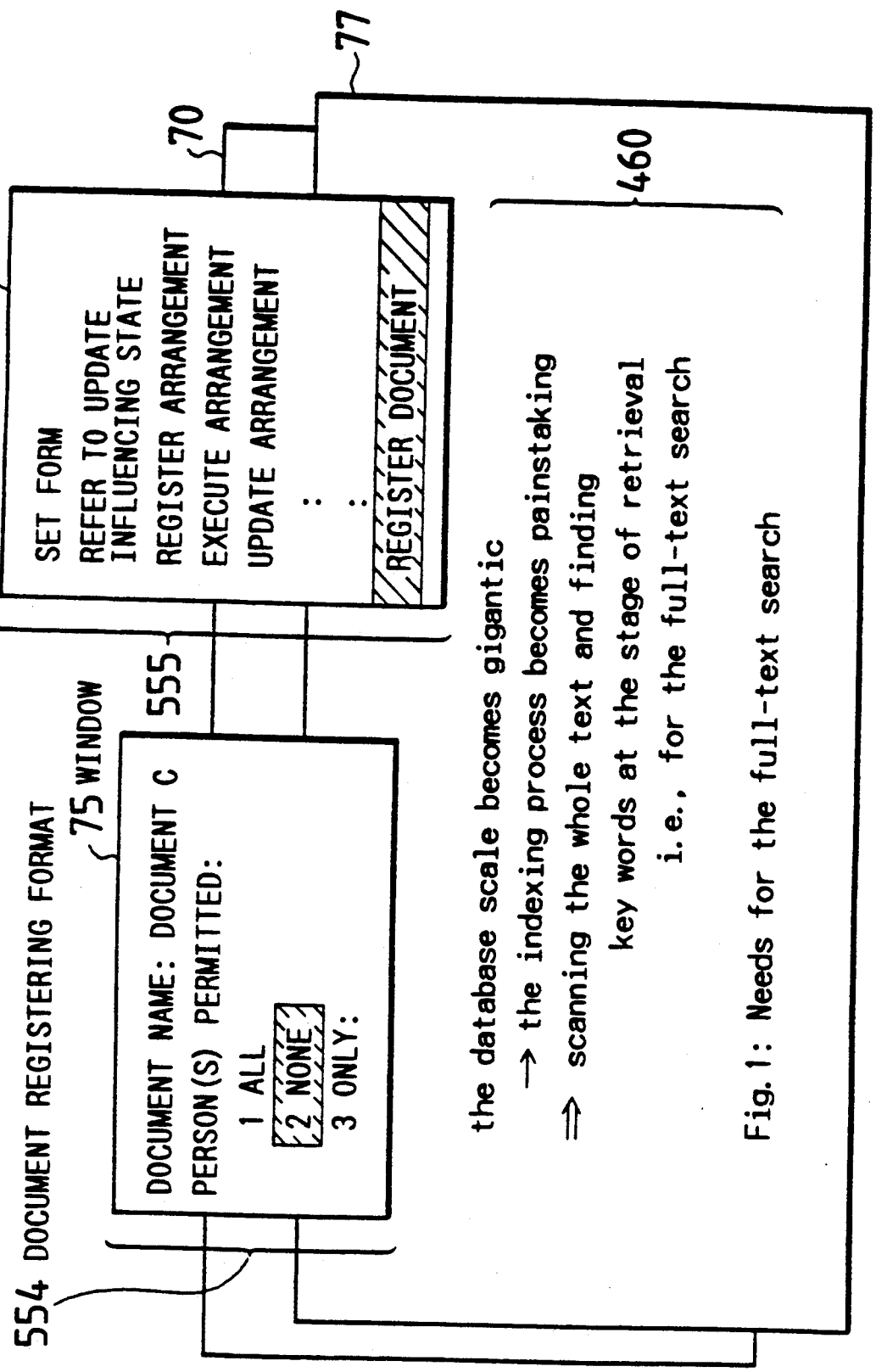

FIG. 13C

ARRANGEMENTS OF DOCUMENT A — 78

| ARRANGEMENT NAME | GENERATOR | DATE OF GENERATION | [COLLECTIVE] [DECOMPOSED] KIND |
|---|---|---|---|
| VIEW 1 | AOKI | 871002 | COMMENTS, UNDERLINES |
| VIEW 2 | AOKI | 871005 | MEANINGS OF WORDS |

— 70

400

Indeed, a properly developed Direct Manipulation interface should appear to the user as if it is the task that is being executed — 401 directly: The computer system and its interface will be more or less invisible. Much empirical work remains to be done to substantiate these claims.

ARRANGEMENTS OF DOCUMENT A — 78

| ARRANGEMENT NAME | GENERATOR | DATE OF GENERATION | KIND | COLLECTIVE / DECOMPOSED |
|---|---|---|---|---|
| VIEW 1 | AOKI | 871002 | COMMENTS, UNDERLINES | |
| VIEW 2 | AOKI | 871005 | MEANINGS OF WORDS | |

—70

400 {

Indeed, a properly developed Direct
Manipulation interface should appear to the user —401
**1 as if it is the task that is being executed
directly: The computer system and its interface
will be more or less invisible. Much empirical
work remains to be done to substantiate these
claims.

404 {

COMMENTS:
**1 'Jstar' IS AN EXAMPLE.

—80 WINDOW

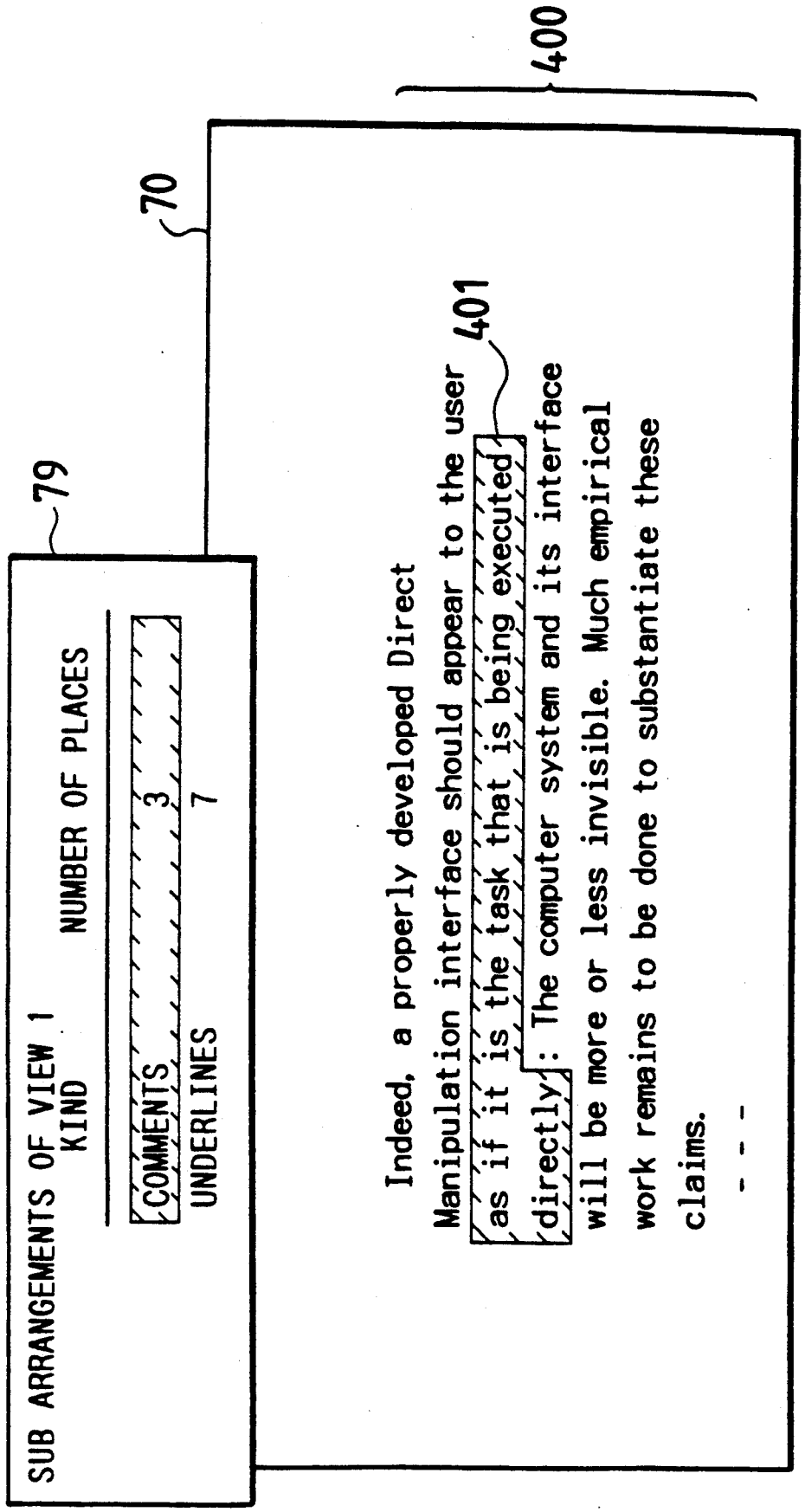

FIG. 131

| SUB ARRANGEMENTS OF DOCUMENT A | | |
|---|---|---|
| ARRANGEMENT NAME | KIND | NUMBER OF PLACES |
| VIEW 1 | COMMENTS | 3 |
| | UNDERLINES | 7 |
| VIEW 2 | MEANINGS | 20 |

Indeed, a properly developed Direct Manipulation interface should appear to the user as if it is the task that is being executed directly : The computer system and its interface will be more or less invisible. Much empirical work remains to be done to substantiate these claims.

SUB ARRANGEMENTS OF DOCUMENT A

| ARRANGEMENT NAME | KIND | NUMBER OF PLACES |
|---|---|---|
| VIEW 1 | COMMENTS | 3 |
| | UNDERLINES | 7 |
| VIEW 2 | MEANINGS | 20 |

Indeed, a properly developed Direct Manipulation interface should appear to the user **1 as if it is the task that is being executed directly: The computer system and its interface will be more or less invisible. Much empirical *1 work remains to be done to substantiate these *2 claims.

COMMENTS:
**1 'Jstar' IS AN EXAMPLE.

MEANINGS
*1 EXPERIENTIAL
*2 MAKE SUBSTANTIAL

81 WINDOW

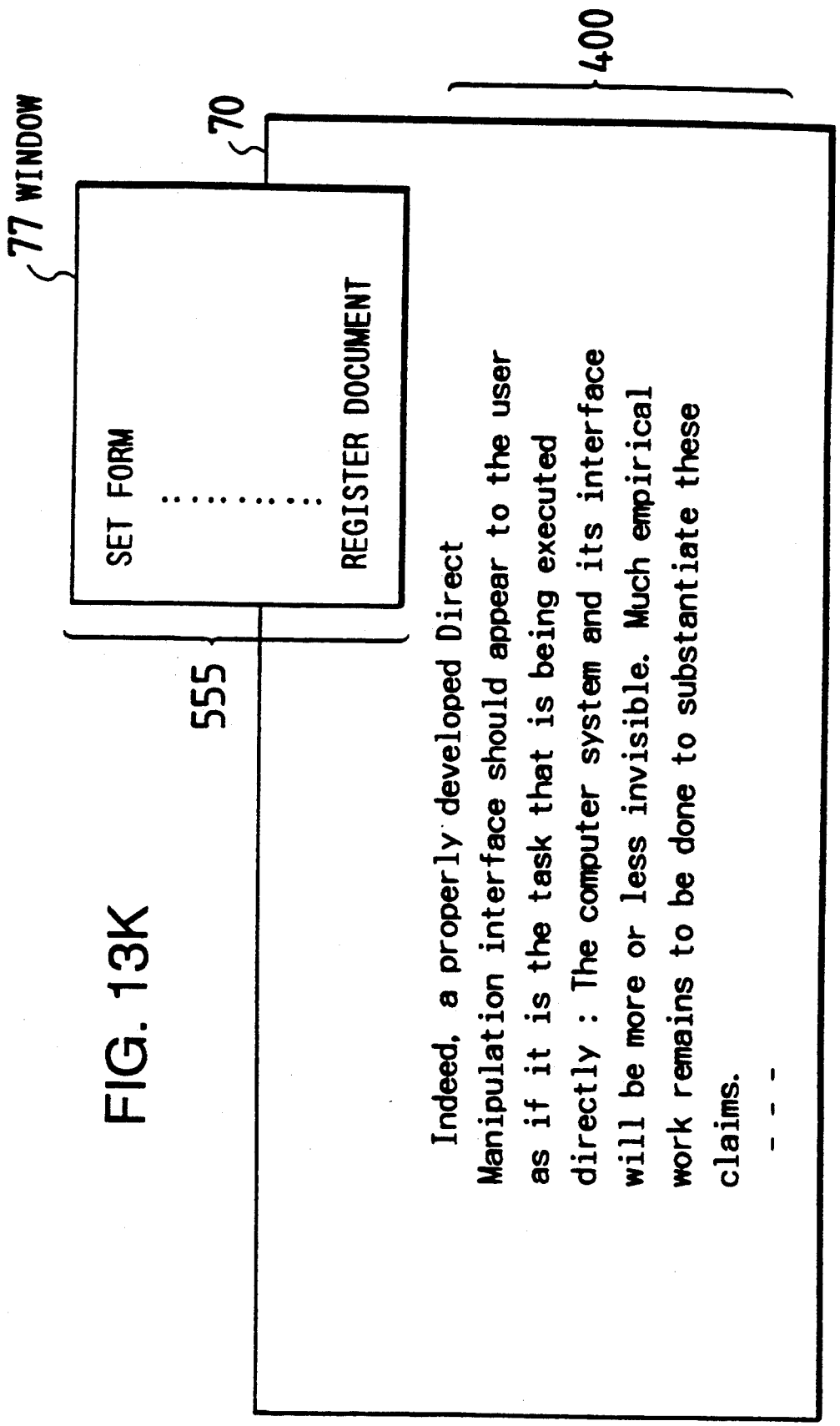

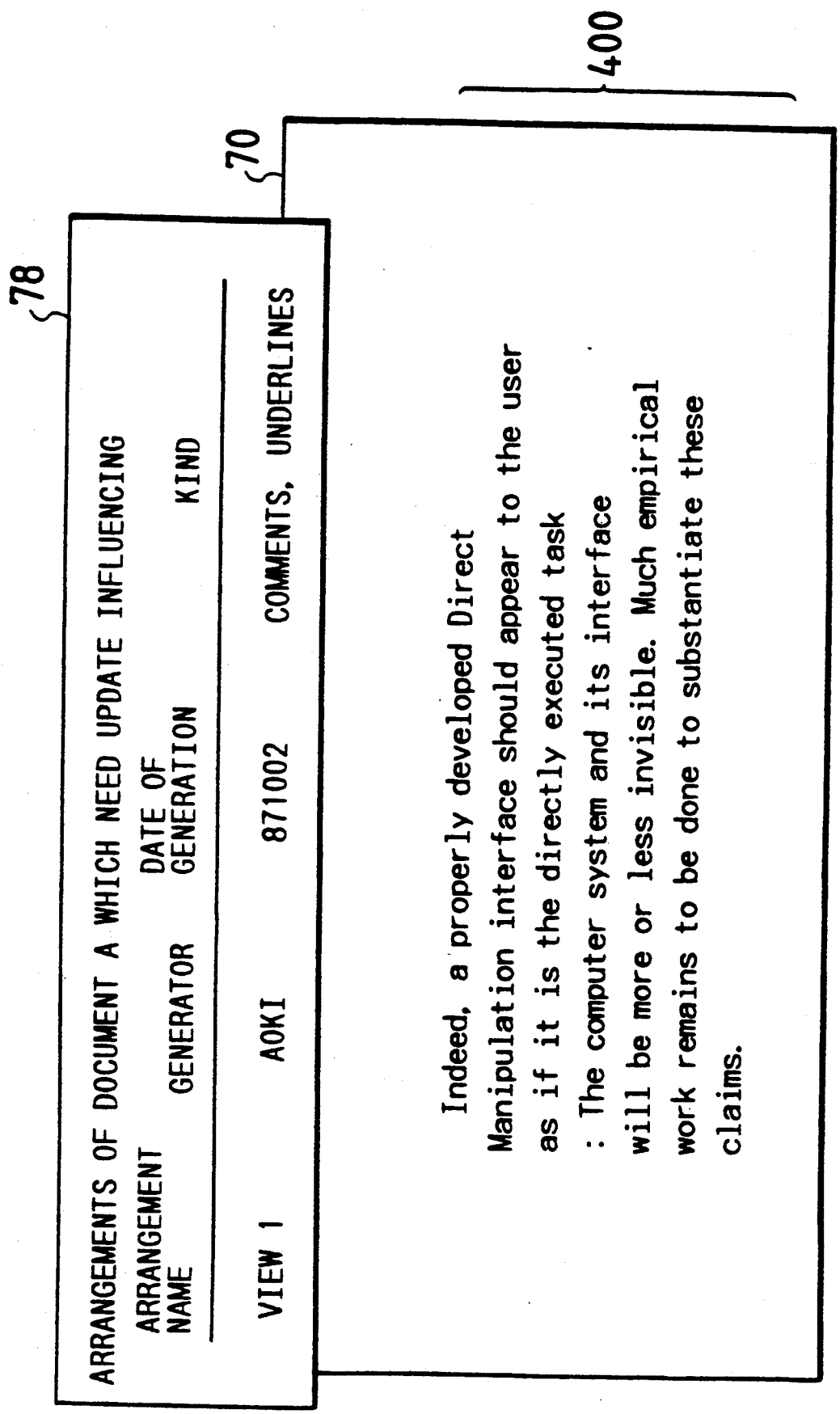

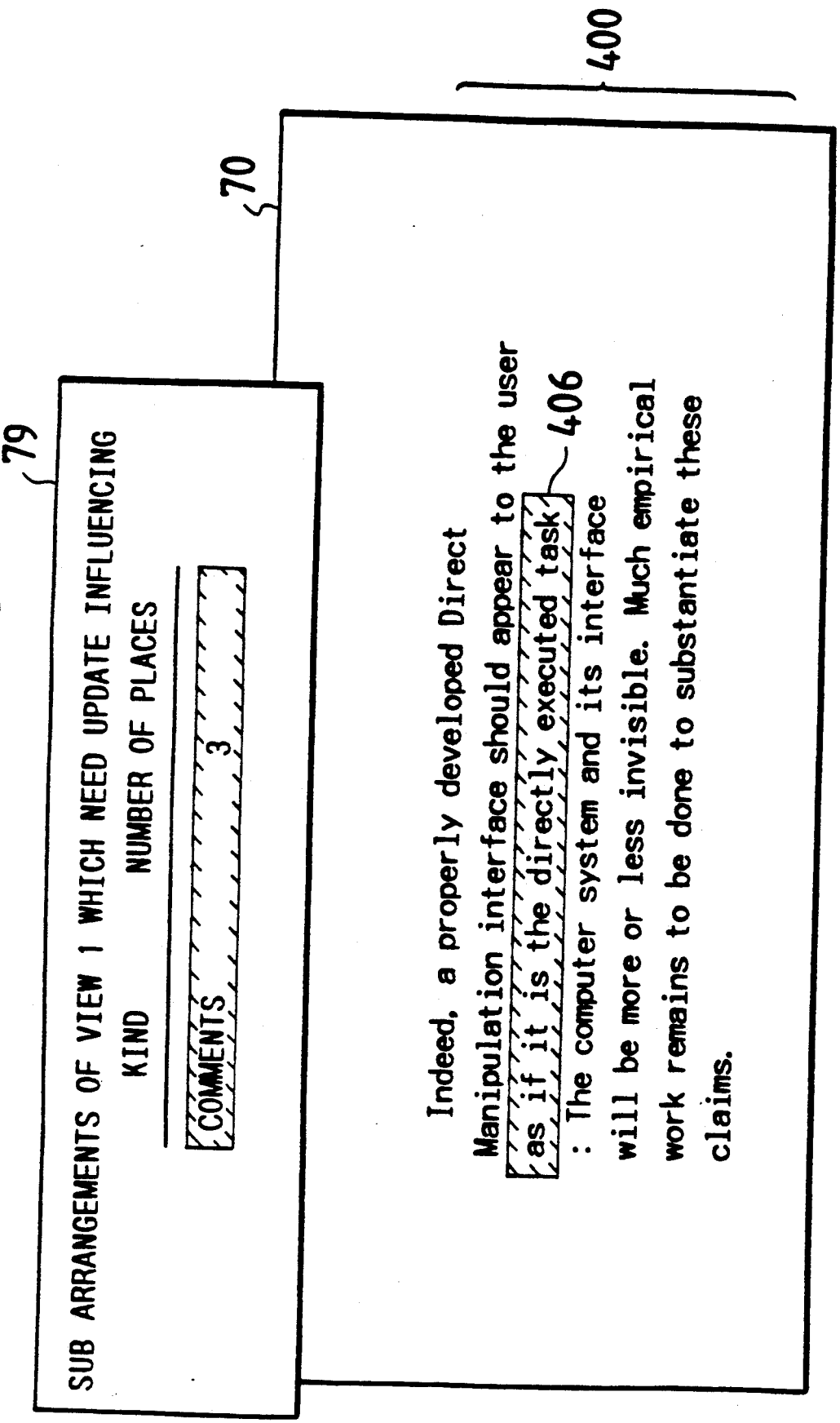

FIG. 14D

SUB ARRANGEMENTS OF VIEW 1 WHICH NEED UPDATE INFLUENCING

| KIND | NUMBER OF PLACES |
|---|---|
| COMMENTS | 3 |

Indeed, a properly developed Direct
Manipulation interface should appear to the user
as if it is the directly executed task
: The computer system and its interface
will be more or
work remains to
claims.

COMMENT:
'Jstar' IS AN EXAMPLE.
ORIGINAL DOCUMENT BEFORE REVISION
as if it is the task that is
being executed directly

FIG. 15A

..... Indeed, a properly developed Direct
Manipulation interface should appear to the user
**1 as if it is the task that is being executed ~401
directly : The computer system and its interface
will be more or less invisible. Much empirical
work remains to be done to substantiate these
claims .....

• 
• 
•         404

```
COMMENTS:
**1 'Jstar' IS AN EXAMPLE.
```

FIG. 15B

..... Indeed, a properly developed Direct
Manipulation interface should appear to the user
**1 as if it is the task that is being executed ~401
directly : The computer system and its interface
will be more or less invisible. Much empirical *1
work remains to be done to substantiate these ~402
claims .....         403      *2

• 
• 
•         404                405

```
COMMENTS:
**1 'Jstar' IS AN EXAMPLE.
```

```
MEANINGS
*1 EXPERIENTIAL
*2 MAKE SUBSTANTIAL
```

FIG. 16A

1. INTRODUCTION
1. 1 OBJECT

As the database scale becomes gigantic, the indexing process becomes painstaking with the conventional index search. Therefore, needs have risen for scanning the whole text and finding key words at the stage of retrieval, i.e., for the full-text search.

...

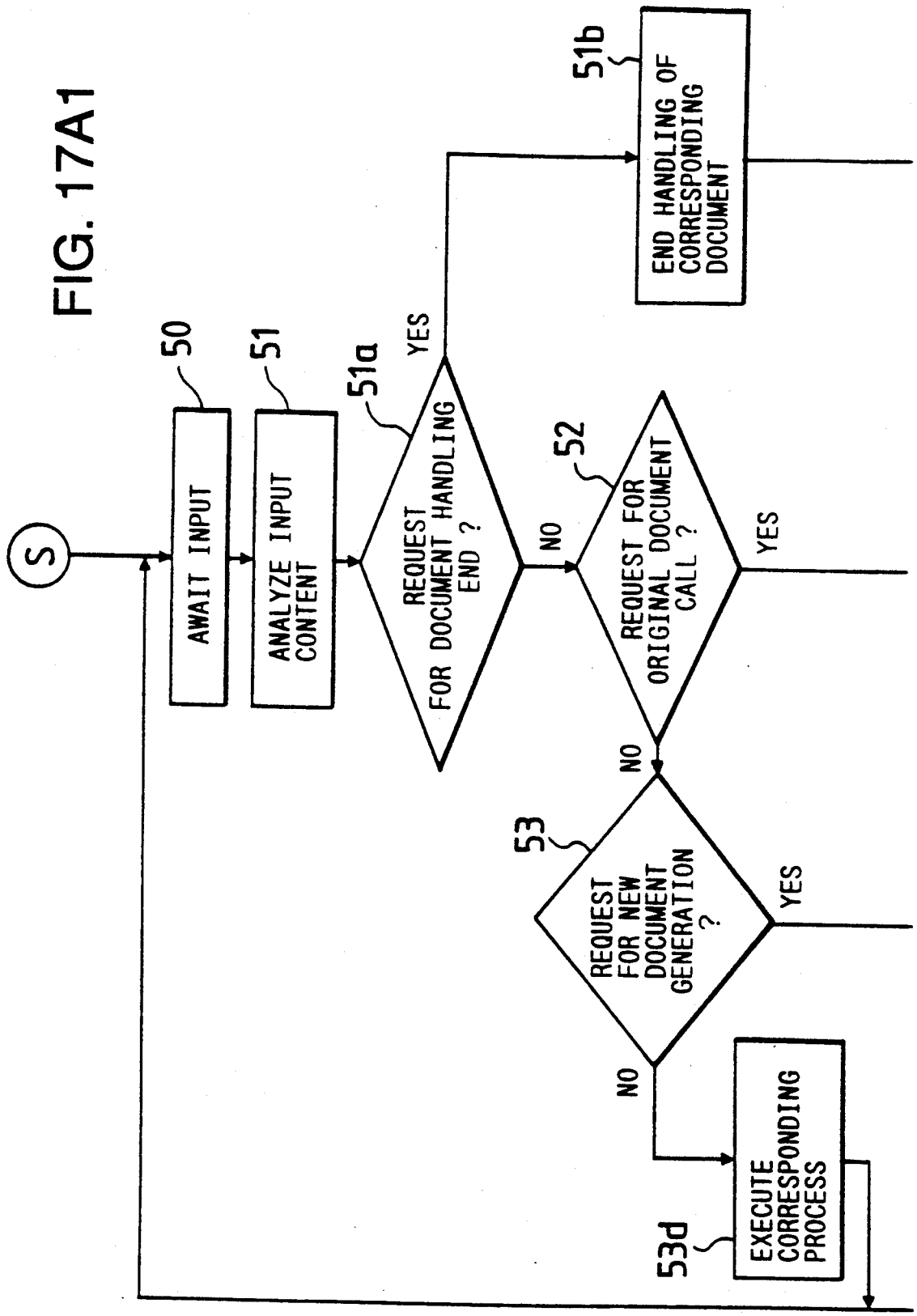

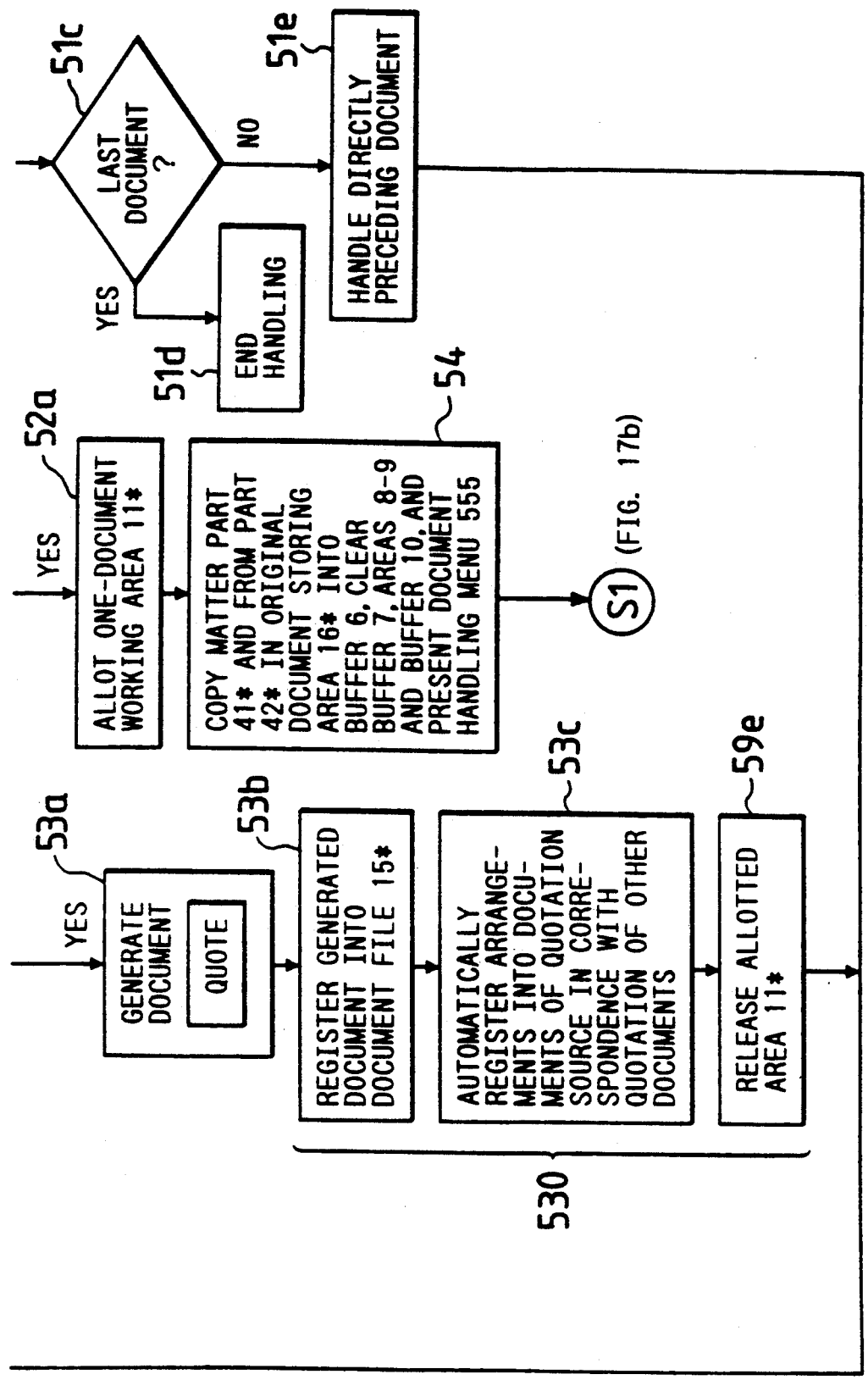
FIG. 17A2
(NOTE) 530 GENERATION AND REGISTRATION OF NEW DOCUMENT

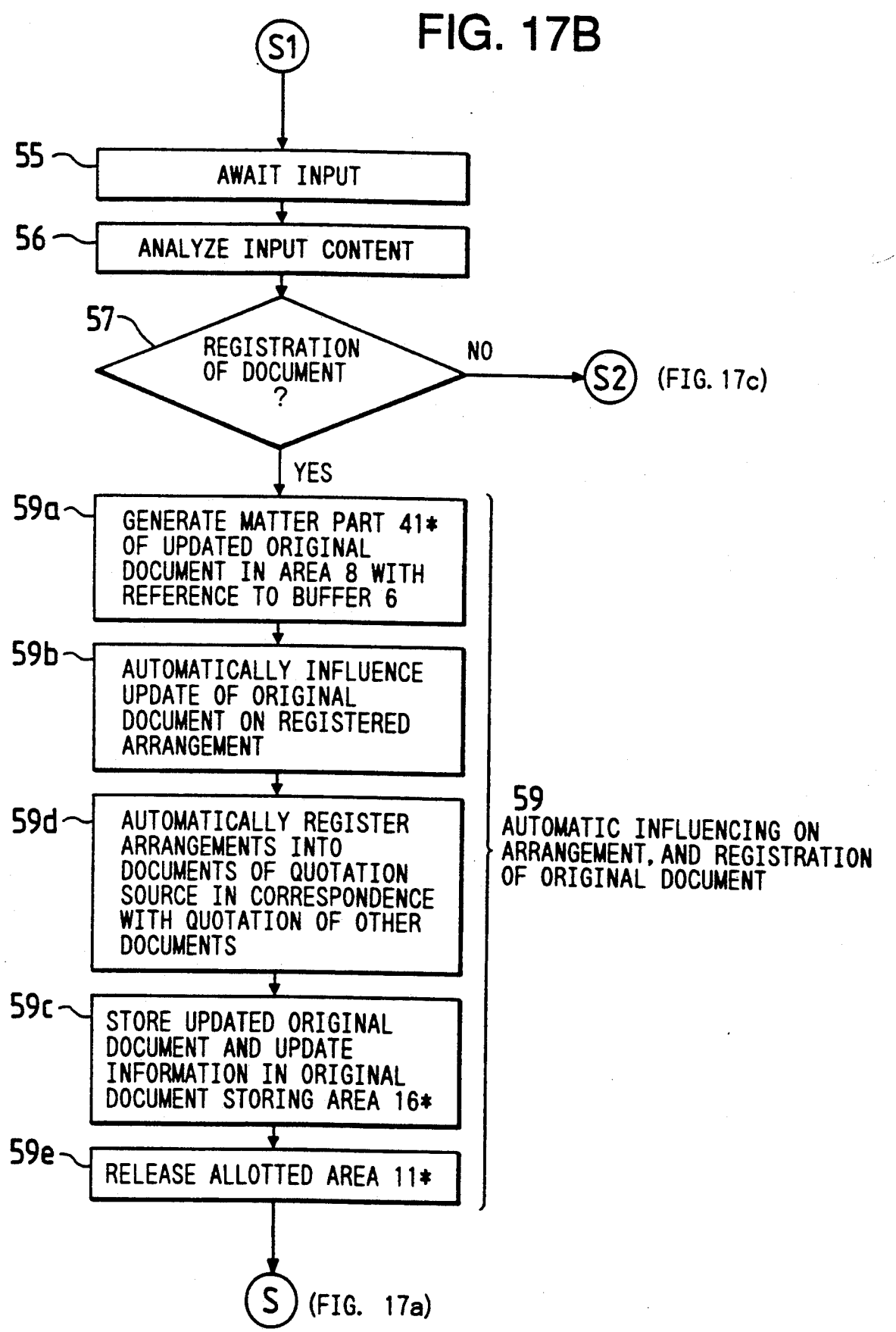

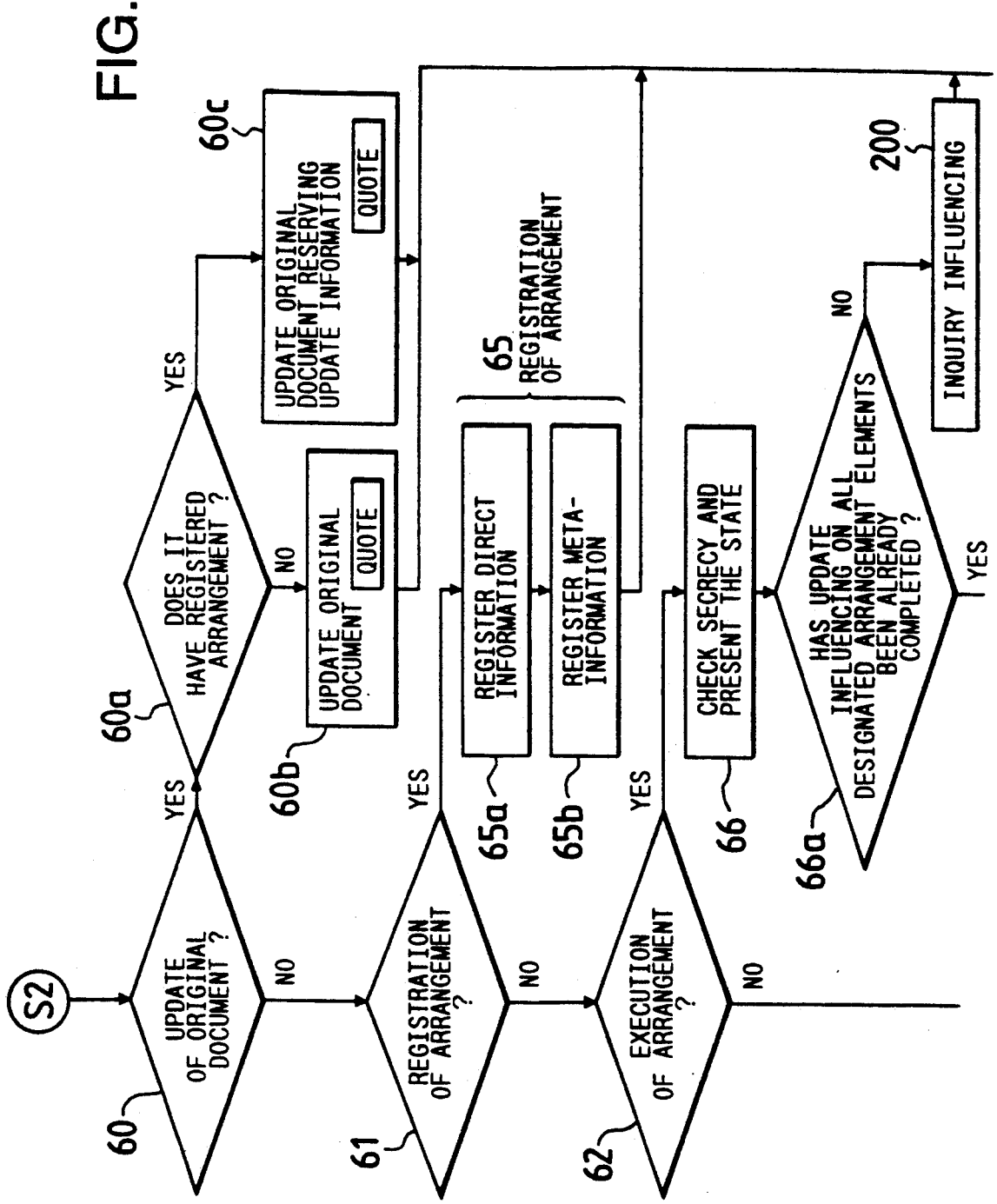
FIG. 17C1

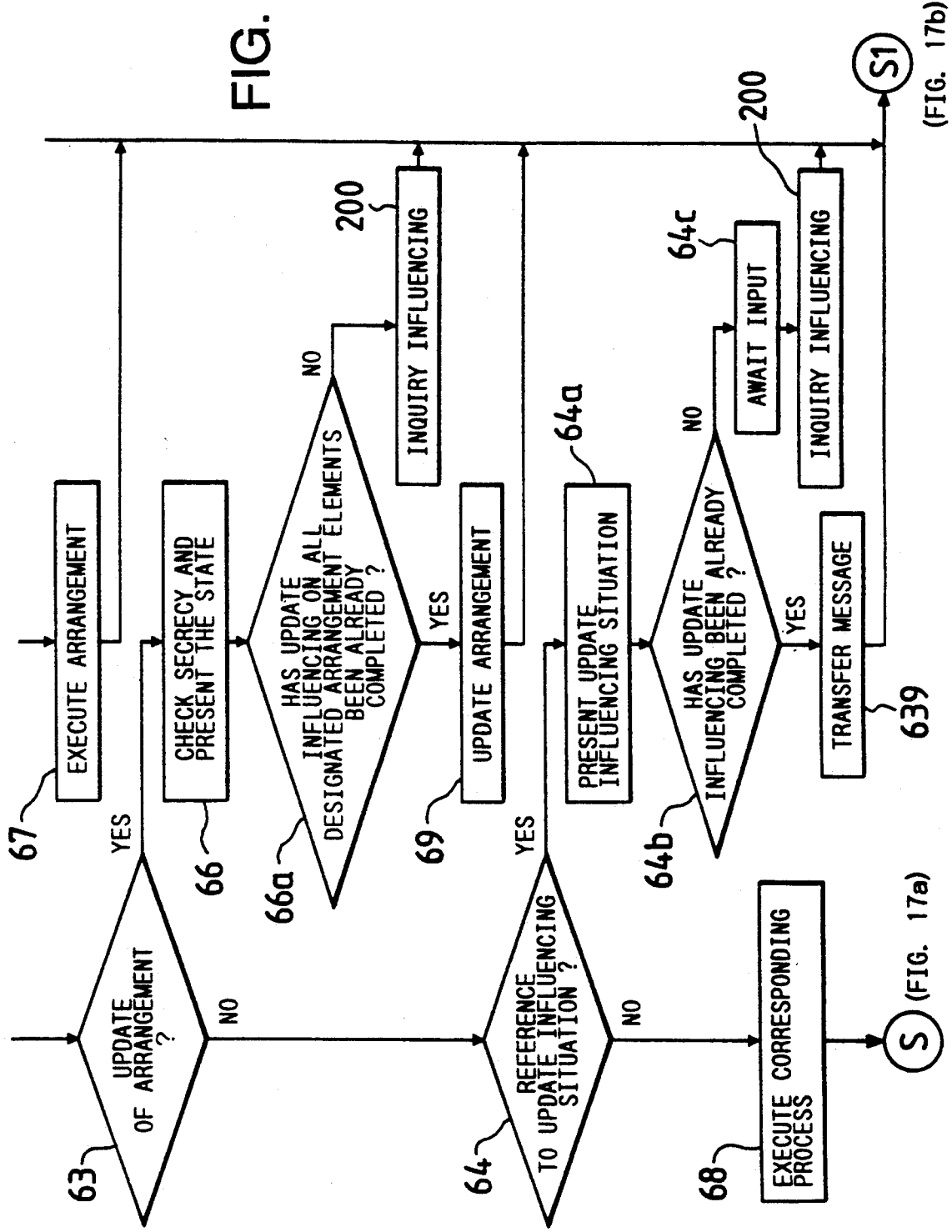
FIG. 17C2

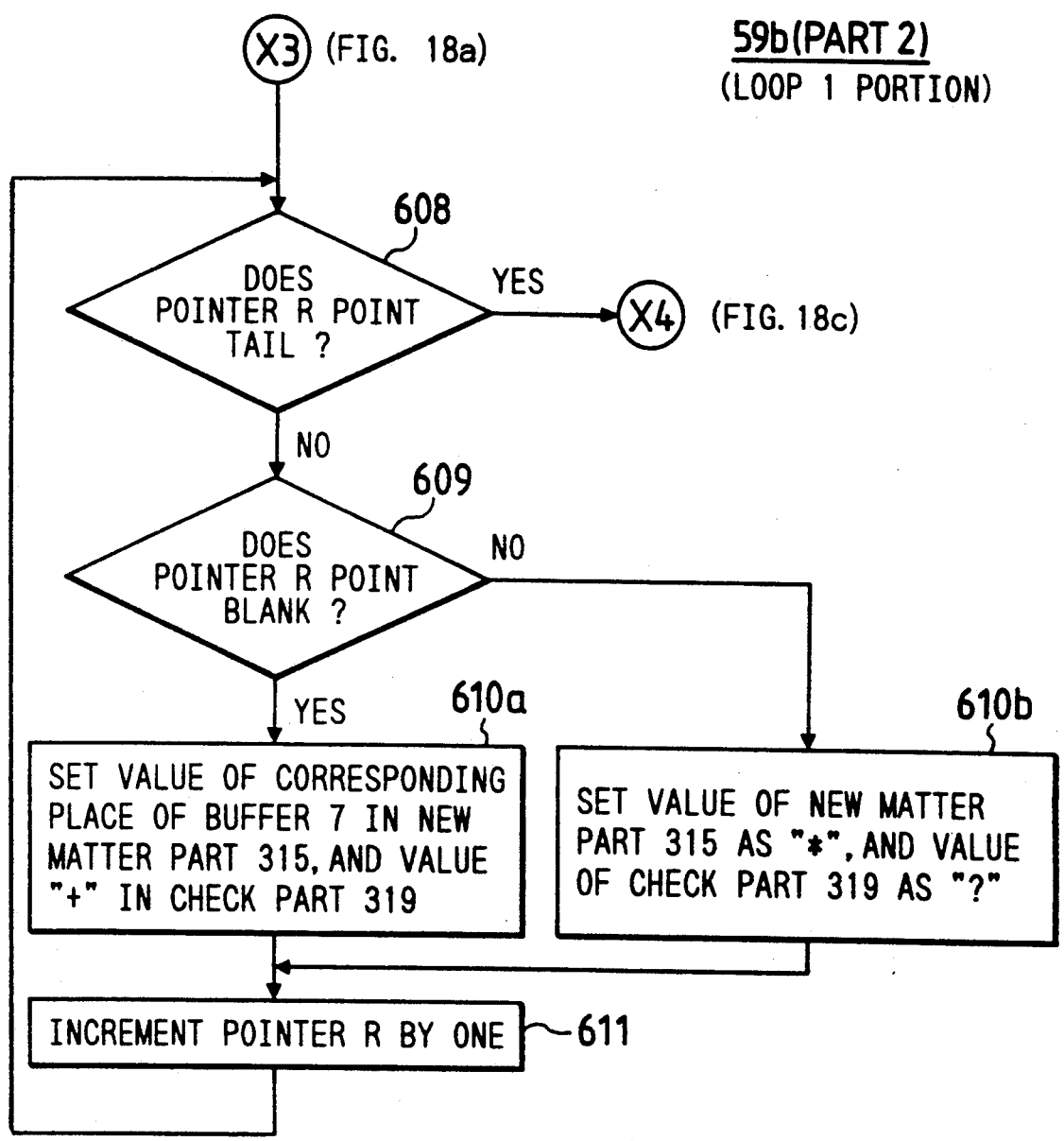

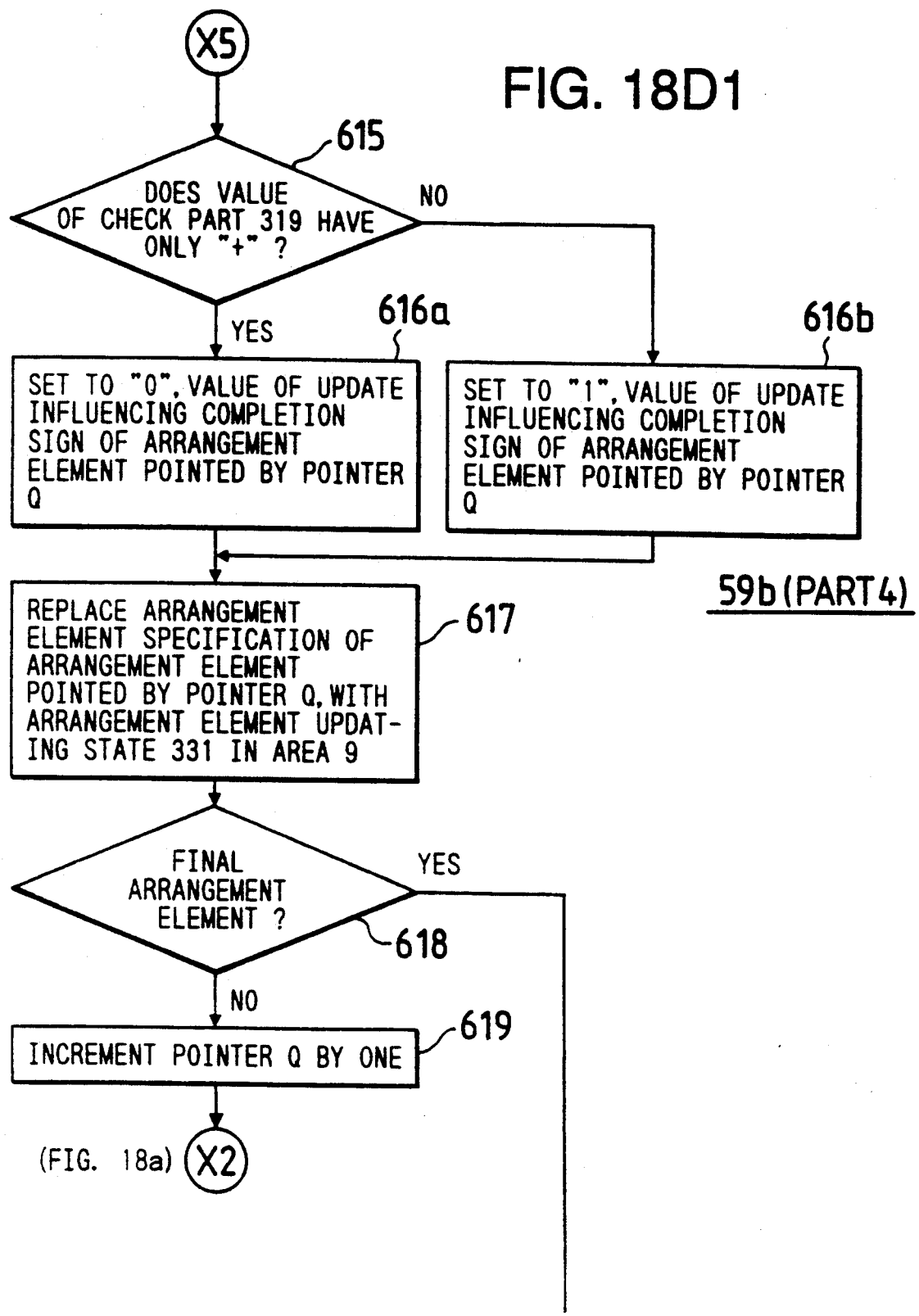
FIG. 18D1

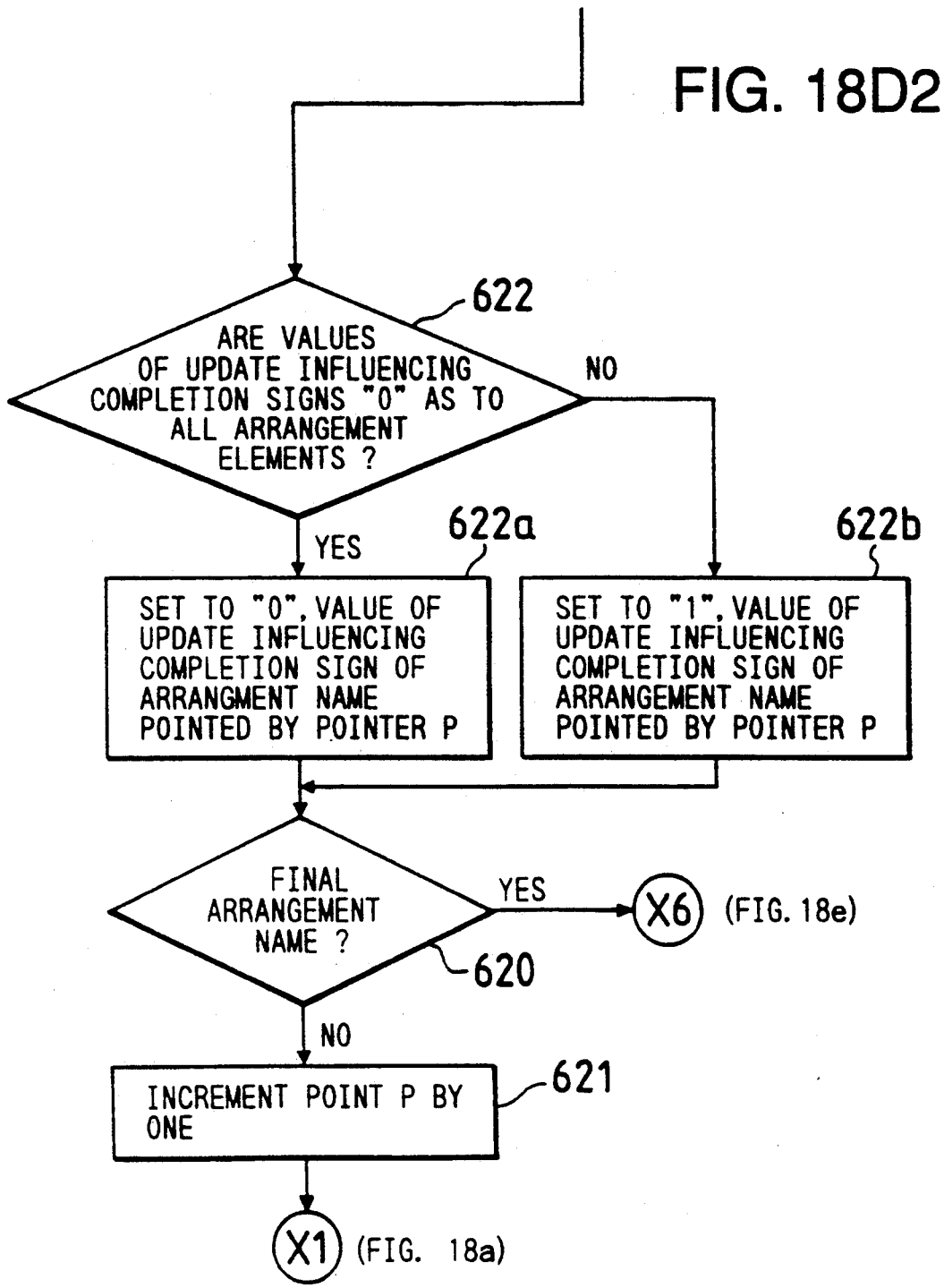
FIG. 18D2

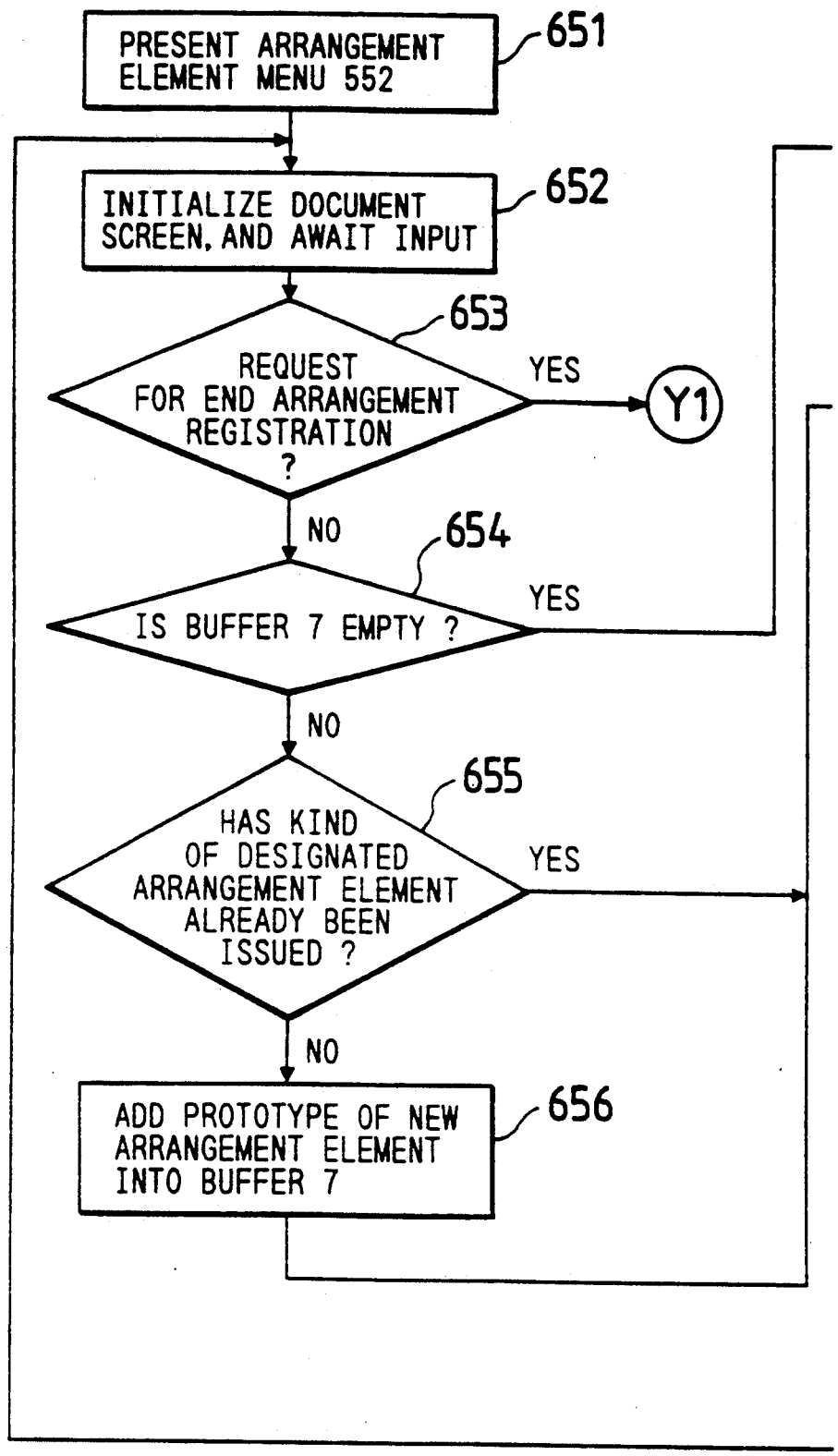
FIG. 19A1

FIG. 19A2
65a (PART 1)
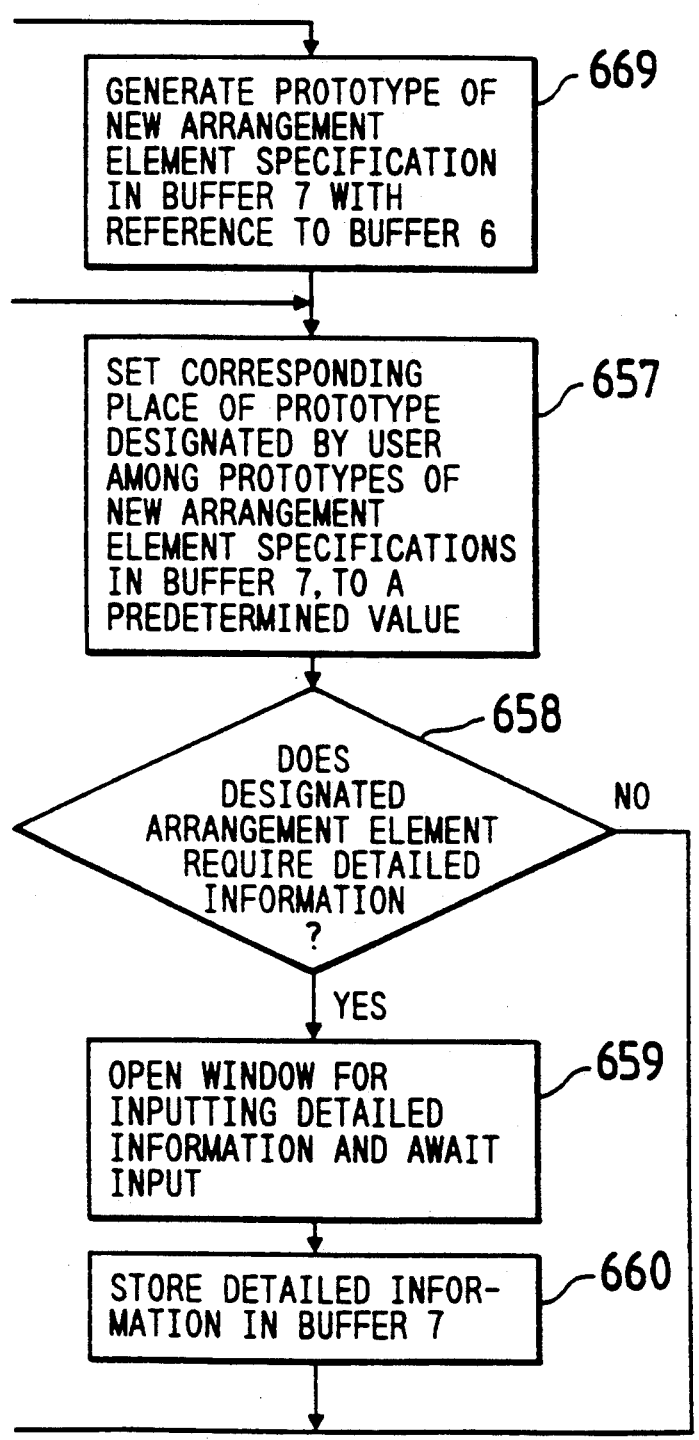

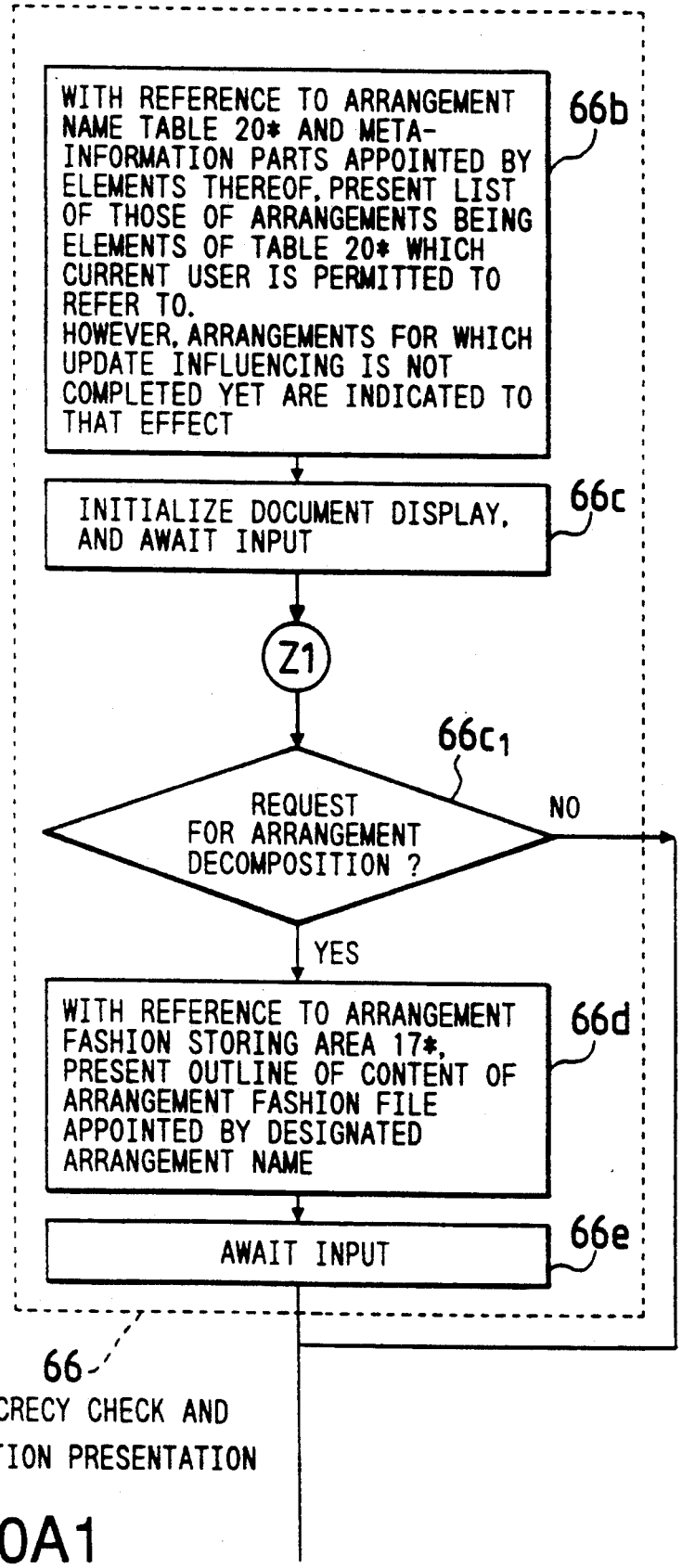
FIG. 20A1

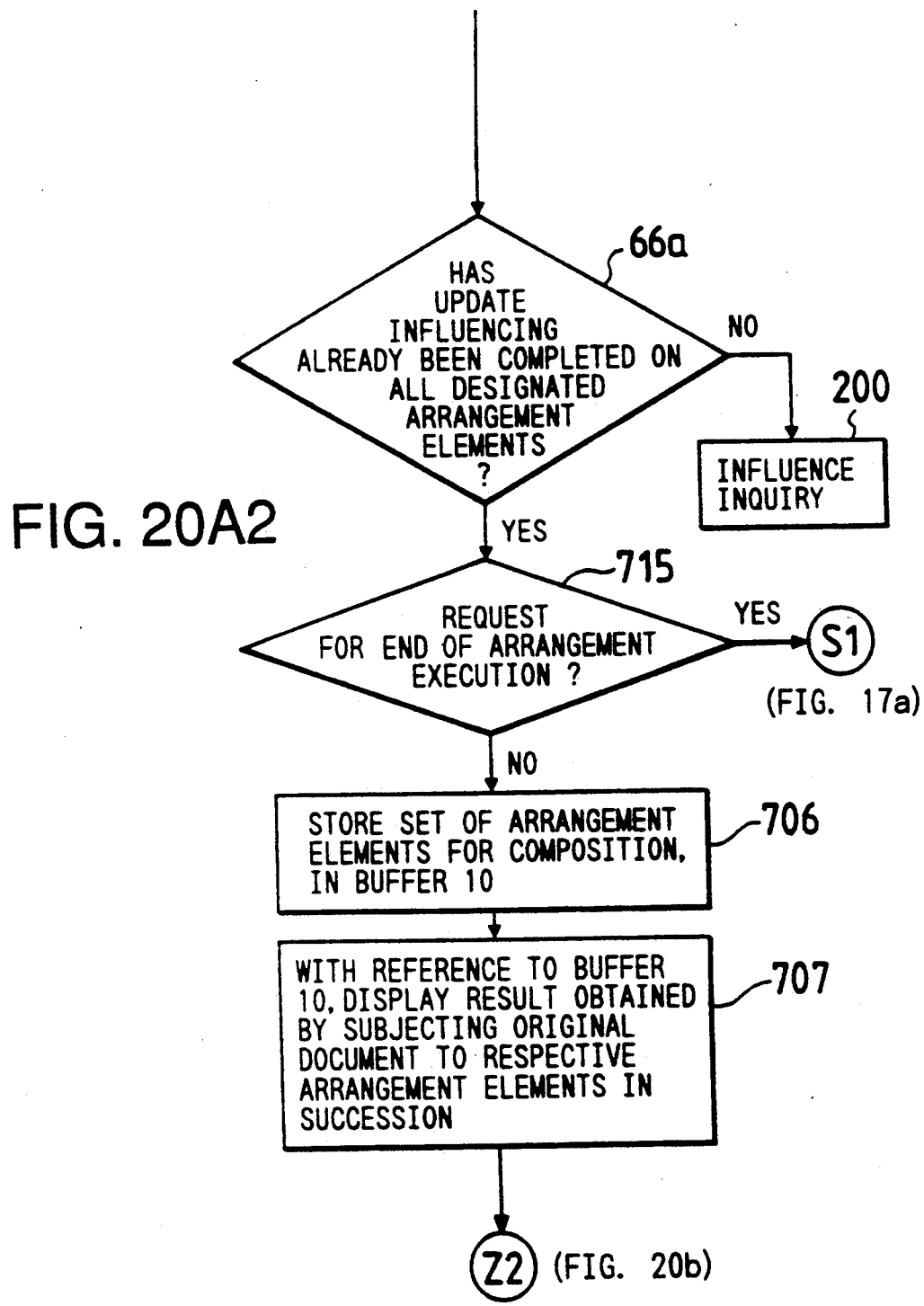

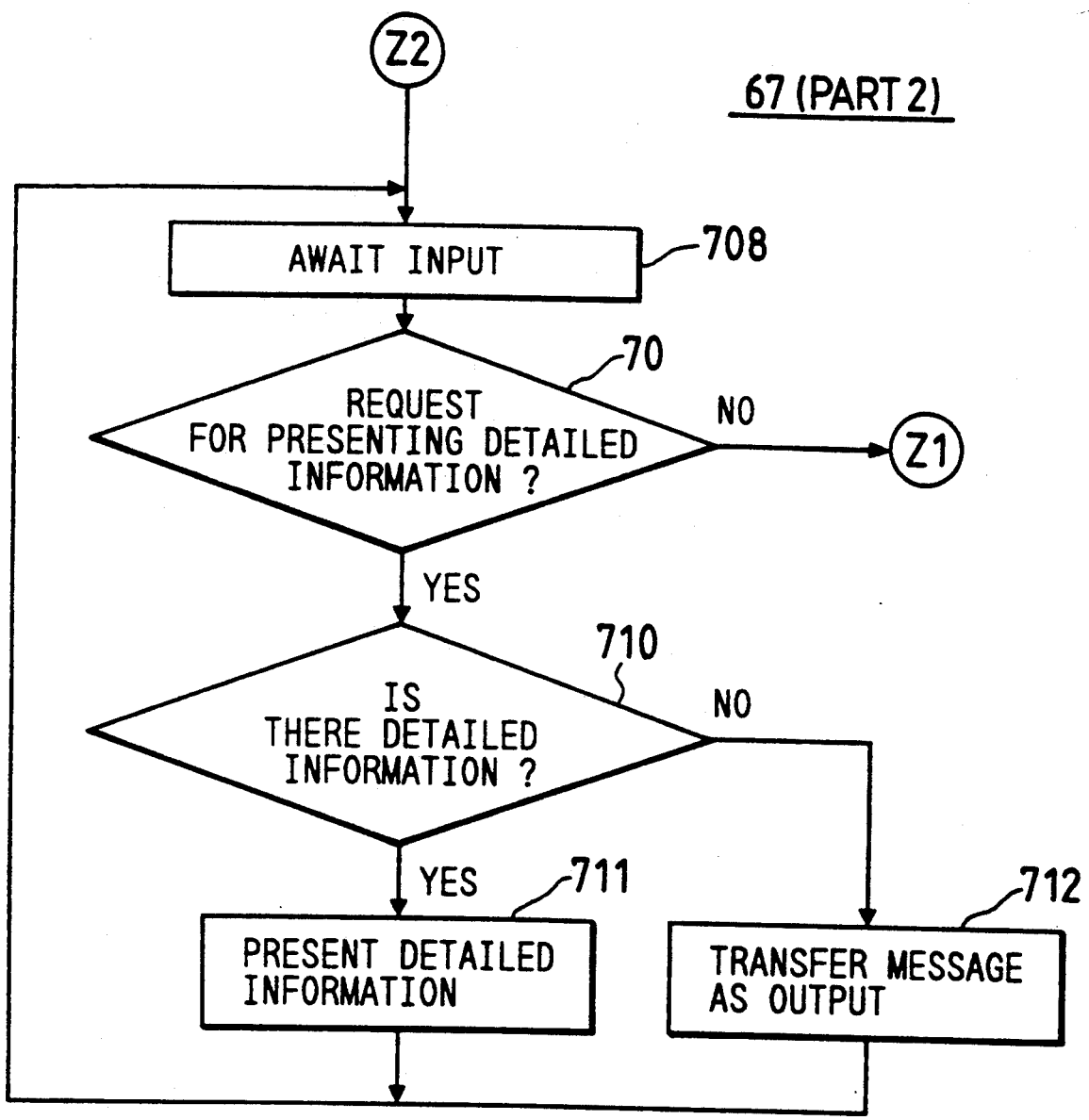

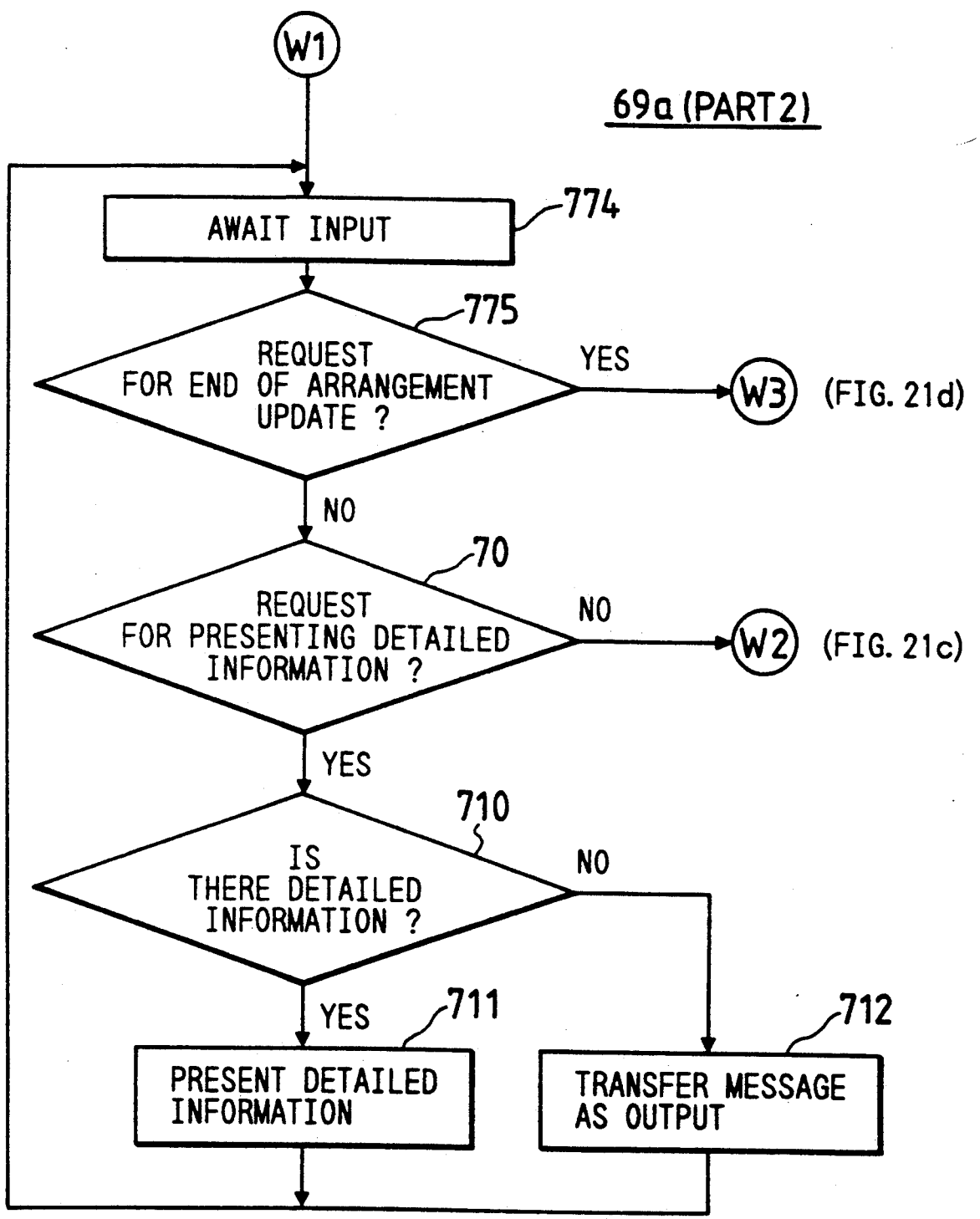

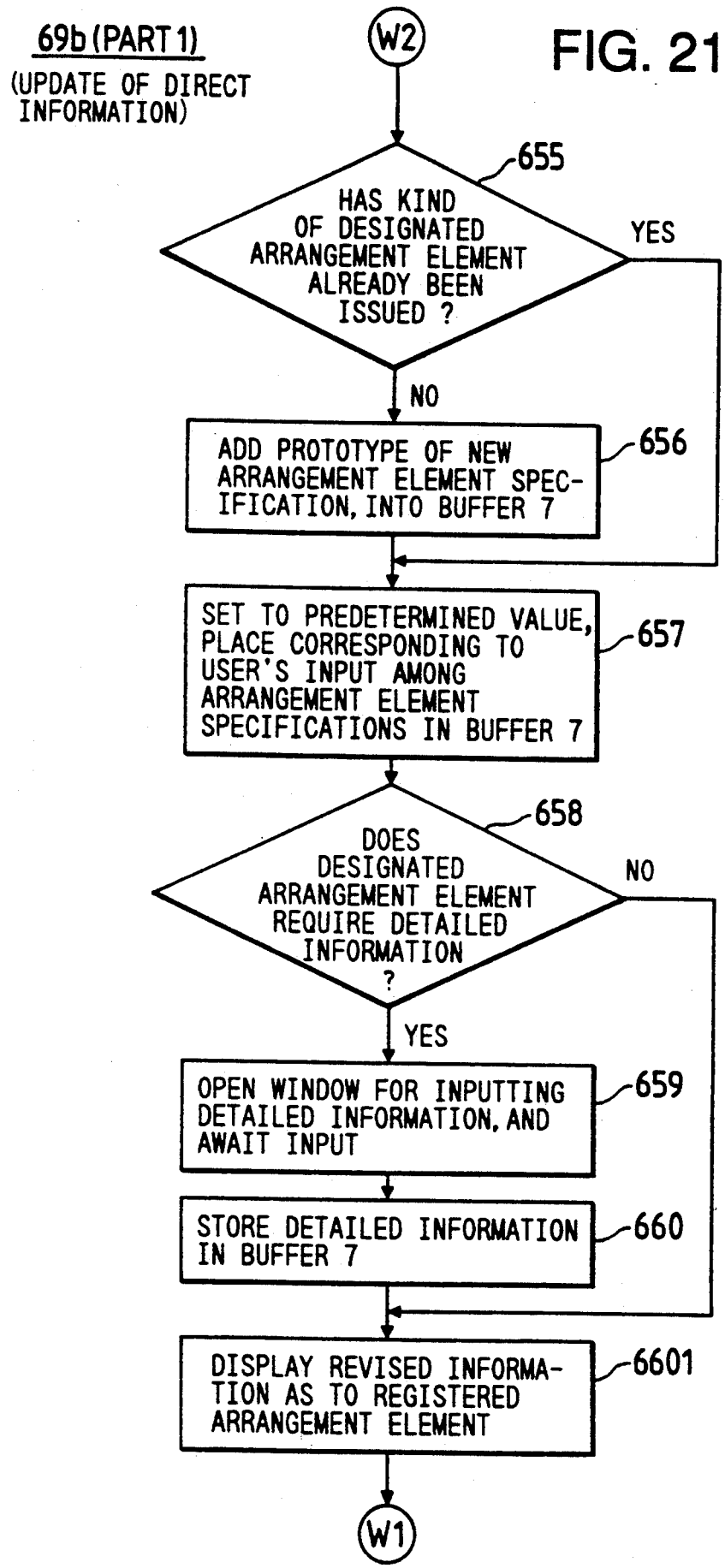

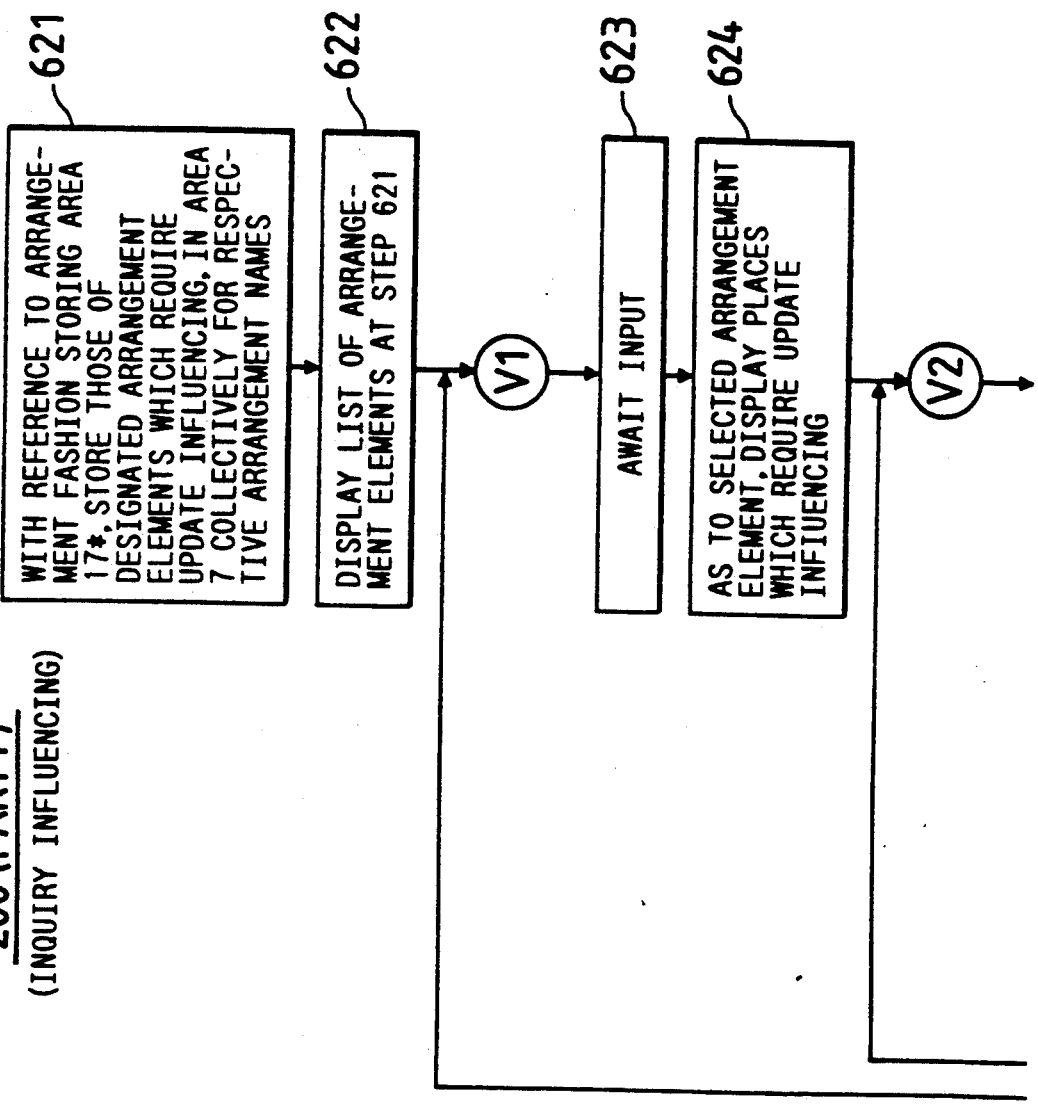

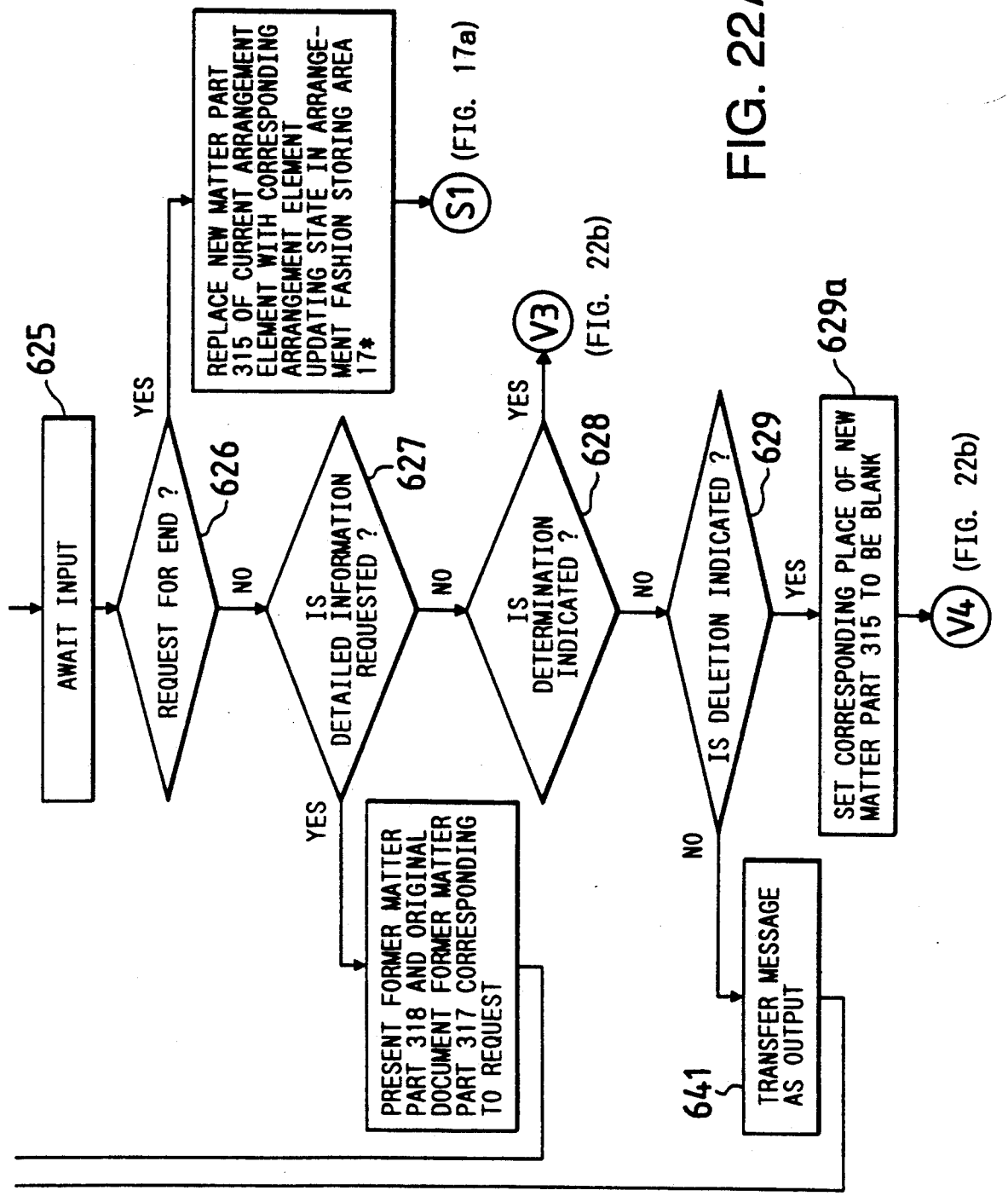

FIG. 22B1
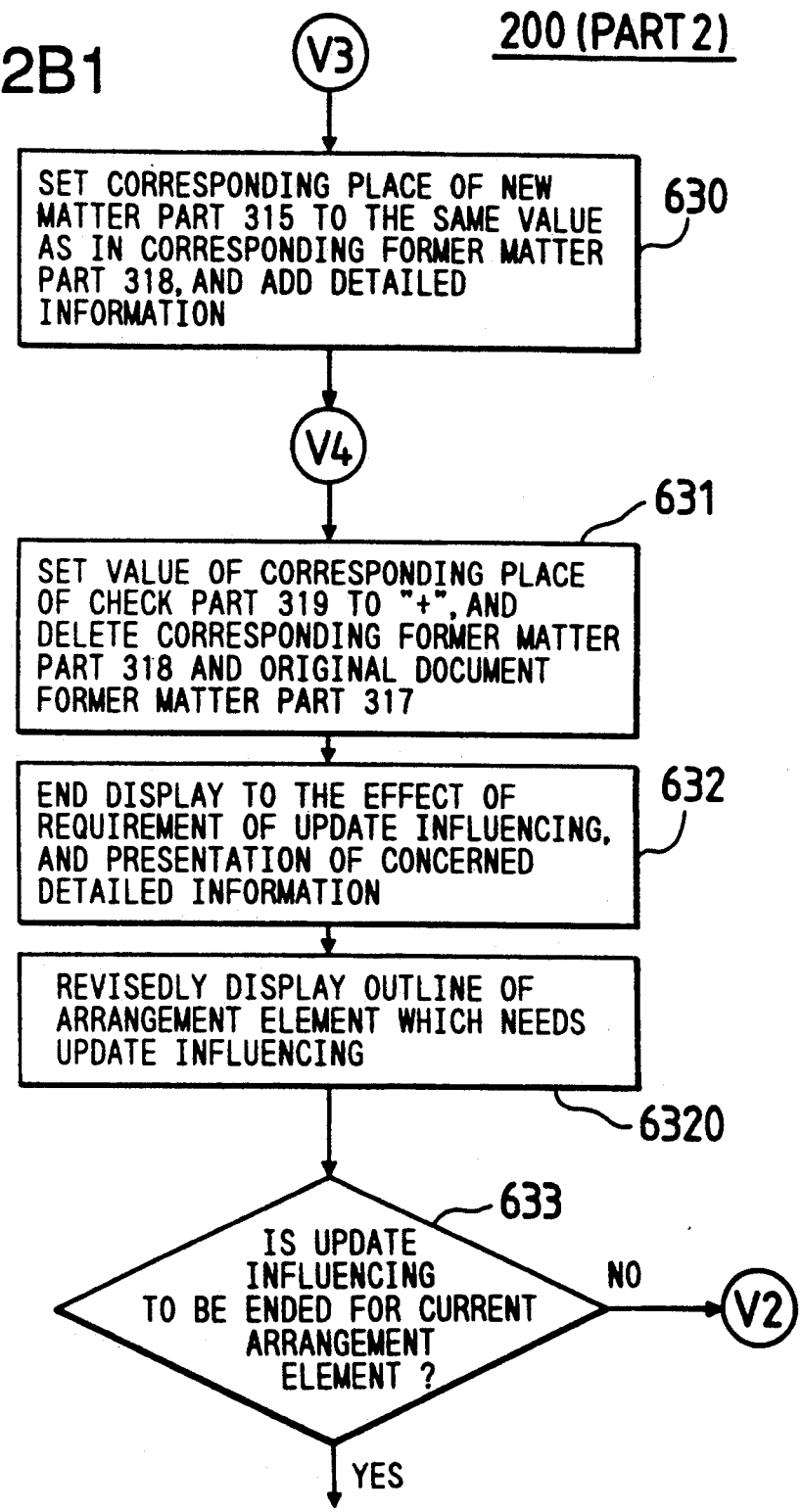

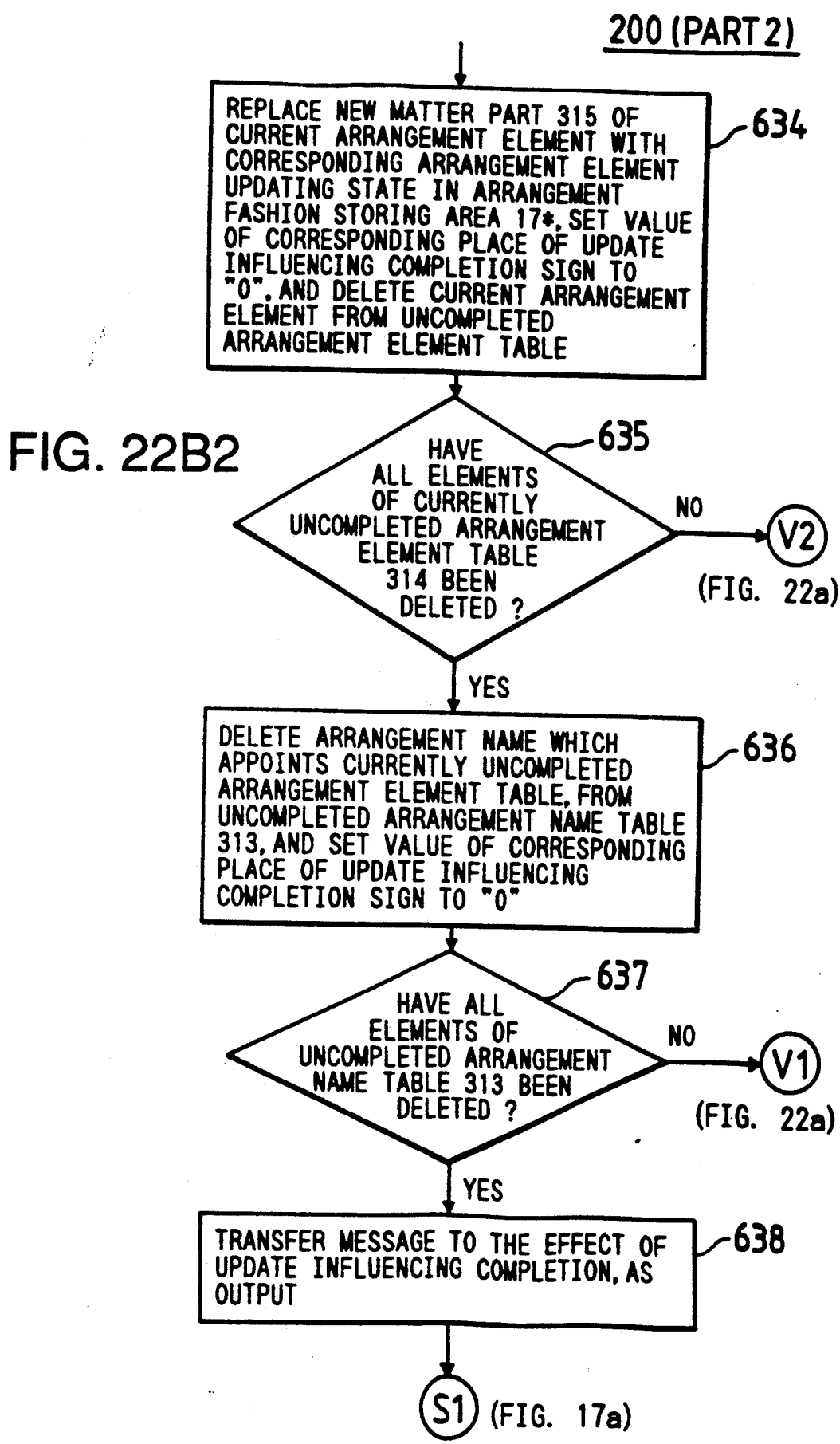

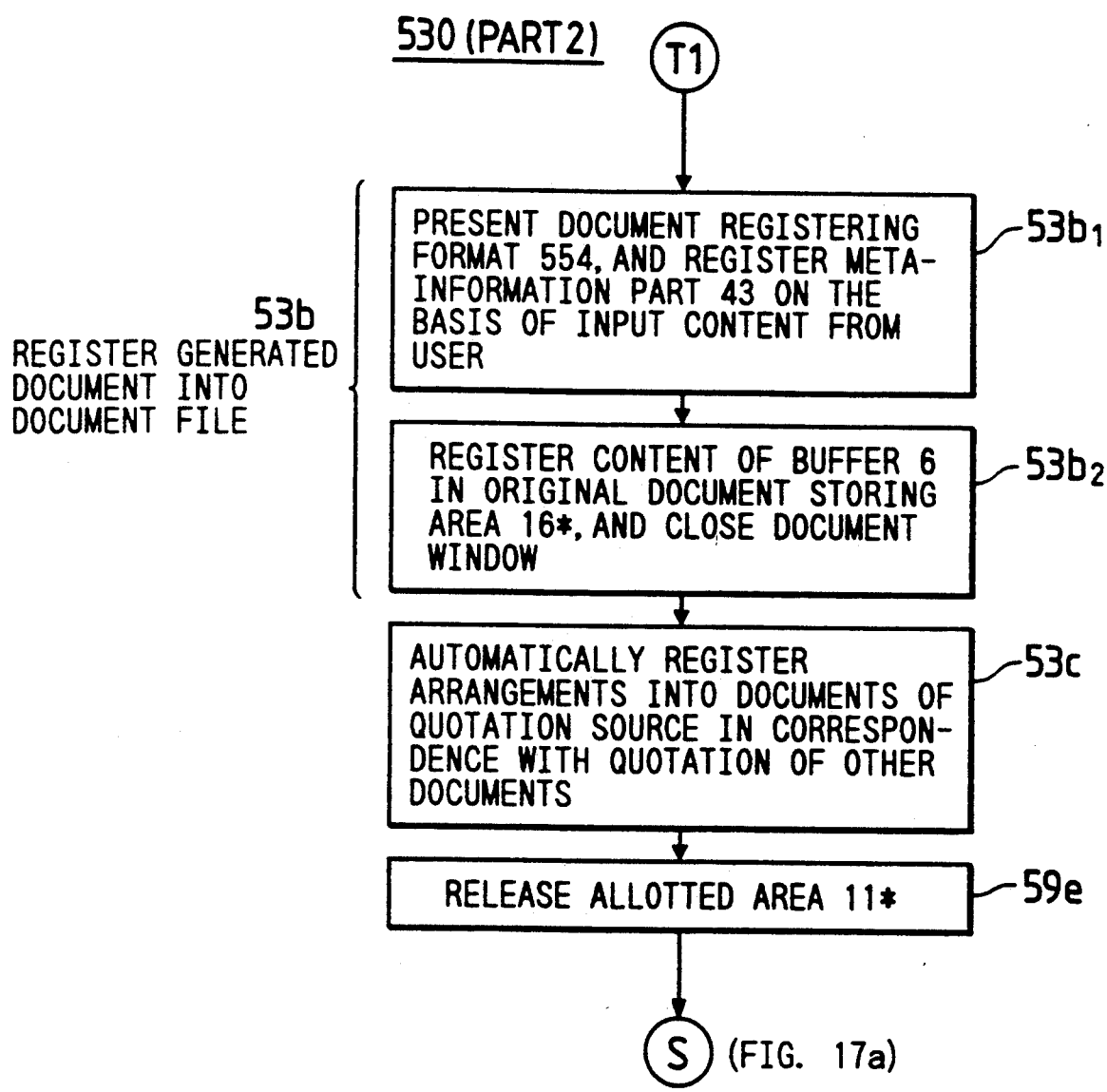

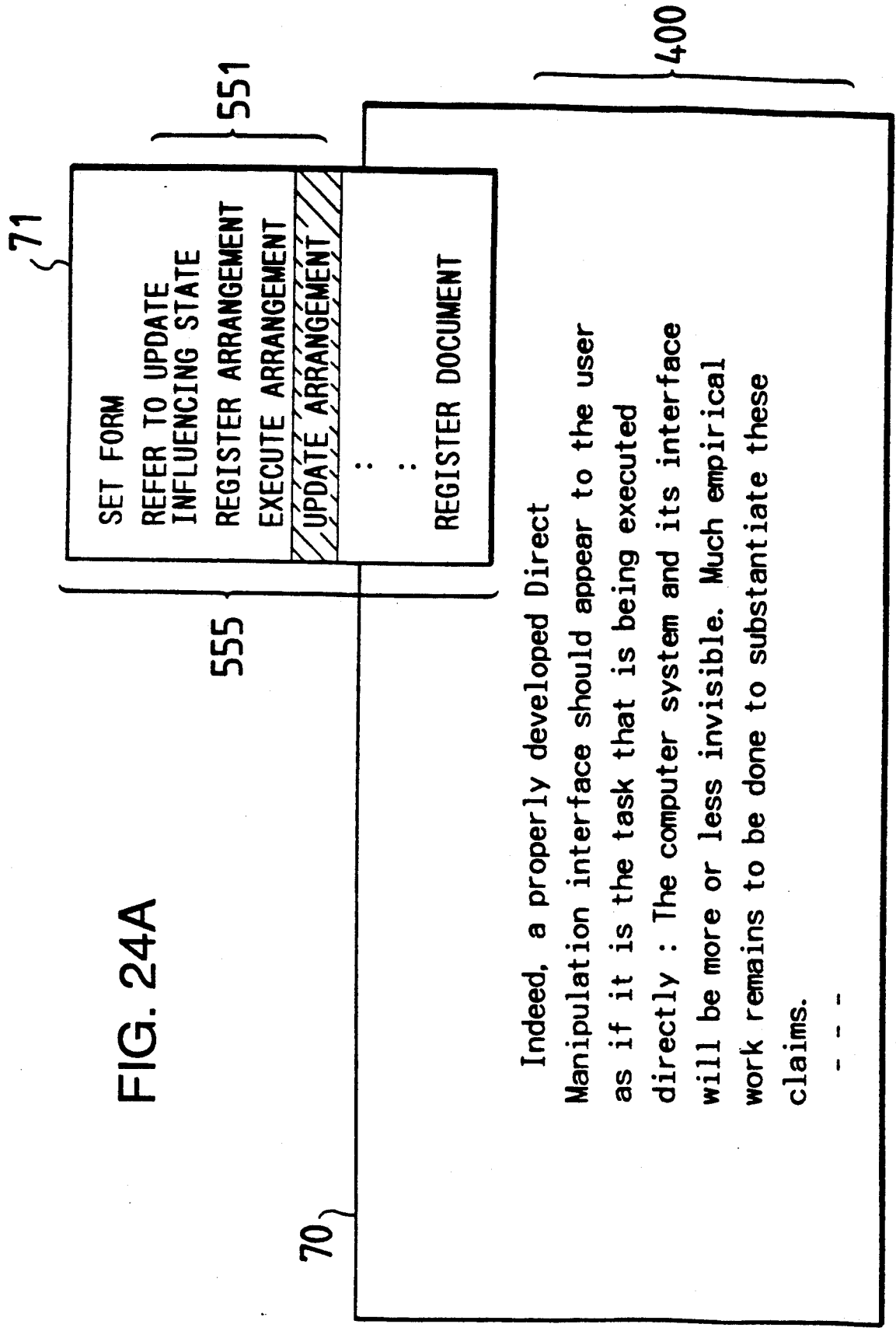

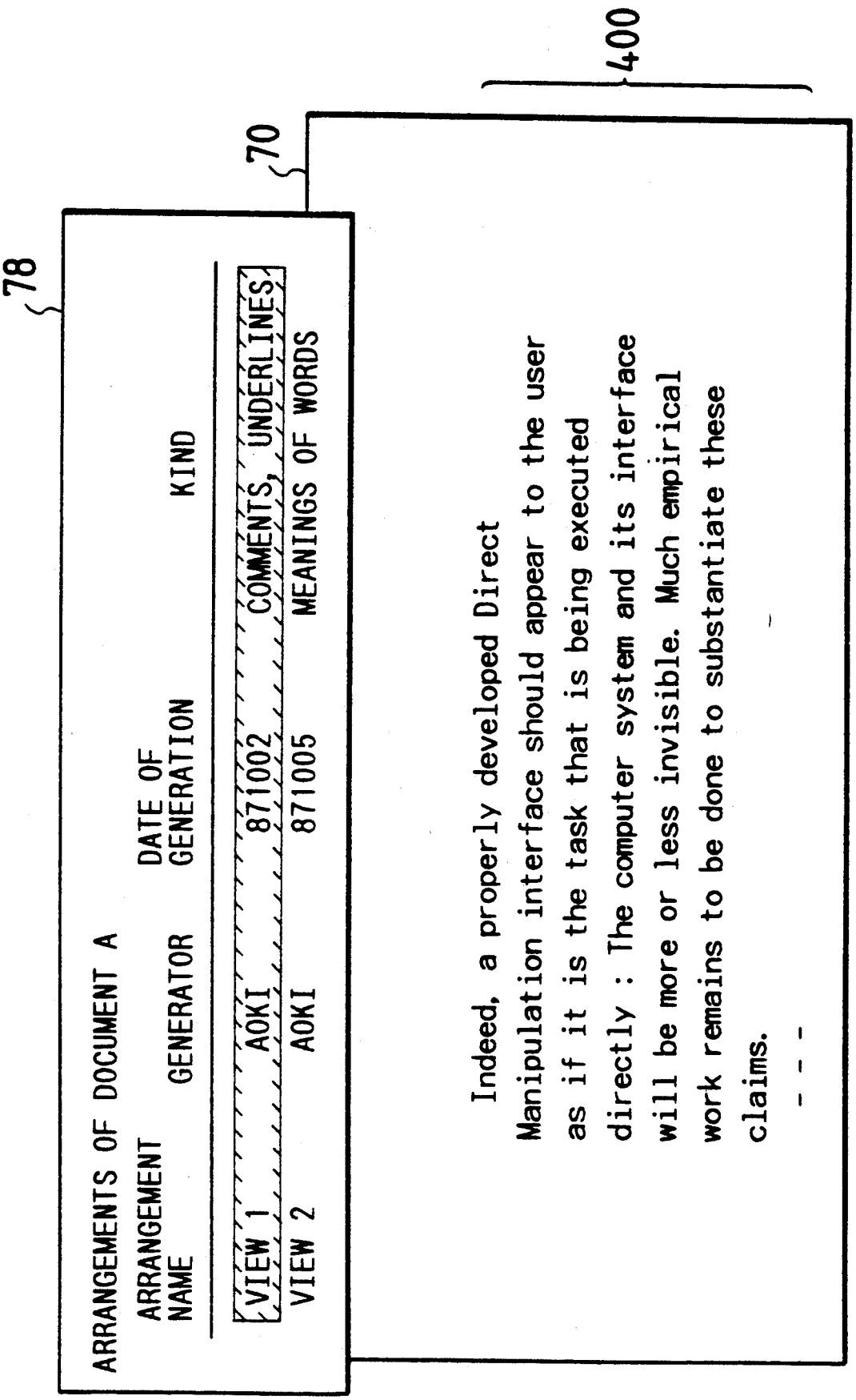

TEXT DOCUMENT MANAGEMENT METHOD ADAPTED FOR GENERATING PLURAL TEXT DOCUMENTS DERIVED FROM THE SAME ORIGINAL TEXT DOCUMENT

BACKGROUND OF THE INVENTION

In general, users want to utilize an identical document multifariously, and even the same user does according to time and circumstances.

First, let's consider a case of reading a document.

FIGS. 15a and 15b show different fashions of use for the identical original document.

FIG. 15a illustrates the fashion wherein part 401 of the original document is underlined and is endowed with a comment 404, and wherein in reading the original document, the underline and the comment 404 are conjointly displayed. This fashion is suited to a case where the same user reads the original document at the second time et seq. while picking up only chief points, and a case where a certain user wants to refer to comments made by another user.

On the other hand, FIG. 15b illustrates the fashion wherein the meanings 405 of words 402 and 403 in the original document are afforded besides the given items in FIG. 15a, and wherein in reading the original document, the underline, comment 404 and word meanings 405 are conjointly displayed. In a case where the original document contains a large number of unknown words, the fashion of FIG. 15a is unsatisfactory, and the fashion of FIG. 15b is suitable.

In this manner, even the identical original document needs to be arranged into various fashions for utilization, depending upon users or according to time and circumstances.

Meanwhile, a technique intended to meet the requirement for the variable documental arrangement on a work station is "Hypertext" which is discussed in IEEE, Hypertext: An introduction and survey, Computer 2, 9 (1987), pp. 17-41. This technique is such that accessory information items on a document, for example, comments and the meanings of words, are managed separately from the original document, and that mapping from the original document to the set of the accessory information items is defined beforehand. On that occasion, the individual accessory information items are respectively held in correspondence with marks in the original document. Among the marks in the original document, only ones designated by the user have the corresponding accessory information items presented. According to this technique, the user can register the various items of accessory information in the document and can obtain only the required items in a desired sequence from among the registered accessory information.

Regarding the example of FIG. 15b, the original document is initially displayed in a fashion with quite no accompanying accessory information. Thereafter, when the user indicates to the effect that he/she wants to know the meaning of the word 402, the meaning of "experiential" is displayed near the word 402. In addition, when he/she indicates to the effect that the display is unnecessary, the original state is resumed.

In this manner, in the hypertext, the document has the multilevel construction unlike the construction in which all the accessory information items are contained flush in the original document as in a write operation. Further, in a case where the accessory information has a hierarchic structure, the user can obtain the accessory information items down to a desired depth.

Next, let's consider a case of generating a document. A user often wants to derive the other similar document from an original document in such a way that only parts are extracted from the original document or that letters and symbols are input anew.

FIG. 16a illustrates a thesis "Document B" which is the original document, while FIG. 16b illustrates a material for publication, "Document C" which has been derived from the original document.

The Document C is obtained in such a way that phrases 421b, 422b, 423b and 424b are first quoted from the Document B and turned into respective phrases 421c, 422c, 423c and 424c, that the layout of these phrases is subsequently revised properly, and that the number of a figure, etc. are further input anew. The user is sometimes conscious of the document thus derived from the original document, as the independent material for publication, "Document C" and sometimes as "matters generated from Document B" dependently.

Now, the case of reading the document will be considered again. With the hypertext, the accessory information items on the original document are merely handled in such a way that the user designates them one by one.

In general, in a case where a user utilizes a document, there is an arrangement fashion for the whole document, including that "the user wants to read with reference to the meanings of words" and that "he/she will not refer to comments". Besides, local alterations including that "as to the words having become known, he/she wants to erase the displays of the meanings" take place in the arrangement fashion. In order to meet the user's requirement for the variable documental arrangement, accordingly, the following two features are necessitated:

(1) Permitting the user to handle the original document in various arrangement fashions
(2) Permitting the user to locally handle the accessory information in the original document in a predetermined arrangement fashion.

In the hypertext, the above requisite (2) is taken into account, but the requisite (1) is not.

More specifically, as to the example of FIG. 15b, even when unknown words are large in number, the user must designate the words 402, 403, . . . in succession so as to display the meanings thereof. He/she cannot systematically designate the "display of the meanings of words" so as to display the meanings 405 of all the registered words as illustrated in the figure, or designate the "display of comments" so as to display the comment 404 registered in the original document. Accordingly, even when the arrangement fashion that "the user wants to read with reference to the meanings of words" is determined by way of example, he/she needs to designate the words successively one by one for the displays of the meanings thereof.

Next, the case of generating the document will be considered as to the example of FIGS. 16a and FIG. 16b. In general, a document derived from an original document is managed as an independent one similarly to other documents which are quite different. Therefore, when the user wants to refer to the derived document, he/she must search for the document with its name "Document C" or the like as a key. If the user wants to search for the Document C on the basis of the relation of derivation such as "generated from the Document B", he/she must separately manage the relation of derivation between the documents, that "Document C has been derived from Document B". Moreover, unlike a mere copy, quotations from the original document into the derived document have the property that, when terms, data values, etc. have been updated in the original document, the updates need to be influenced on the derived document. In this regard, the prior art has the problem that the user must separately manage the relations of the update influencing.

Assuming that the various fashions of an identical document are managed as separate documents, the enlarged number of documents is difficult for the user to search for the document corresponding to a desired arrangement fashion and make it impossible to dynamically combine a plurality of such arrangement fashions that "both comments and the meanings of words will be referred to". Further, when the original document is updated, the same updates must be executed for all of the separate documents, resulting in a difficult transaction.

Accordingly, the hypertext has the problem that restrictions are imposed on utilizing the original document in various arrangement fashions.

Besides, the hypertext has the problem that the updates of the original document are not adequately influenced on the accessory information and the derived document.

The influencing of the updates of the original document will be described in connection with the example of FIG. 15a. It is supposed that the comment 404 is initially made for the passage 401 in the original document, whereupon the matter of the passage 401 is revised. Even the gist of the passage 401 is sometimes changed by the revision, and also the comment 404 must be deleted or altered on that occasion. In addition, the major part of the passage 401 commented on is sometimes moved to another place, and also the comments 404 must be moved to the destination of the original document on that occasion. In this manner, the updates of the original document often come to require those of the accessory information items associated therewith. With the hypertext, however, merely marks indicating to the effect of the registrations of comments are given in the text of the original document, and hence, the user is liable to overlook the fact that the comments have come to require updates. Further, in a case where the original document has been updated by a user different from the user in possession of the comments, this user might know nothing of the fact that the comments have come to require the updates.

SUMMARY OF THE INVENTION

An object of the present invention is to provide a documents managing method which is suitable for permitting a user to arrange an original document into various fashions for utilization.

Another object of the present invention is to provide a documents managing method in which a system automatically manages the relations between an original document and the arrangement fashions thereof and the relations of derivations between documents, whereby a user has better ease of handing documents arranged from the original document and documents derived therefrom, with the original document as the starting point.

Still another object of the present invention is to provide a documents managing method in which, when the updates of an original document have come to require updates in the arrangement fashions and derived documents of the original document, the required updates can be made without omission and with ease.

In order to accomplish these objects, the present invention comprises:

(a) subjecting an original document registered beforehand to a first arrangement designated by a user, thereby to generate a first derived document;

(b) registering the first arrangement as a set of derived document information items on the original document;

(c) repeating said steps (a) and (b) in relation to a second arrangement designated for generating a second derived document by the user;

(d) allowing the user to select one of the plurality of sets of derived document information items which have been registered in relation to the original document; and (e) subjecting the original document again to the arrangement expressed by the selected set of derived document information items, thereby to reproduce the corresponding derived document.

Also, the present invention comprises:

(a) registering a plurality of sets of derived document information items for generating a plurality of derived documents from an original document, respectively; and (b) discriminating parts to-be-updated in the plurality of sets of derived document information items in response to updates of the original document and on the basis of update rules stored beforehand, and then updating the parts.

BRIEF DESCRIPTION OF THE DRAWINGS

FIGS. 4a-4c are diagrams showing the changes of the contents of an arrangement fashion updating area (9) before and after an automatic influencing step (59b) in FIG. 17b; FIGS. 5a-5c diagrams showing the changes of the contents of an arrangement fashion storing area (17A) in the processes of the automatic influencing step (59b) in FIG. 17b and an inquiry influencing step (200) in FIGS. 17C1 and 17C2; FIGS. 9A1-9c are diagrams showing the contents of document files (15A)-(15C) before the updates of the original document, respectively; and FIG. 10 is a diagram showing the content of a knowledge base (12).

FIGS. 11a-11h show a user interface at an arrangement registering step (65) in FIGS. 17C1 and 17C2 in the case of arranging the original document into a desired fashion; FIGS. 12a-12g show the user interface at document generation and subsequent steps (steps 53a–53c in FIGS. 17A1 and 17A2) in the case of generating another document derived from the original document; FIGS. 13a–13k show the user interface at the arrangement executing step (67) in FIGS. 17C1 and 17C2 in the case of arranging the original document into the desired fashion; and FIGS. 14a–14h show the user interface at the inquiry influencing step (200) in FIGS. 17C1 and 17C2 in the case where the updates of the original document have come to require the updates of places in the arrangement fashion of the pertinent document.

FIGS. 15a–15b are diagrams showing different fashions of utilization for an identical original document, while FIGS. 16a–16b are diagrams showing an original document and another document derived therefrom. FIGS. 17A1–17c are flow charts of a series of control flows showing the general operation of a documents managing program (4), while FIGS. 18a–18e, FIGS. 19a–19b, FIGS. 20A1–20b, FIGS. 21a–21d, FIGS. 22A1–22B2, and FIGS. 23a–23b are flow charts of series of control flows showing the detailed operations of a step 59 in FIG. 17b, steps 65, 67, 69 and 200 in FIGS. 17C1 and 17C2, and a step 530 in FIGS. 17A1 and 17A2, respectively.

FIGS. 24a–24h are diagrams showing the user interface on a bit map display (3) at the arrangement updating step (69) in FIGS. 17C1 and 17C2.

DESCRIPTION OF EMBODIMENTS

Figure 1A:
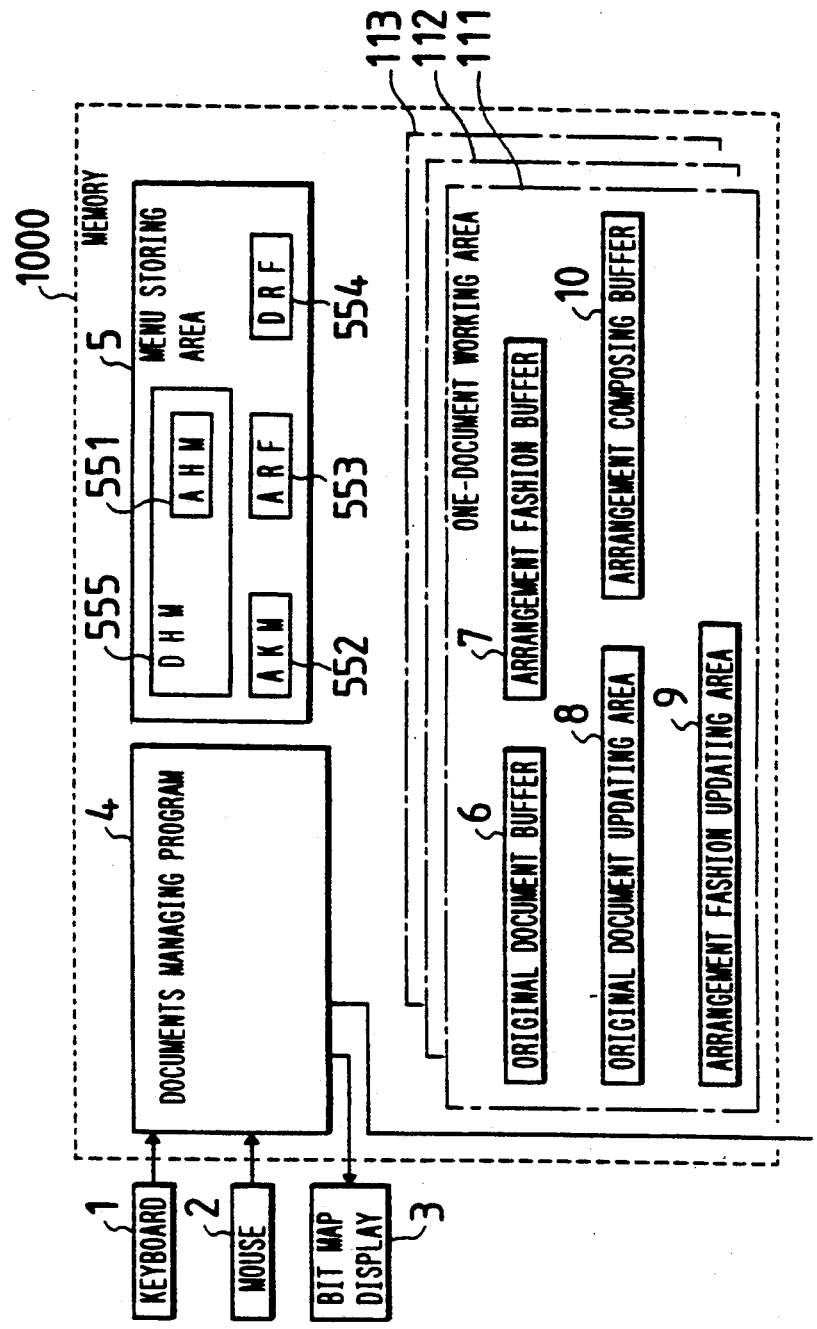
FIGS. 1A and 1B are a diagram of the system architecture of an embodiment of the present invention.

Now, embodiments of the present invention will be described.

A. System Architecture:

First, the general architecture of a system embodying the present invention will be described with reference to FIGS. 1A and 1B. The input/output interface of the system with the user thereof is constituted by a keyboard 1, a mouse 2 and a bit map display 3. Numeral 1000 indicates a memory, and numeral 4 a program for managing documents in a manner to dialogue with the user.

A menu storing area 5 stores therein menus 551–552 and 555 and formats 553–554 for the user interface. Numerals 111–113 denote working areas each of which the program 4 uses for handling one document (in a case where which of the working areas 111–113 is appointed is not specified, the No. of the unspecified area is expressed by "11*"), and each of which is constructed of components 6–10. The original document buffer 6 is an area into which the original document to be handled is called from an original document storing area 16 included in a file storage 2000, and which keeps update information in case of updating the original document. The arrangement fashion buffer 7 is a buffer into which an arrangement fashion is called from an arrangement fashion file 21 in case of updating the arrangement fashion. The original document updating area 8 is a working area which serves to generate an original document after the updating on the basis of the original document before the updating and the update information that are contained in the buffer 6. The arrangement fashion updating area 9 is a generating area which generates an arrangement fashion after the updating on the basis of the arrangement fashion before the updating in the buffer 7, the updated original document in the area 8, and the original document and update information in the buffer 6 when it has become necessary to update the arrangement fashion. The arrangement composing buffer 10 is a buffer in which the composition of arrangement fashions registered in a storing area 17 is stored when the registered arrangement fashions are properly composed to arrange the original document.

Documents are stored in a documents storing area 13 which is included in the file storage 2000. Numeral 14 denotes a document name table which stores the list of the names of the documents, and the respective elements of which appoint document files 15*, concretely 15A, 15B, 15C . . . (in a case where which of these document files is appointed is not specified, the No. of the unspecified document file is expressed by "15*"). The construction of each document file will now be described by taking the document file 15A as an example.

The document file 15A is configured of the original document storing area 16A for storing the original document, and an arrangement fashion storing area 17A for storing the arrangement fashions of the original document, a pointer 90 being interposed between both the storing areas. The storing area 16A has such a structure that a pointer 91 points a matter part 41A which stores the array of the code examples of the original document, a form part 42A which stores form definitions such as the arrays of the character fonts and character types of the original document, and a meta-information part 43A which stores meta-information items such as the person and date of the generation of the original document. The storing area 17A is constructed of an arrangement name table 20A, and arrangement fashion files 21A and 22A appointed by the respective elements of the table 20A. The arrangement fashion file 21A has such a structure that a pointer 93 points a direct information part 31A which stores information as to a concrete fashion for arranging the original document, and a meta-information part 32A which stores meta-information items such as the person and date of the generation of the arrangement fashion. This holds true also of the other arrangement fashion file.

An update influencing completion sign 300A in the table 20A is a tag which expresses, when the original document in the storing area 16A has been updated, whether or not the updates are completely influenced on the contents of the respective arrangement fashion files.

Regarding that element in the table 20A whose update influencing completion sign 300A has a value "0", the content of the corresponding arrangement fashion file is completely updated. In contrast, regarding the element whose update influencing completion sign 300A has a value "1", the content of the corresponding arrangement fashion file is not completely updated.

A knowledge base 12 stores rules for the updates of the arrangement fashions incidental to the updates of the original document.

Referring now to FIGS. 9A1 and 9A2, the document file 15A will be described in detail. This figure shows the content of the document file 15A in the status in which the original document (hereinbelow, called "Document A") in FIG. 15a and the meta-information thereof, and the arrangement fashions in FIG. 15b are registered.

First, the Document A is stored in the matter part 41A and form part 42A which are pointed by the pointer 91 via the pointer 90. The matter part 41A contains the sort of a text code ("KK" expressive of the KEIS code) and a concrete code train ("A1A1" and "A3C9"). The form part 42A is configured of a form element table 50A which stores elements for determining the form of the document, such as a character type (for example, the Gothic type or the Ming type) and a character size (font No.), and "form element specifications" which are appointed by the respective elements of the table 50A. By way of example, the first element of the table 50A appoints the form element specification 340, and the second element the form element specification 341. The "form element specification" is obtained in such a way that a prototype conforming to the code train of the original document expressed by the matter part 41A is generated, whereupon values expressive of the forms of corresponding places in the original document are set every unit.

Besides, the meta-information concerning the Document A is stored in the meta-information part 43A. The information items stored in the meta-information part 43A are, for example, that the author of the Document A is "Star", that the date of the generation of the document is "May 1, 1985" and that persons permitted to refer are all people ("ALL").

Next, the arrangement fashions shown in FIG. 15b are stored in the arrangement fashion storing area 17A as two arrangements whose names in the arrangement name table 20A are "View 1" and "View 2". The arrangement fashion file 21A appointed by the arrangement name "View 1" stores the arrangement fashion that the desired places of the document A are underlined and commented on, while the arrangement fashion file 22A appointed by the arrangement name "View 2" stores the arrangement fashion that the desired words of the Document A are given their meanings.

The file 21A is configured of the direct information part 31A and the meta-information part 32A between which the pointer 93 is interposed. In the file 21A, the direct information part 31A is constituted by a sub arrangement table 51A in which the arrangement fashions of the respective parts of the original document are put together as to the respective kinds thereof, and "sub arrangement specifications" which are appointed by the respective elements of the table 51A.

The first element of the table 51A has the element name of "Property 1", and it appoints the sub arrangement specification 335 which expresses all the comments made on the Document A and the places corresponding thereto. The second element of the table 51A has the element name of "Property 2", and it appoints the sub arrangement specification 336 which expresses all the underlines drawn in the Document A and the places corresponding thereto.

Likewise to the "form element specification" stated before, the "sub arrangement specification" is obtained in such a way that a prototype is generated in accordance with the code train of the original document, whereupon a corresponding value is set every character. By way of example, in the sub arrangement specification 335, the values of places "4, 5, 6, 7, 8, ..." corresponding to the passage 401 in FIG. 15a are set at a value "C" expressive of the "comment", and a detailed matter part 521 in which the comment 404 (FIG. 15a) is stored as detailed information is appointed since the first place "4" mentioned above. Here, the places "5, 6" in the sub arrangement specification 335 correspond respectively to places "5, 6" in the matter part 41A. Those places of the sub arrangement specification 335 which correspond to the places of the Document A not commented on are all blank. Similarly, regarding the sub arrangement specification 336, the values of places "4, 5, 6, 7, 8 ..." corresponding to the passage 401 in FIG. 15a are set at a value "L" expressive of the "underline", and those places of the sub arrangement specification 336 which correspond to the places of the Document A not underlined are all blank. In the file 21A, the meta-information part 32A stores the meta-information on the arrangement "View 1", for example, the information items that the author of the View 1 is named "Aoki", that the date of the generation of the View 1 is "October 2, 1987" and that a person permitted to refer to it is named "Shiraishi".

The file 22A has an internal construction similar to that of the file 21A. More specifically, the file 22A is configured of a direct information part 33A and a meta-information part 34A between which a pointer 858 is interposed. In this file 22A, the first element of a sub arrangement table 52A has the element name of "Property 1", and it appoints a sub arrangement specification 337 which expresses the meanings of all desired words affored to the Document A and places corresponding thereto. The value of that place of the sub arrangement specification 337 which corresponds to, for example, the place 402 in FIG. 15b is set at a value "M" expressive of "meaning", and those places of the sub arrangement specification 337 which correspond to places not endowed with the meanings of words are all blank. Also in the file 22A, the meta-information part 34A stores the meta-information on the arrangement "View 2", for example, the information items that the author of the View 2 is named "Aoki", that the date of generation is "October 5, 1987" and that persons permitted to refer to it are named "Shiraishi and Akagawa".

Figure 1B:
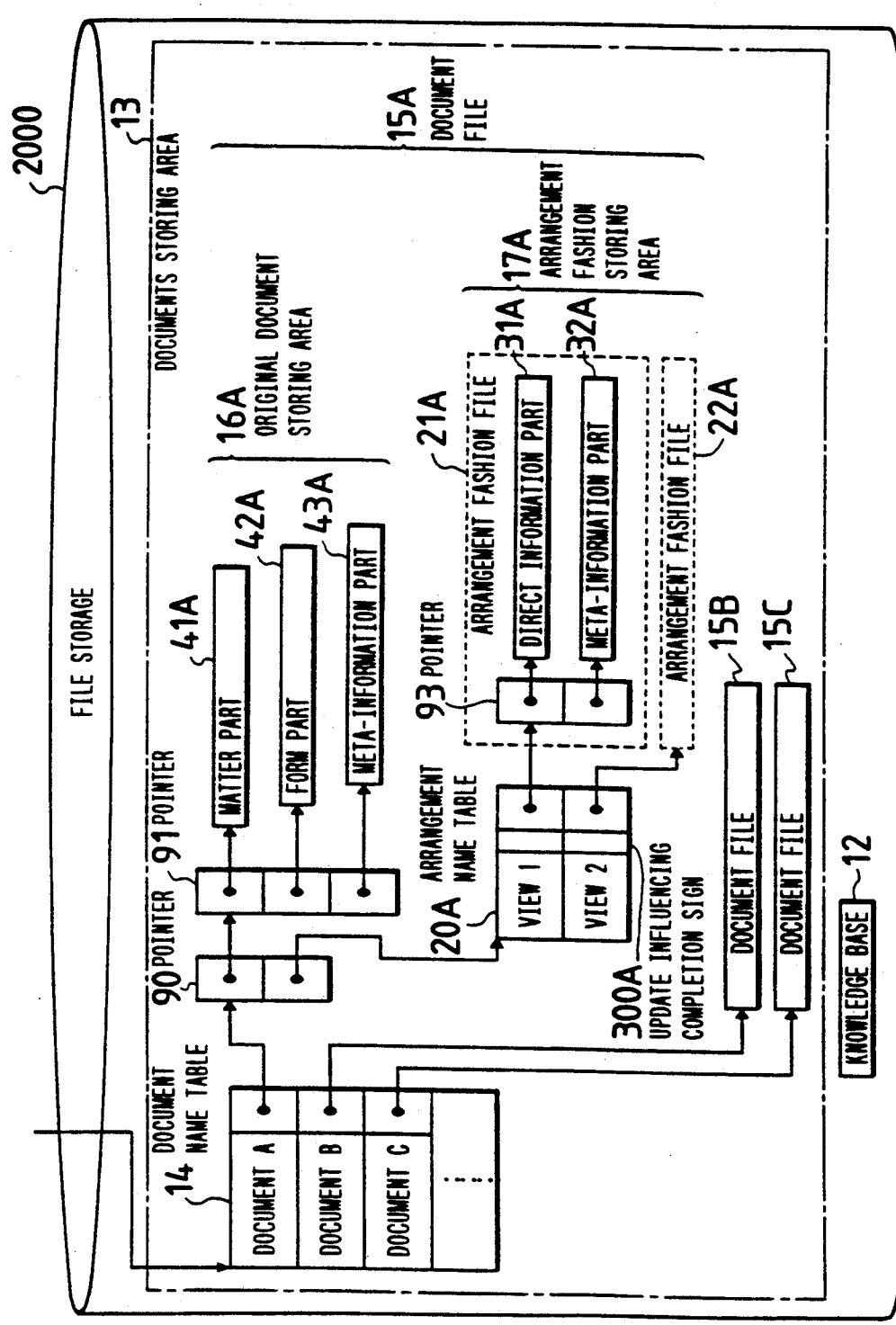

Incidentally, each of update influencing completion signs 301A and 302A is as described on the update influencing completion sign 300A with reference to FIGS. 1A and 1B.

B. Operation of Documents managing program 4:

Now, the operation of the documents managing program 4 will be described following interface examples in FIGS. 11a-14h and FIGS. 24a-24h with reference to general flow charts in FIGS. 17A1-17C2, partial detailed flow charts in FIGS. 18a-18e, FIGS. 19a-19b, FIGS. 20A1-20b, FIGS. 21a-21d, FIGS. 22A1-22B2 and FIGS. 23a-23b, and the system architecture diagram in FIG. 1.

B.1 Register Arrangement (1):

First, in conjunction with the interface examples in FIGS. 11a-11h, there will be described a case where the user named "Aoki" registers the arrangement of the original document that "comments and underlines are given to desired places" illustrated in FIG. 15a. It is assumed that the original document (Document A) in FIG. 15a has been stored as one document file 15A (FIGS. 1A and 1B) beforehand via a flow from an input awaiting state (50) to the generation and registration of a new document (530) as illustrated in FIGS. 17A1 and 17A2. More specifically, in the document file 15A, the original document storing area 16A is in the status in which the Document A is stored as shown in FIGS. 9A1 and 9A2, while the arrangement fashion storing area 17A is NILL. In the original document storing area 16A shown in FIGS. 9A1 and 9A2, the matter part 41A stores the text code trains and control signals (for new paragraphs, new pages, etc.) of the Document A. For example, "KK" in the figure is a symbol expressive of the start of the KEIS code, and "A1A1" and "A3C9" are concrete text codes. In addition, the form part 42A stores the forms of the Document A by means of the form element table 50A which stores elements determining the forms of the original document such as character types and character sizes, and the form element specifications which the respective elements indicate. For example, in the figure, the character type "Ming type" is held in correspondence with numeral "1", and the character size of the Document A is denoted by numeral "6", thereby to express that 4 letters from the beginning of the Document A are of "the Ming type of Size-6". Besides, the meta-information part 43A stores such information items that the author of the Document A is "Star", that the date of generation is "May 1, 1985" and that person(s) permitted are "all people (ALL)".

When a request for calling the Document A is input from the keyboard 1 or the mouse 2 in the input awaiting state (50), the program 4 analyzes the input content (51). Via a decision (51a) to the effect that the input content is not a request for ending the handling of a document, the program 4 decides (52) to the effect that the input content is the request for calling the original document, and it allots (52a) one-document working area 111 being currently usable to the work of the Document A.

At the step 52a, the one-document working areas 11* (namely, 111, 112 and 113) are held in one-to-one correspondence with documents being worked. Accordingly, when two documents have been called out and are being simultaneously worked by way of example, two of the one-document working areas 11* (for example, 111 and 112) come into use.

Subsequently, the program 4 copies the direct information on the document A, namely, the matter part 41A and form part 42A in the original document storing area 16A, into the original document buffer 6 and clears the original document updating area 8, arrangement fashion updating area 9, arrangement fashion buffer 7 and arrangement composing buffer 10 (refer to FIGS. 1A and 1B for the above), and it opens a document window 70 to present the Document A 400 and opens another window 71 to present the menu 555 (FIGS. 1A and 1B) as illustrated in FIG. 11a (these operations are effected by a step 54).

Since the document handling menu 555 includes the arrangement handling menu 551 on the arrangement of the original document as shown in FIGS. 1A and 1B, this arrangement handling menu 551 is presented on the window 71 also in FIG. 11a. Here, the handling items of the user expressed by "Refer to update influencing state", "Register arrangement", "Execute arrangement" and "Update arrangement" in the arrangement handling menu 551 correspond to the steps of the program 4 having the same names, that is, steps 64a, 65, 67 and 69 shown in FIGS. 17C1 and 17C2, respectively. These are featuring steps in the present invention, and will be successively described later.

Figure 2A:
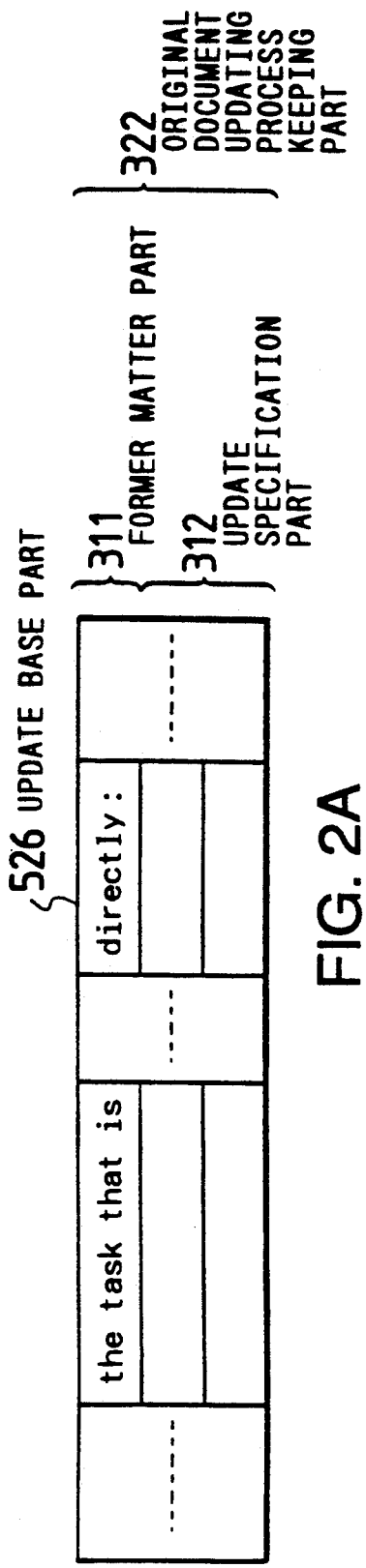
FIGS. 2a-2b are diagrams showing the change of the contents of an original document buffer (6) before and after the updates of an original document.

By the way, in copying the matter part 51A of the original document storing area 16A into the original document buffer 6 at the aforementioned step 54, this matter part is put into a form shown in FIG. 2a in preparation for updating the original document. In FIG. 2a, a former matter part 311 corresponds to the matter part 41A, and an update specification part 312 is a part for storing the update specification of the original document as will be stated later and is initialized into blanks.

Figure 19B:
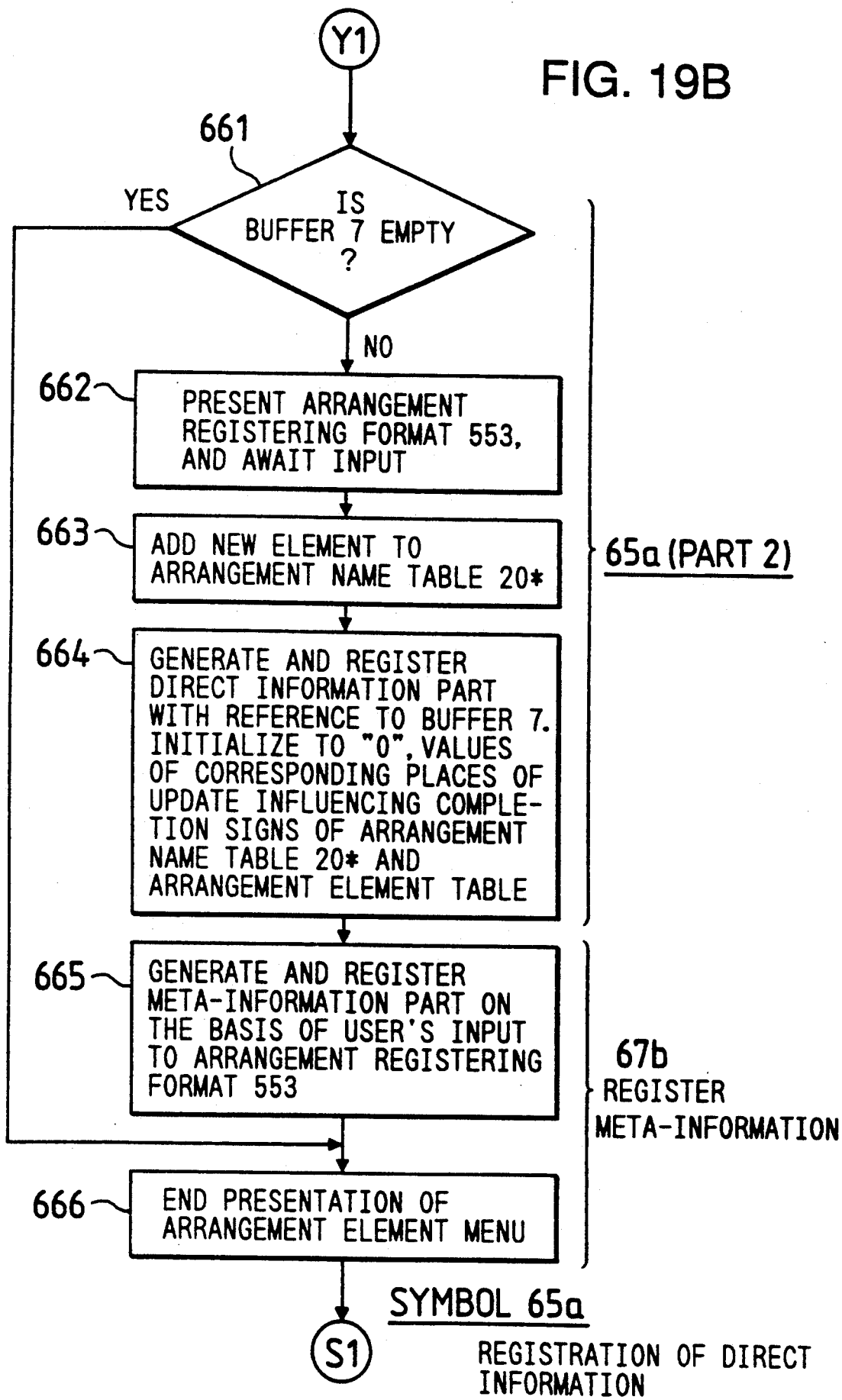
Figure 21A:
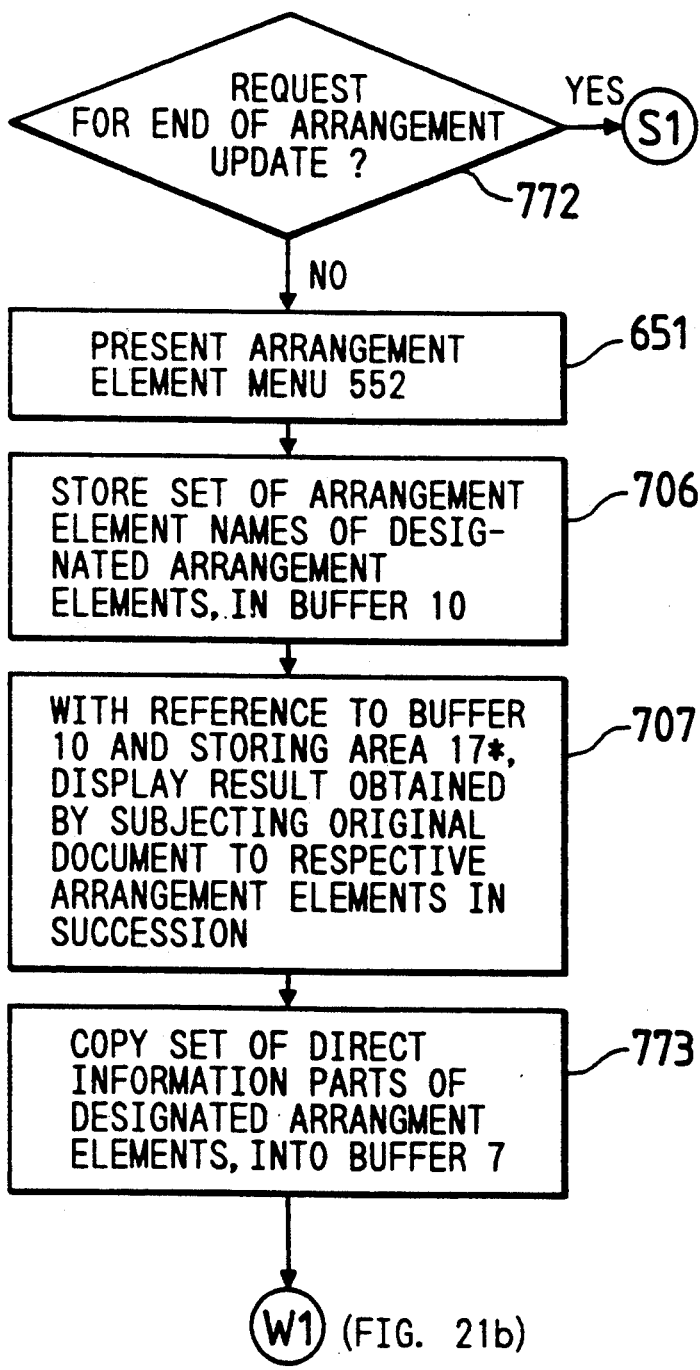
Figure 21D:
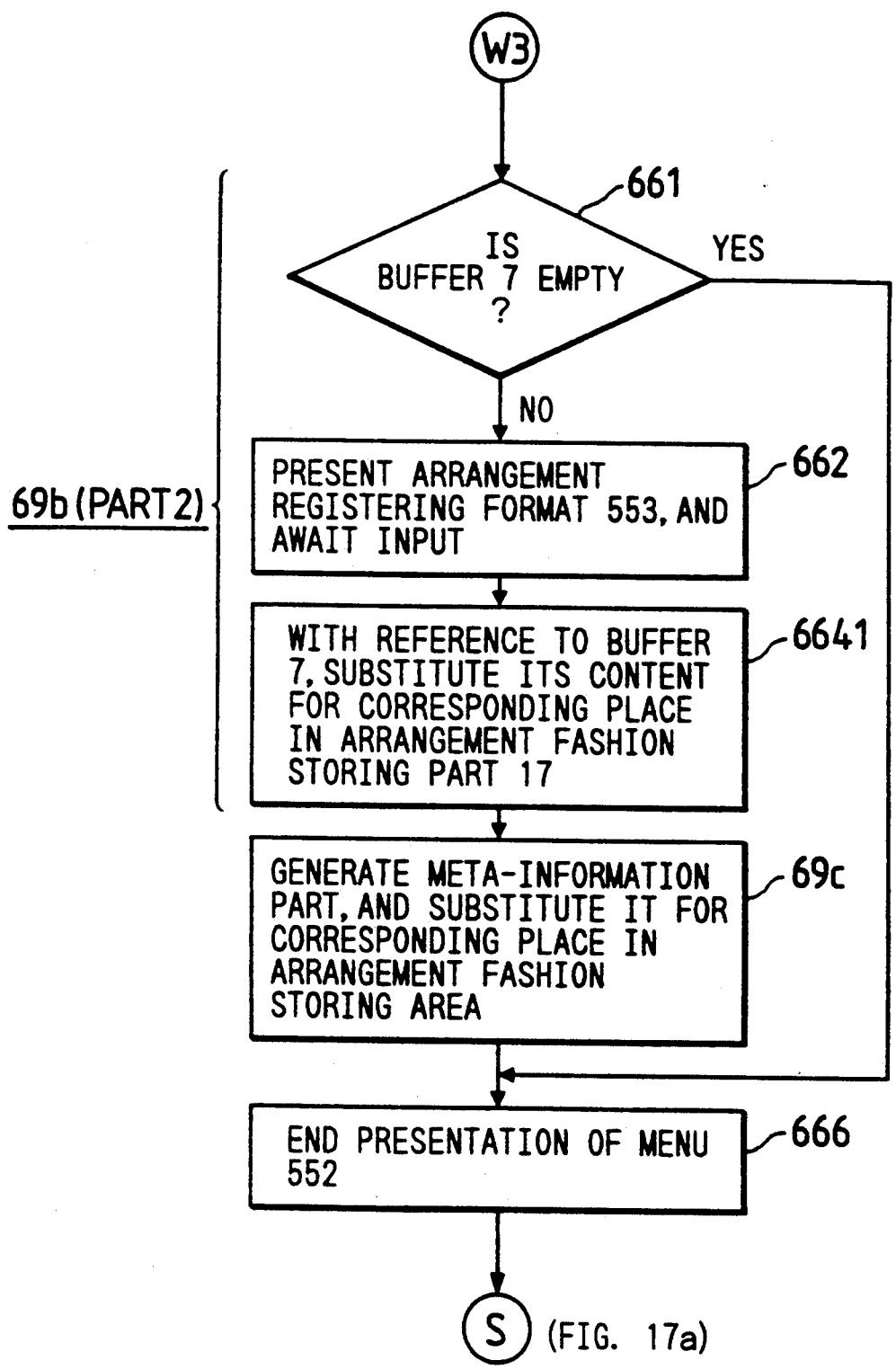

When, in an input awaiting state (55), the user selects the "register arrangement" from the arrangement handling menu 551 with the mouse 2 as illustrated in FIG. 11a, the program 4 analyzes (56) the input content and decides to the effect that "register arrangement" has been requested (decision 57, decision 60 and decision 61), and it executes the step 65 (register arrangement) consisting of a series of substeps. The detailed flow of the step 65 is shown in FIGS. 19a and 19b.

The selected handling item, the "register arrangement" proceeds in such a way that the user successively performs the operations of "selecting desired places from within the original document and bringing accessory information items, such as comments and underlines, into correspondence with the places". The expression "bringing the information items into correspondence" is to designate the kinds of elements necessary for arranging the original document, such as comments and underlines, and if necessary, detailed information items such as the concrete contents of the comments. As the step 65, therefore, the program 4 first presents (651) the arrangement kind menu 552 for letting the user select the kind of the element necessary for the arrangement of the original document, in such a way that the window 71 which is presenting the document handling menu 555 is shut, while a window 72 is opened instead as illustrated in FIG. 11b.

Figure 11C:
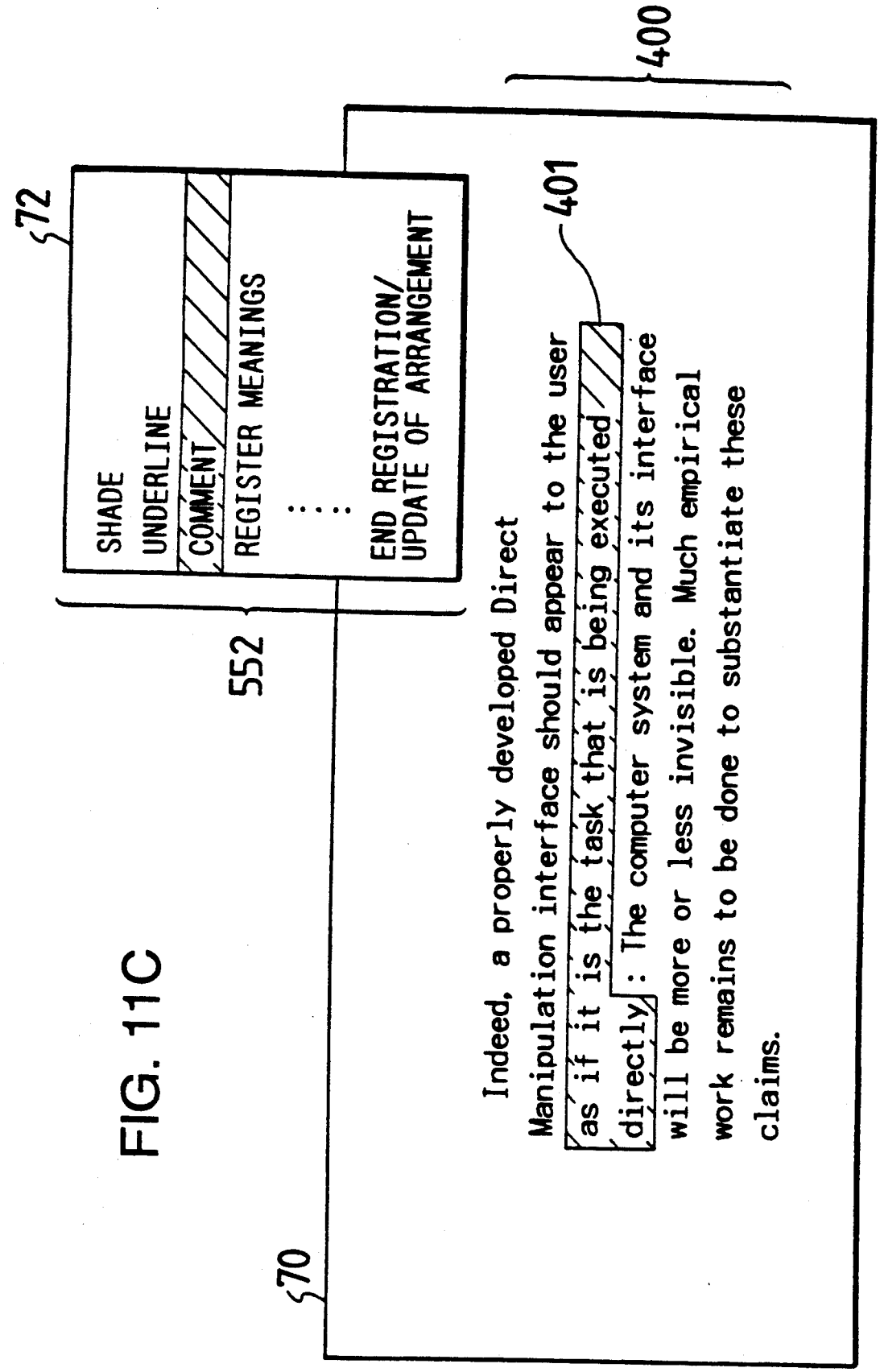

Thereafter, in an input awaiting state (652), the user selects the place to-be-commented-on 401 from within the Document A and selects "comment" from the arrangement kind menu 552 with the mouse 2 as illustrated in FIG. 11c. Then, the program 4 executes a step 669 to be now described, via a decision 653 to the effect that the end of the register arrangement is not requested and a decision 654 to the effect that the "register arrangement" is started anew. At the step 669, the prototype of the sub arrangement specification 335 is generated in the arrangement fashion buffer 7 with reference to the original document in the buffer 6 and in conformity with the code train thereof (having been copied from the matter part 41A shown in FIGS. 9A1 and 9A2). This prototype has had its whole content initialized into blanks. Next, in the sub arrangement specification 335, a place corresponding to the place 401 in the Document A (FIG. 11c) is first set to the value "C" expressive of "comment", and the other places are left blank (657).

The sub arrangement "comment" is significant for the first time when the two conditions of "on where" and "with what content" have become complete. Here, since the former of the conditions has been processed, the program 4 subsequently requires the latter, namely, the detailed information on "what content" to be registered.

Figure 11D:
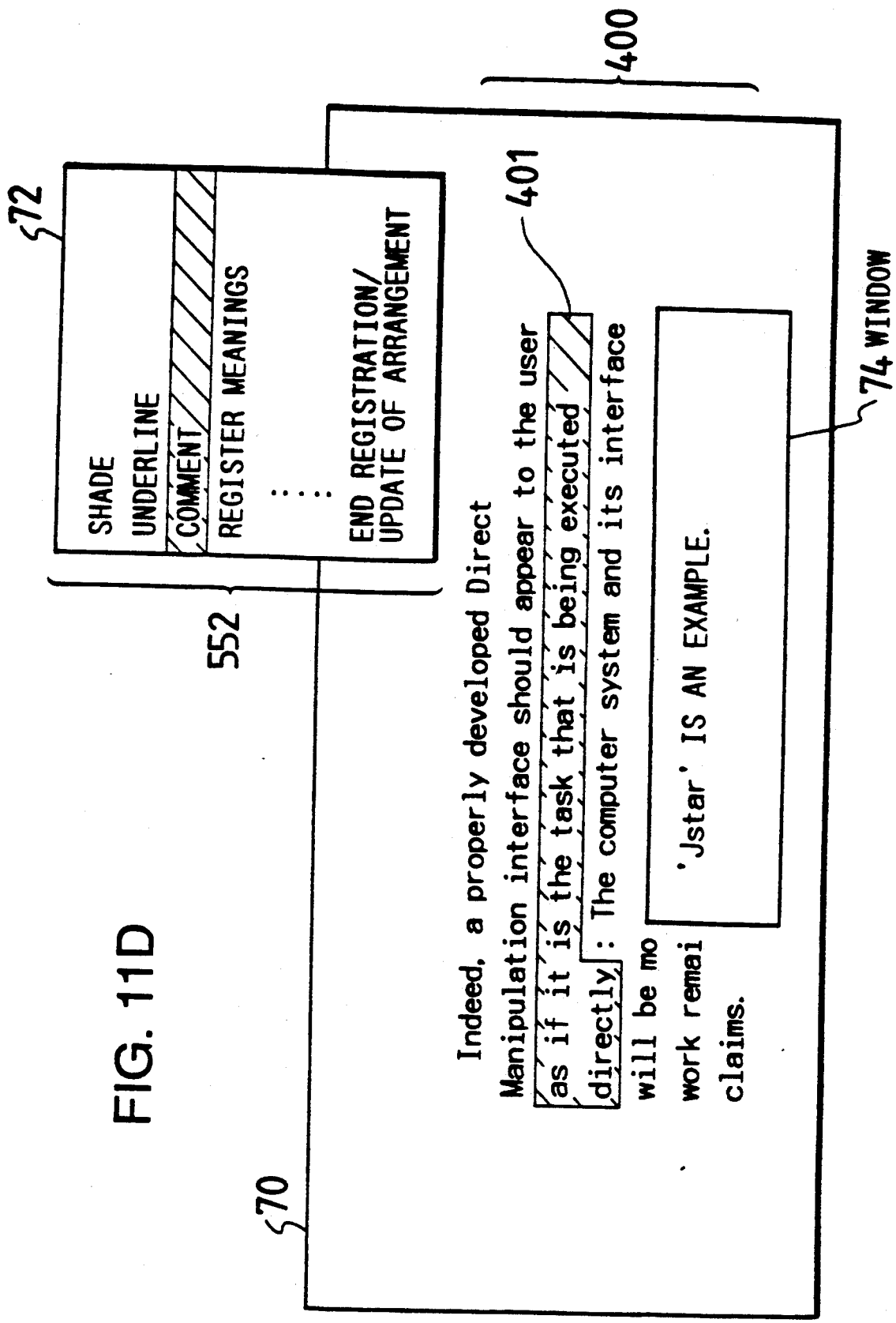

Therefore, via a decision 658 to the effect that the detailed information is required, the program 4 opens a detailed information inputting window 74 and establishes an input awaiting state (659). Subsequently, when the user inputs the concrete comment content from the keyboard 1 onto the detailed information inputting window 74 as illustrated in FIG. 11d, the program 4 stores the content of the comment into the sub arrangement specification 335 in the arrangement fashion buffer 7 (660).

An aspect in which values and detailed information are stored in the sub arrangement specification 335 within the arrangement fashion buffer 7 will be described later with reference to FIGS. 9A1 and 9A2.

Thus, the program 4 ends the process corresponding to the user's request that "the comments 404 is given to the passage 401 in the Document A (FIG. 15a)", and it initializes the document window 70 as shown in FIG. 11e and establishes the input awaiting state again (652).

It is assumed that the user subsequently wants to "underline the passage 401 in the Document A (FIG. 15a)".

In the input awaiting state (652), the user selects the place to-be-underlined 401 from within the Document A and the "underline" from within the arrangement kind menu 552 by the use of the mouse 2 as illustrated in FIG. 11f. Then, the program 4 executes a step 656 to be described below, via the decision 653 to the effect that the end of arrangement registration is not requested, the decision 654 to the effect that the arrangement registration is not started anew, and a decision 655 to the effect that the kind "underline" of the designated sub arrangement has not already been issued. At the step 669 stated before, the prototype of the sub arrangement specification for registering the "comment" has been generated in the buffer. Here at the step 656, the same prototype is generated for registering the "underline" and has its whole content initialized to be blank, and it is added in a list structure to the "comment" registering sub arrangement specification 335 in which the values and detailed information are stored. Subsequently, the program 4 sets those places of the prototype of the "underline" registering sub arrangement specification 336 which correspond to the passage 401 in the Document A, to a vlaue "L" expressive of the "underline", the other places being left blank (657). Next, the program 4 establishes the input awaiting state (652) again via the decision 658 to the effect that detailed information is not required. In this manner, the program 4 stores the values and detailed information into the corresponding sub arrangement specifications of the arrangement fashion buffer 7 as the user successively performs the operations of "selecting the desired places in the Document A and selecting the sub arrangements to be given thereto, from within the arrangement kind menu 552, and further inputting the detailed information if necessary".

Figure 11G:
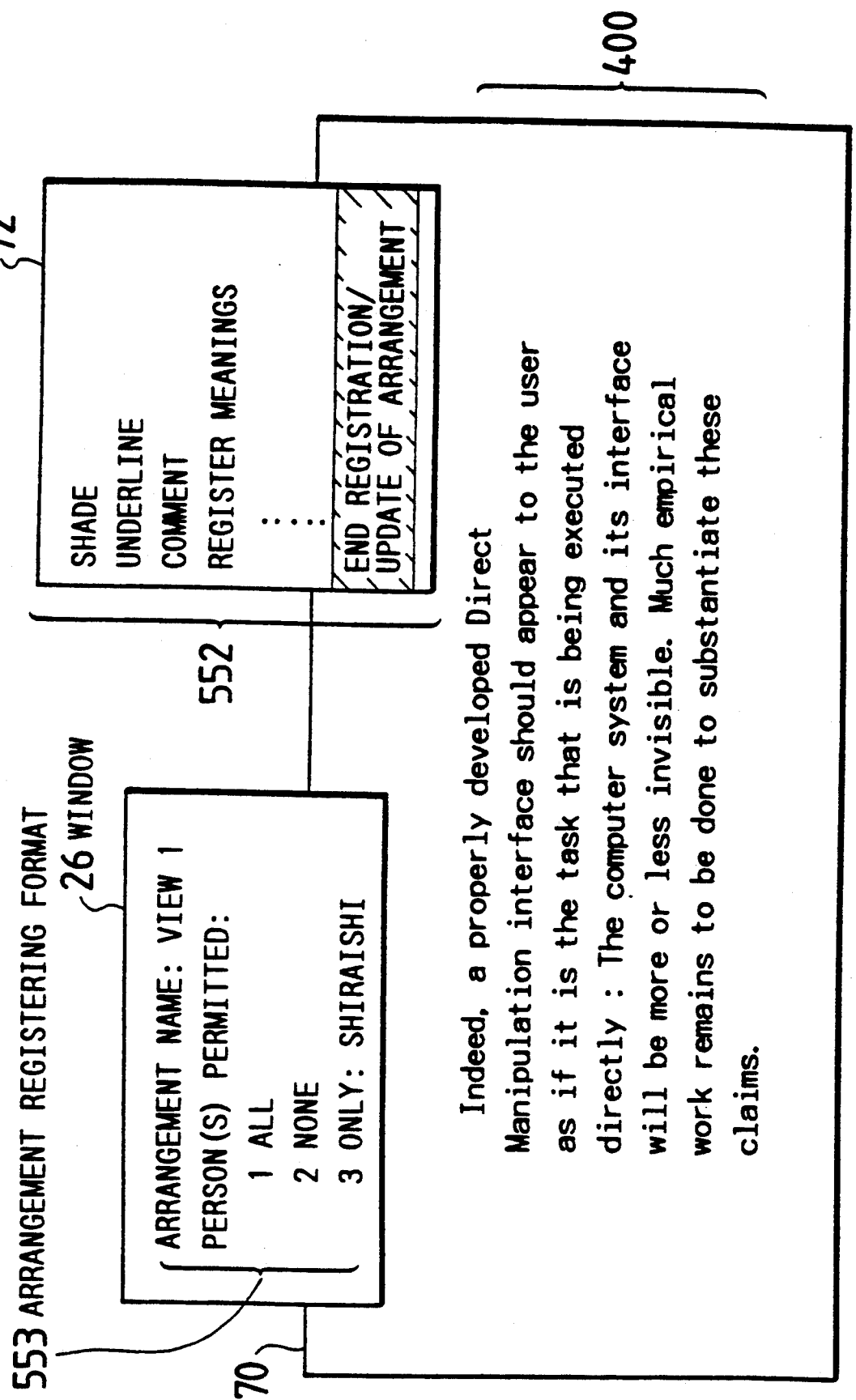

It is now assumed that the user has registered the comment and underline in correspondence with the desired place 401 of the Document A and wants to end the registration of the arrangement. In the input awaiting state (652), the user selects the "end the registration of arrangement" from within the arrangement kind menu 552 as shown in FIG. 11g. Then, via the decision 653 (FIG. 19a) to the effect that the end of arrangement registration is requested, and a decision 661 (FIG. 19b) to the effect that the buffer 7 is not empty, the program 4 opens a window 26 and presents the arrangement registering format 553 (within the menu storing area 5 in FIGS. 1A and 1B) as shown in FIG. 11g, thereby to establish an input awaiting state (662). In order to protect secrecy, the arrangement registing format 553 (FIG. 11g) has a part where the user inputs the person(s) permitted for the arrangement to-be-registered.

In the input awaiting state (662), the user puts the arrangement name "View 1" and the person permitted "Shiraishi" into the arrangement registering format 553 as illustrated in FIG. 11g. Then, as shown in FIGS. 1A and 1B, the program 4 generates the arrangement name table 20A within the arrangement fashion storing area 17A having been in the NILL state and stores the arrangement name "View 1" therein (663), and it generates and registers the direct information part 31A on the basis of the list of the "comment" registering and "underline" registering sub arrangement specifications generated in the arrangement fashion buffer 7. At this point of time, the arrangement name table 20A in FIGS. 1A and 1B has only the element of "View 1".

The content of the registered direct information part 31A is as indicated in FIGS. 9A1 and 9A2. First, the sub arrangements which correspond to the comment registration and the underline registration are registered in the sub arrangement table 51A. In the sub arrangement table 51A, "Property 1" and "Property 2" are sub arrangement names which the program 4 has automatically given for management. The "comment" and "underline" are the kinds of the sub arrangements, and the respective sub arrangements appoint the sub arrangement specifications which store the registered contents of the corresponding sub arrangement kinds. By way of example, the sub arrangement specification 335 is one which has been generated in the arrangement fashion buffer 7 as the comment registering process and in which the values and detailed information of the comment are stored. In the arrangement specification 335, the upper stage serves to store that passage in the original document as to which the comment is to be registered. The values of parts corresponding to the passage 401 (FIG. 11d) in the Document A are set to the value "C" expressive of the "comment", whereas the values of parts as to which no comment is to be registered are left blank. On the other hand, the lower stage serves to store the concrete matter of the comment, and a detailed matter part 521 which stores the concrete comment matter is appointed from the head of those places of the upper stage which have the value "C". Incidentally, the sub arrangement specification appointed by the sub arrangement "Property 2" corresponding to the registration of the underline has a one-stage structure because it has no detailed information. Here, in the same manner as in the upper stage of the sub arrangement 335, the places corresponding to the passage 401 (FIG. 11d) in the Document A are set to the value "L" expressive of the "underline", and the other parts are left blank. Besides, the values of the update influencing completion sign 300A in the arrangement name table 20A and the update influencing completion sign 301A in the sub arrangement table 50A are set at initial values "0" (the above operations are performed at a step 664).

Thus, the program 4 ends the series of steps 65a (the registration of direct information). Subsequently, it generates and registers (67b (the registration of meta-information)) the meta-information part 32A (FIGS. 9A1 and 9A2) on the basis of the user named "Aoki", the permitted person named "Shiraishi" (FIG. 11g) put in the arrangement registering format 553, etc., and it ends the presentation of the arrangement kind menu 552 and shuts the pertinent window 72 (665). Then, it ends the series of steps 65 (the register arrangement) and establishes the input awaiting state (55) as shown in FIG. 11b.

By the way, although the secrecy management whose unit is the "arrangement" has been made in this embodiment, a still smaller unit such as the "sub arrangement" or the individual accessory information can also be adopted.

In the above, there has been described the case where the user named "Aoki" registers as the "View 1" the arrangement (FIG. 15a) of "affording the comments or underlines to the desired places of the Document A (affording both the comment 404 and the underline to the place 401)". With handling items similar to the above, the user can also register as "View 2" the arrangement (FIG. 15b) of "affording meanings to the desired words of the Document A (affording the meanings 405 to the words 402 and 403)". The arrangement fashion storing area 17A at the stage at which the arrangements "View 1" and "View 2" have been registered is as shown in FIGS. 1A and 1B, and the concrete content thereof is shown in FIGS. 9A1 and 9A2. As will be described in the "execute arrangement" (the step 67 in FIGS. 17C1 and 17C2) later, the user can subject the Document A to the registered arrangements properly. FIG. 15b illustrates the state in which the arrangements "View 1" and "View 2" have been simultaneously executed in the Document A. Incidentally, in the "register arrangement", the user can register the free composition of sub arrangements such as "comments", "underlines" and "meaning", in the form of one arrangement. Therefore, in the case where the Document A is to be arranged as shown in FIG. 15b by way of example, the composition of the "comments", "underlines" and "meaning" can also be registered as one arrangement from the beginning. To the contrary, even when the user has once registered the composition of the "comments", "underlines" and "meaning" as one arrangement for the Document A, he/she can select any (for example, the "comments" and "underlines") from among the sub arrangements constituting the arrangement and subject the Document A to only the composition of the selected sub arrangements (FIG. 15a).

B.2 Register Arrangement (2):

Next, in conjunction with the interface examples in FIGS. 12a-12g, there will be described a case where the user named "Shiraishi" generates as a derived document the material for publication "Document C" shown in FIG. 16b from the thesis "Document B" shown in FIG. 16a.

Figure 16B:
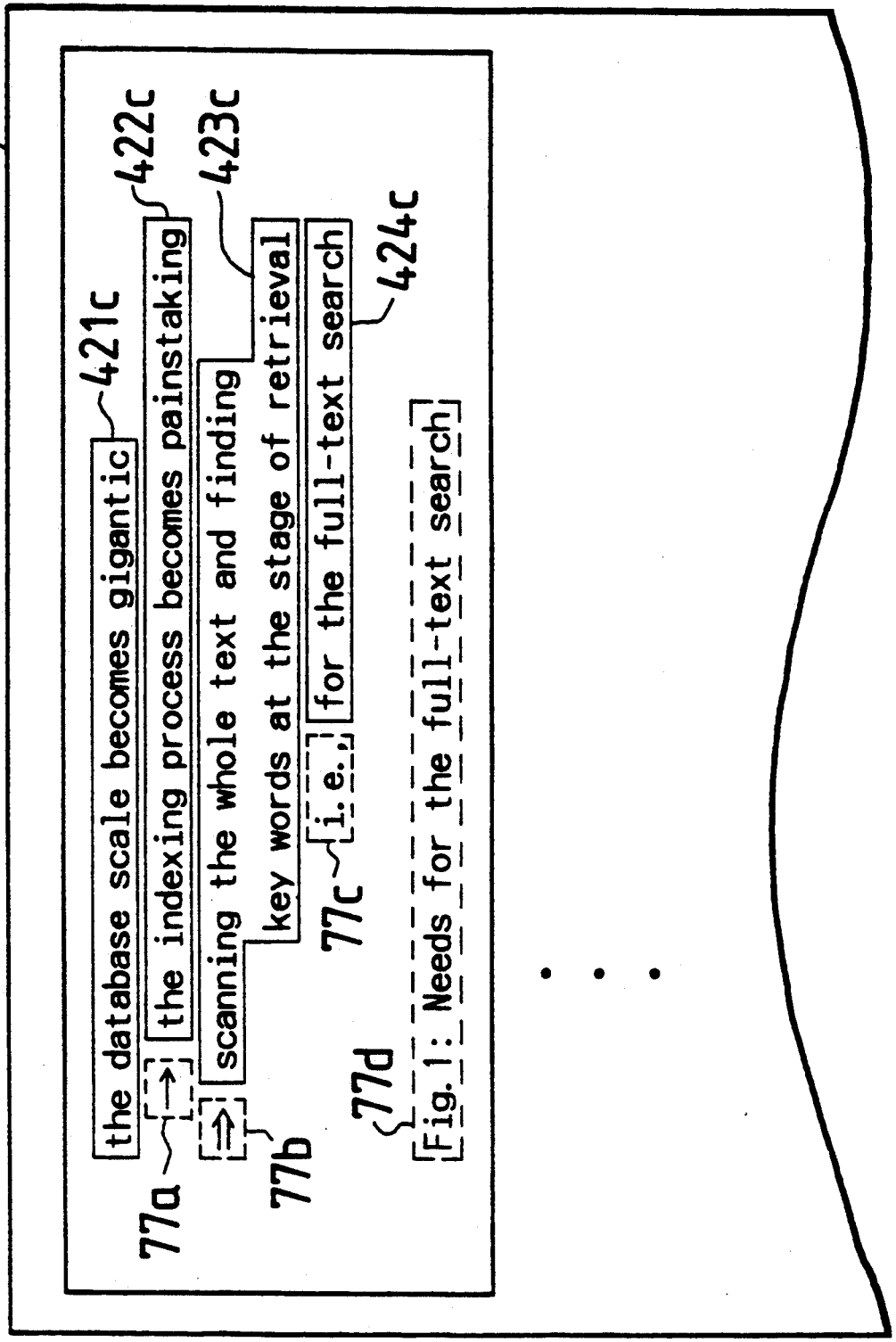
Figure 18A:
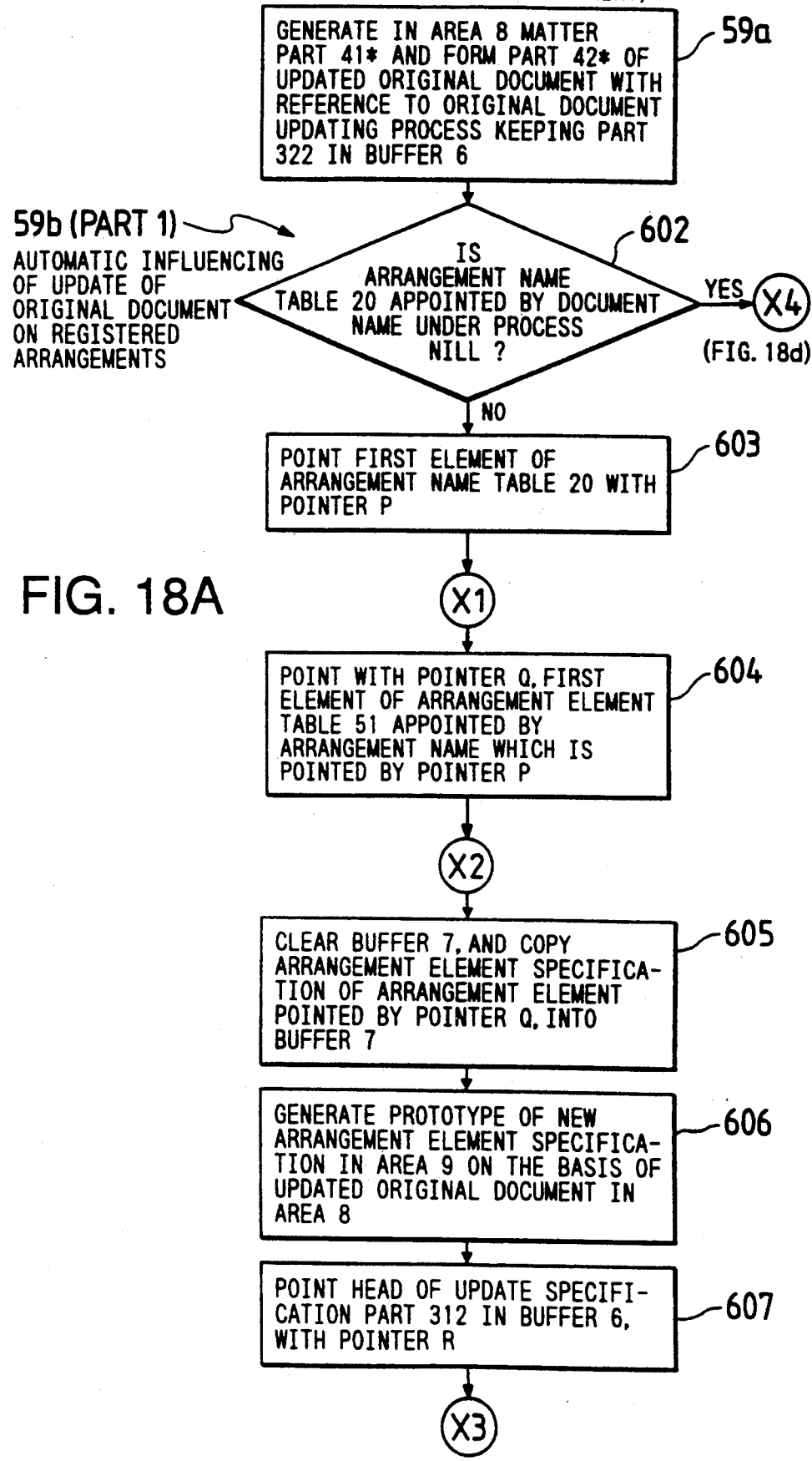
Figure 18C:
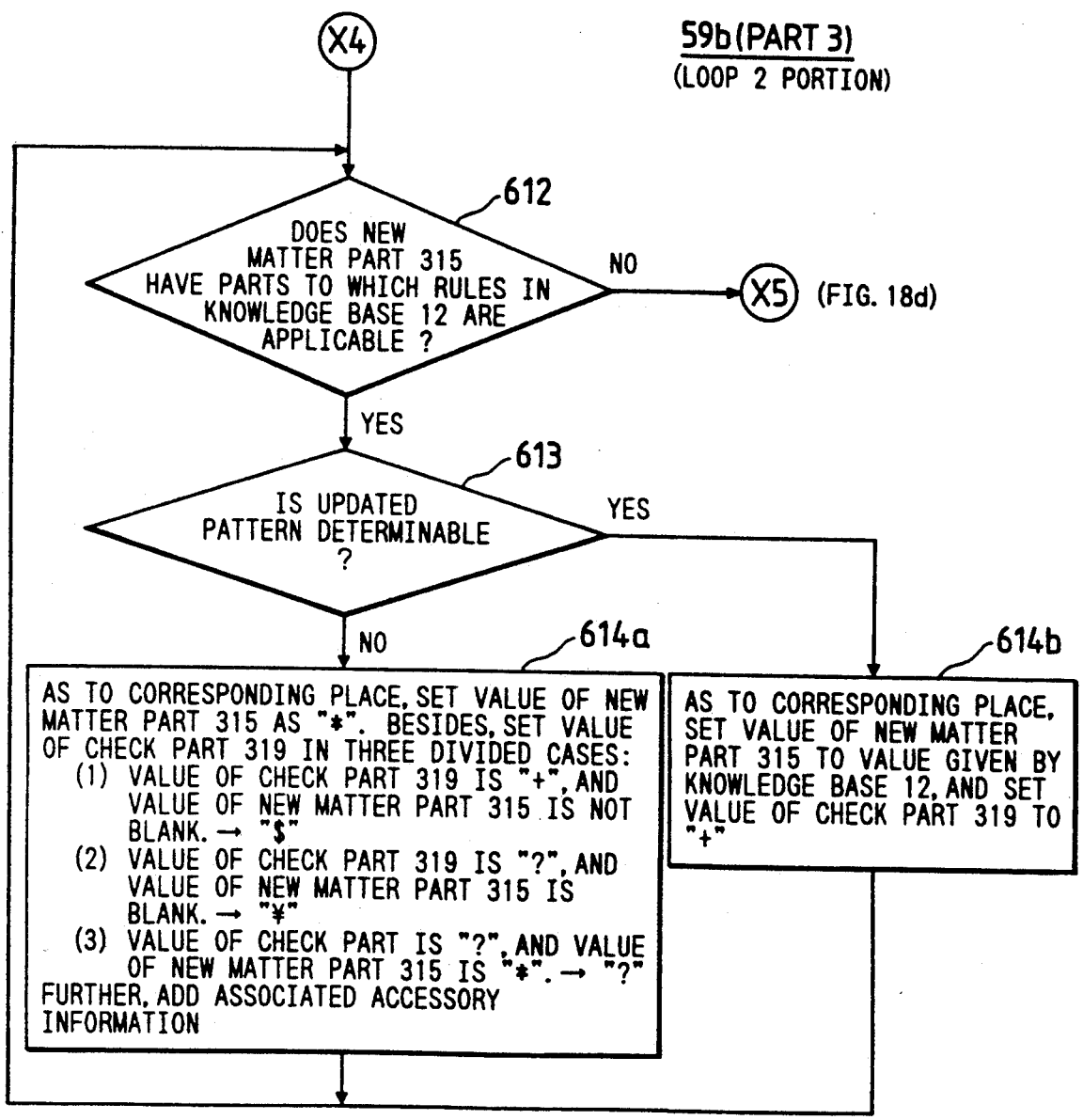
Figure 18E:
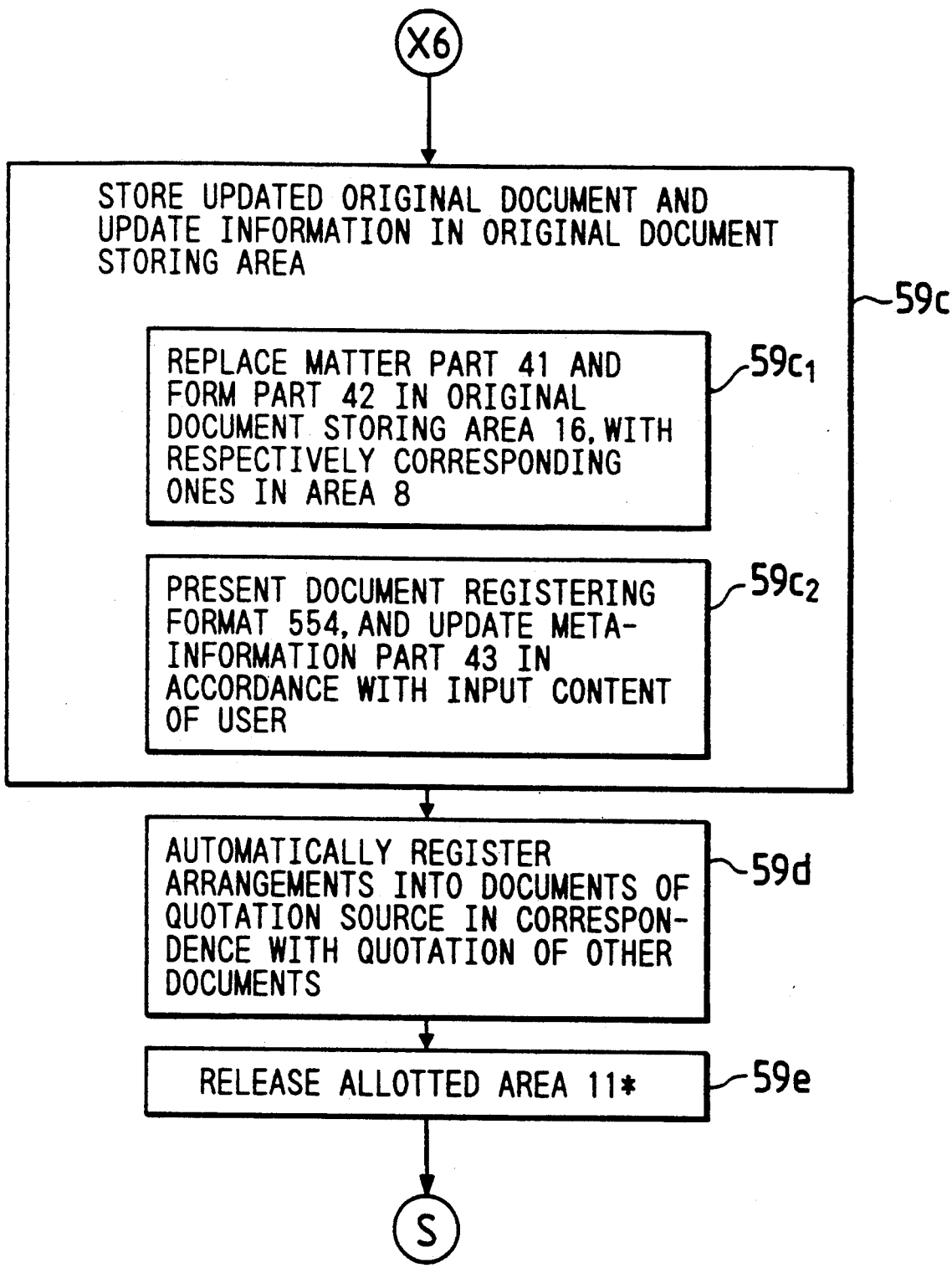

The places 421c, 422c, 423c and 424c in the Document C (FIG. 16b) have been respectively quoted from the places 421b, 422b, 423b and 424b in the Document B (FIG. 16a). By way of example, when a term "Sakuin-zuke (Japanese expression equivalent to indexing)" has been altered into "indexing" in the place 422b within the Document B, the same alteration needs to be done in the corresponding place 422c within the Document C.

As illustrated in FIGS. 16a and 16b, the Document C has been generated in such a way that, while the contents of the places 421c, 422c, 423c and 424c quoted from the Document B are held as the contents in the Document B, the layout of the Document B is changed, symbols and character strings 77a, 77b, 77c and 77d being input anew. In generating the Document C, accordingly, the user wants to perform the handling operation of "quoting desired places from the Document B already generated". Also, in referring to the Document B, he/she knows the derivation of the Document C therefrom and further wants to refer to the content of the Document C. The ensuing example will elucidate the management of a derived document in the present invention for complying with such requests. It is assumed that the Document B shown in FIG. 16a has been stored as one document file 15B (FIGS. 1A and 1B) beforehand via the flow from the input awaiting state (50) to the generation and registration of a new document (530).

Figure 9B:
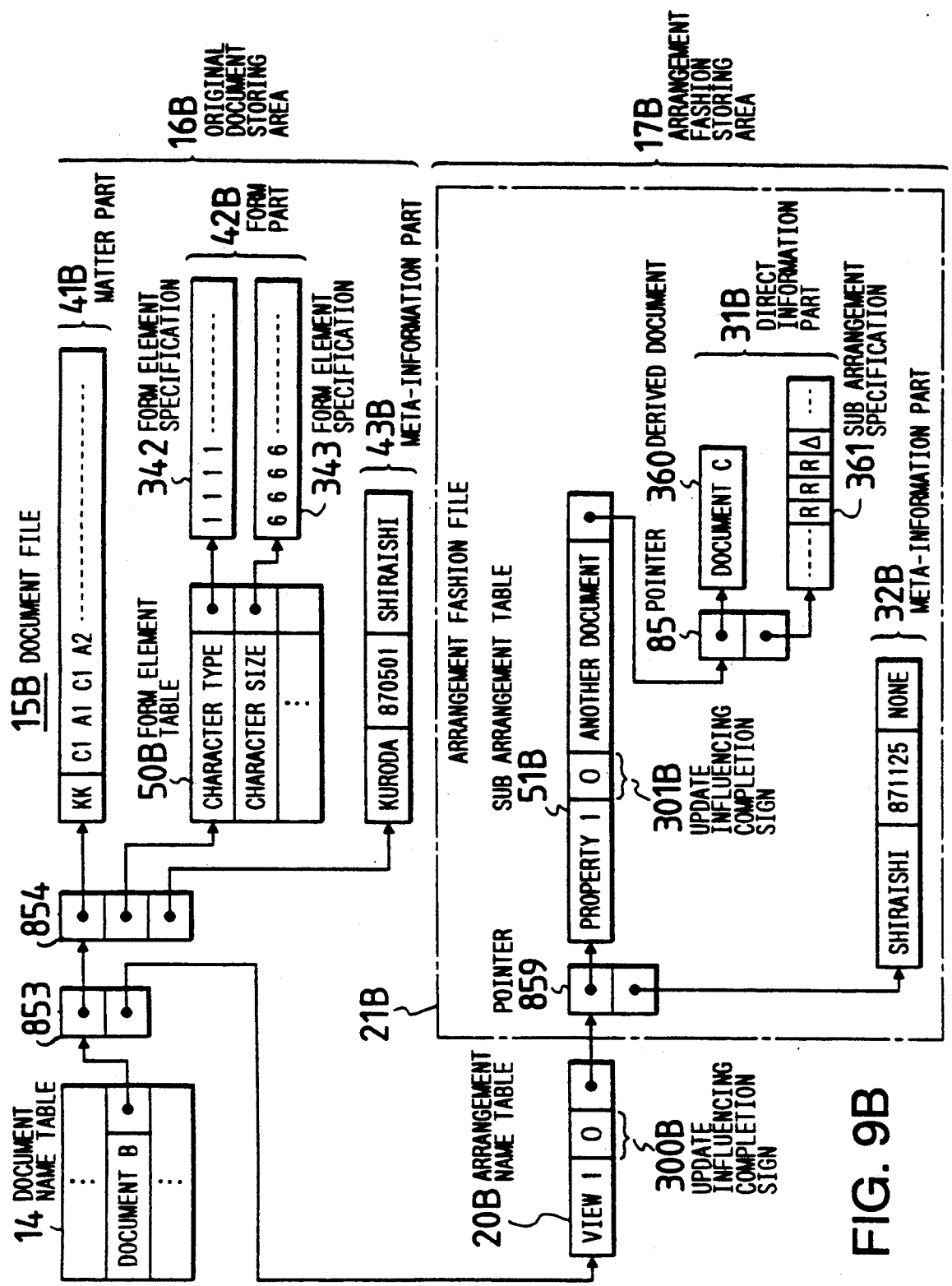

Although omitted from illustration in FIGS. 1A and 1B, the document file 15B has the same structure as that of the document file 15A, and it is configured of an original document storing area 16B and an arrangement fashion storing area 17B between which a pointer 853 is interposed, as shown in FIG. 9b. Further, the original document storing area 16B is constructed of a matter part 41B, a form part 42B and a meta-information part 43B among which a pointer 854 is interposed. Now, in the document file 15B, the original document storing area 16B stores the Document B as shown in FIG. 9b, and the arrangement fashion storing area 17B is NILL.

In the original document storing area 16B shown in FIG. 9b, the matter part 41B stores the text code trains and control symbols (for new paragraphs, new pages, etc.) of the Document B. For example, "KK" in the figure is a symbol expressive of the start of the KEIS code, and "C1A1" and "C1A1" are concrete text codes. In addition, the form part 42B stores the forms of the Document B by means of the form element table 50B which stores elements determining the forms of the original document such as character types and character sizes, and the form element specifications which the respective elements indicate. For example, the information that 4 letters from the beginning of the Document B are of "the Ming type of Size-6" is stored in such a way that the character type "Ming type" is held in correspondence with numeral "1" in the form element specification 342, and that the character size of the Document B is denoted by numeral "6" in the form element specification 343. Besides, the meta-information part 43B stores such information items that the author of the Document B is "Kuroda", that the date of generation is "May 1, 1987" and that a person permitted is "Shiraishi".

Figure 9C:
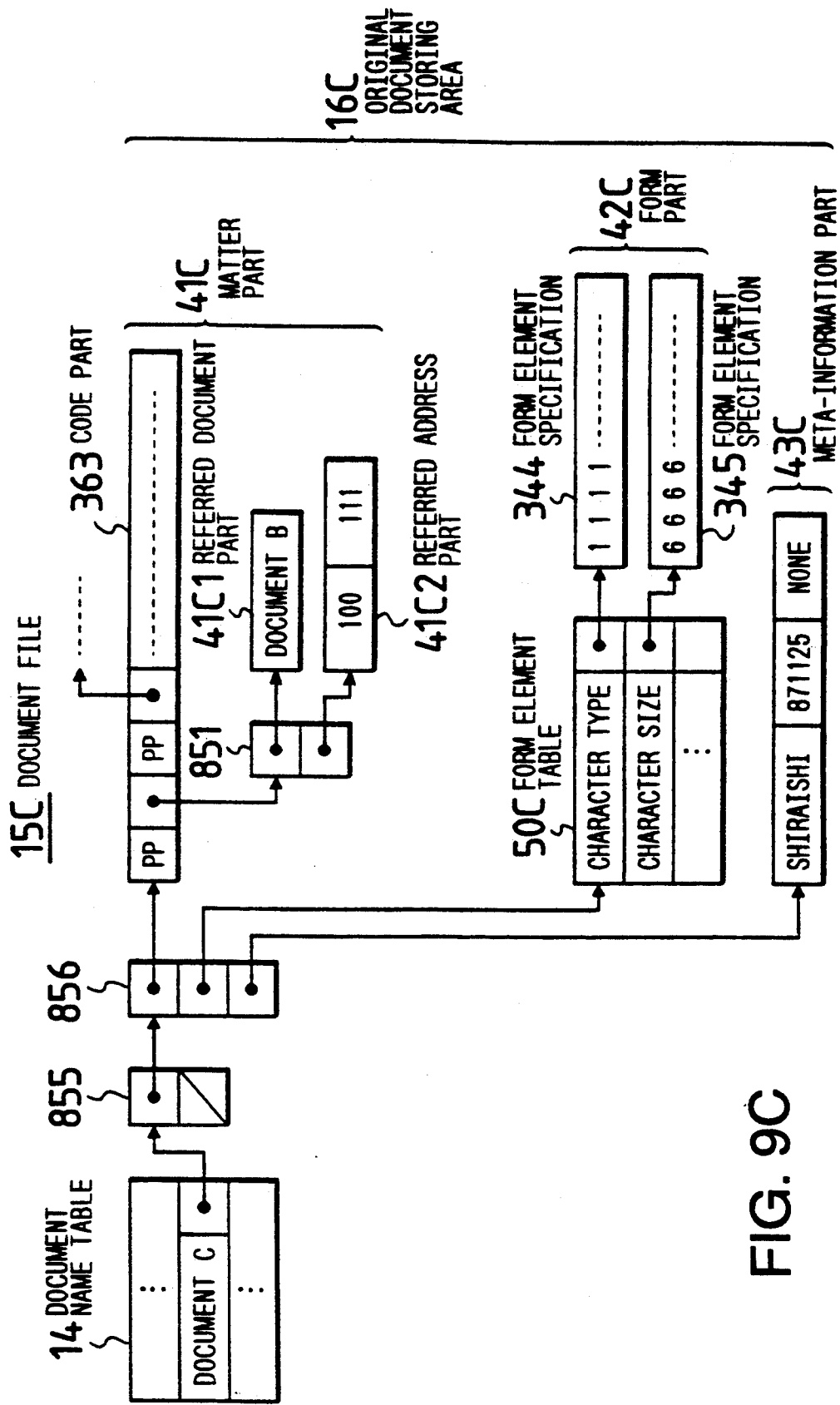
Figure 23A:
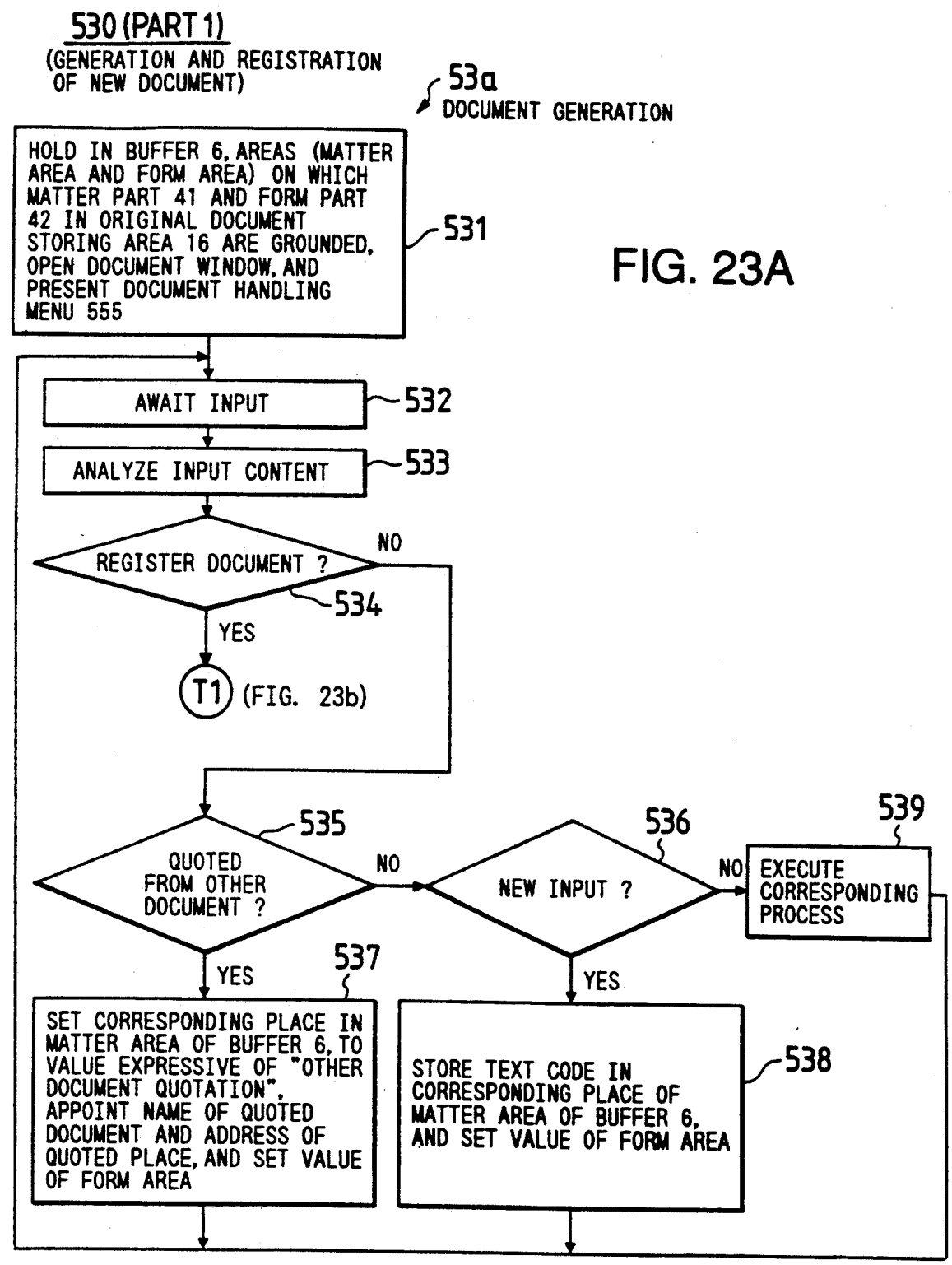

When a request for working a document anew is input from the keyboard 1 or the mouse 2 in the input awaiting state (50), the program 4 analyzes the input content (51). Via a decision (51a) to the effect that the input content is not a request for ending the handling of a document, the program 4 decides (52) to the effect that the input content is the request for calling the original document, and it allots (52a) one-document working area 111 being currently usable to the work of the Document A. Via the decision (52) and a decision (53) to the effect that the input content is a request for generating the new document, the program 4 generates and registers (530) the Document C (FIG. 9c). The allotment (52a) of the one-document working area has been described in the foregoing "register arrangement". The detailed flow of the series of steps 530 is illustrated in FIG. 23a.

Figure 12A:
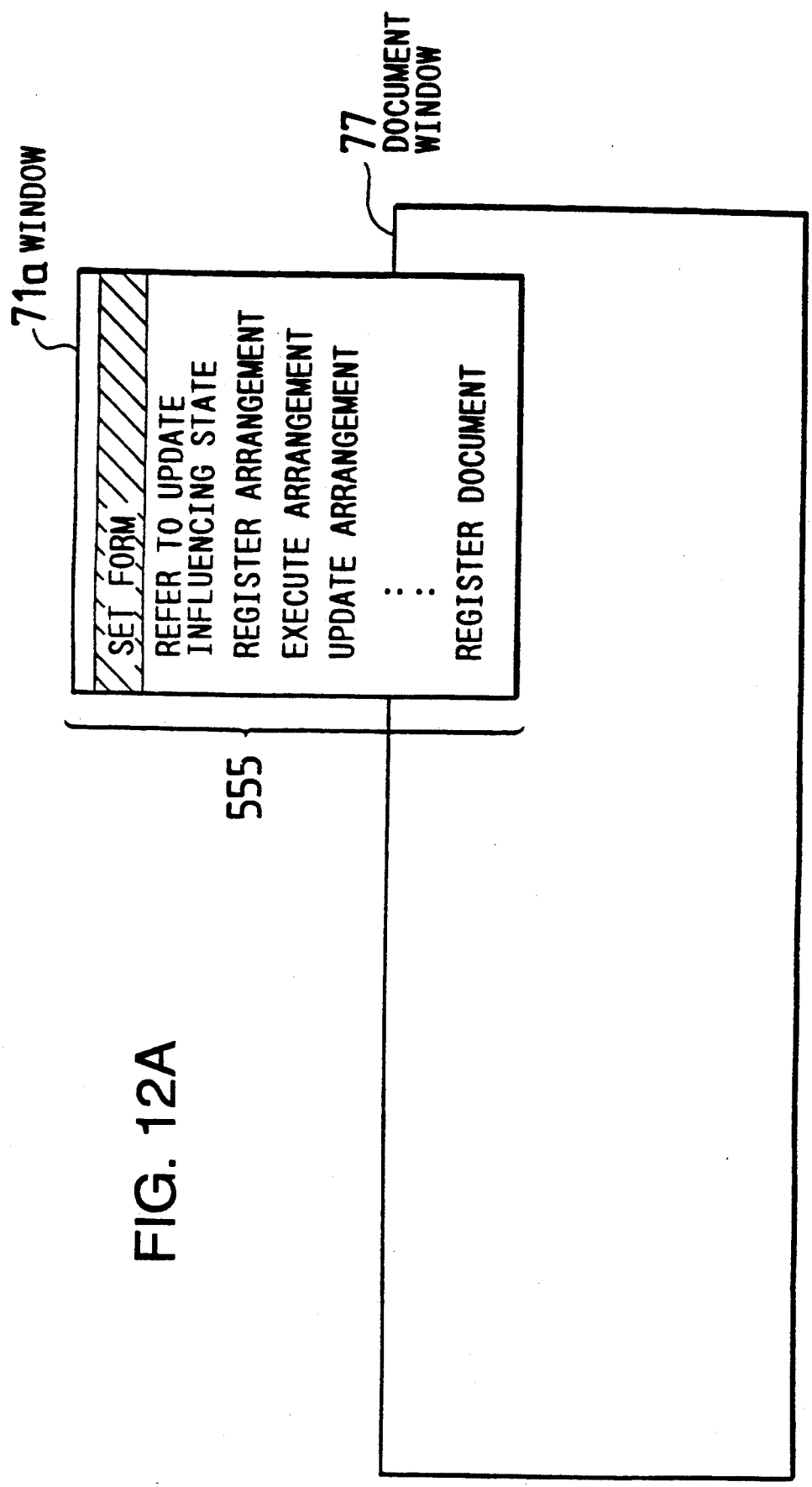

First, the program 4 secures within the buffer 6 areas (respectively called "matter area" and "form area") for generating parts on which a matter part 41C and a form part 42C in an original document storing area 16C (FIG. 9c) are grounded, whereupon as shown in FIG. 12a, it opens a document window 77 and presents the document handling menu 555 (FIGS. 1A and 1B) on a window 71a (these operations are executed at a step 531). When, in an input awaiting state (532), the user selects "Set Form" from within the document handling menu 555 as illustrated in FIG. 12a, the program 4 analyzes an input content (553) and executes the corresponding process (form setting) via decisions 534-536 (539).

Here, the user wants to perform the handling operation of "quoting desired places from the Document B (FIG. 16a) already generated". In the input awaiting state 50 (FIGS. 1A and 1B), the user makes a request for calling out the Document B (FIG. 16a). Then, the program 4 allots (52a) the one-document working area 112 to the Document B via the analysis (51) of the input content and the decision 51a to the effect that the input content is not the request for ending the document handling. At the step 52a, the unused one-document working area 112 is allotted to the Document B because the one-document working area 111 has already been allotted to the Document C.

Figure 12B:
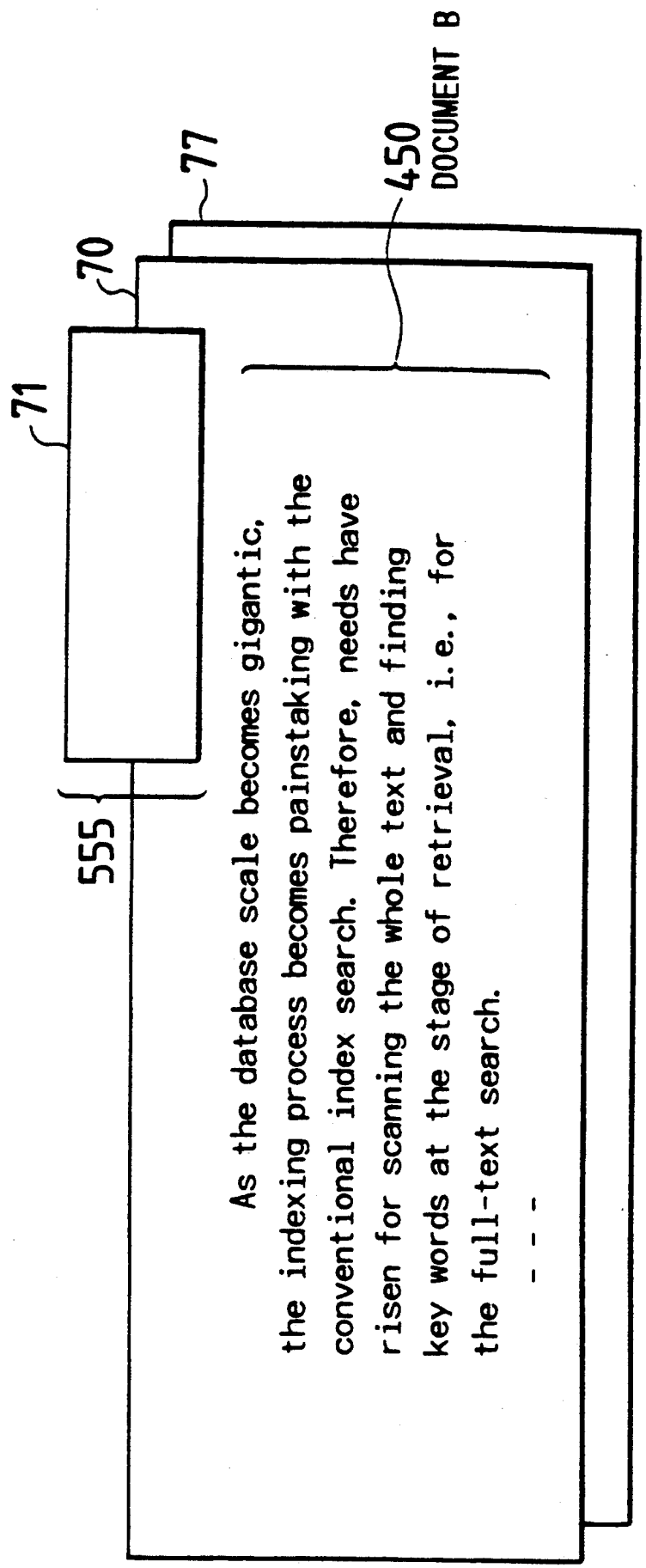

Via the decision 52 to the effect that the calling of the Document B is requested, the program 4 subsequently copies the matter part 41B and form part 42B of the original document storing area 16B (FIG. 9b) into the original document buffer 6 of the one-document working area 112 (FIGS. 1A and 1B), it clears the arrangement fashion buffer 7, original document updating area 8, arrangement fashion updating area 9 and arrangement composing buffer 10 of the one-document working area 112, and it presents the Document B on a document window 70 and the document handling menu 555 on a window 71b as shown in FIG. 12b (these operations are executed at the step 54).

Figure 12C:
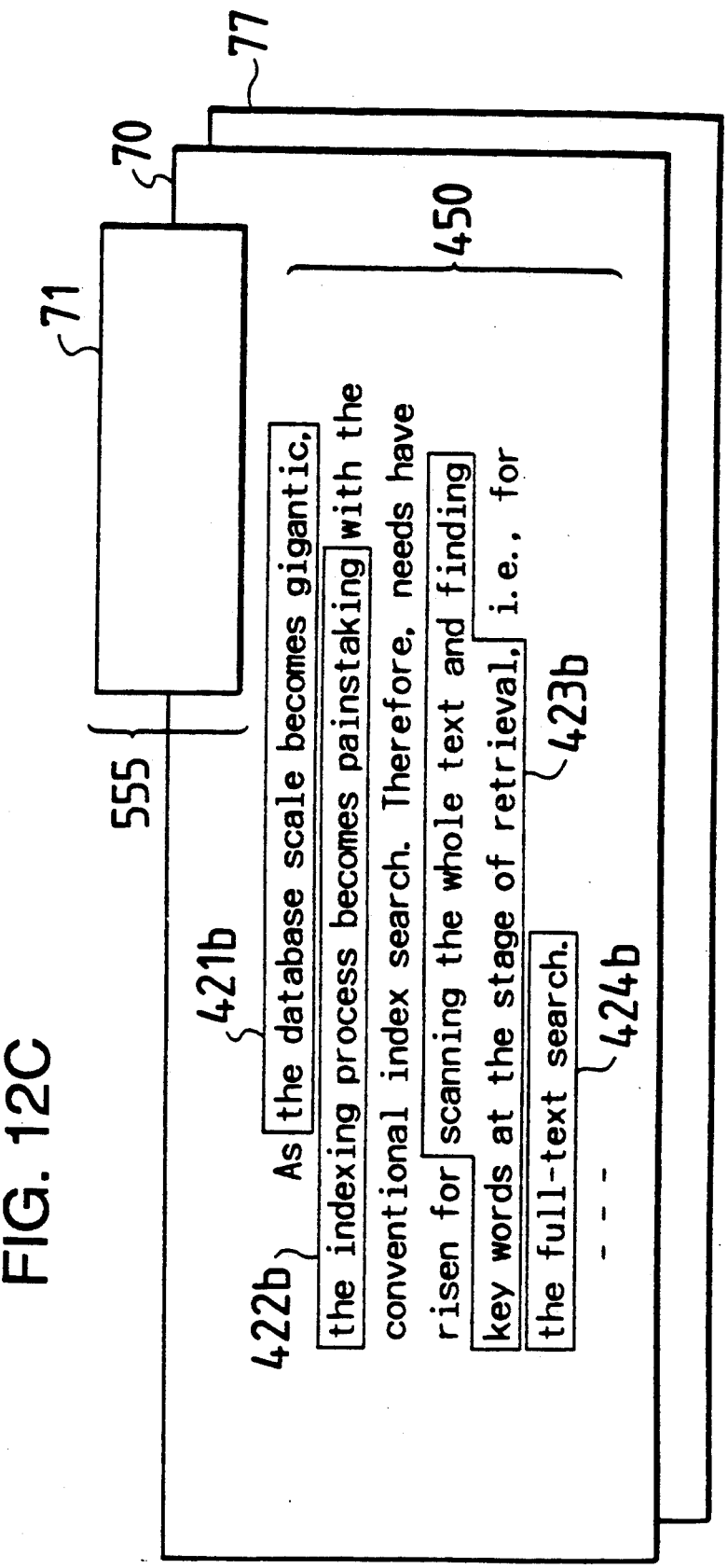

Next, in the input awaiting state (55), the user selects the desired places 421b, 422b, 423b and 424b from within the Document B as shown in FIG. 12c by the use of the mouse 2, performs the operation of designating "quotation" (for example, the simultaneous depressions of a copy key and a function key) and selects the document window 77 (FIG. 12c) with the mouse 2. Then, via the analysis (56) of the input content, the decision 57 and decisions 60-64, the program 4 shifts its control to the input awaiting state (532 (FIG. 23a)) as the corresponding process (68).

Next, in the input awaiting state (532), the user selects the desired place (head) of the Document C with the mouse 2. Then, via the analysis (533) of the input content, the program 4 renders the decision (534-535) to the effect of the quotation from another document and executes a step 537 to be described below.

Figure 12D:
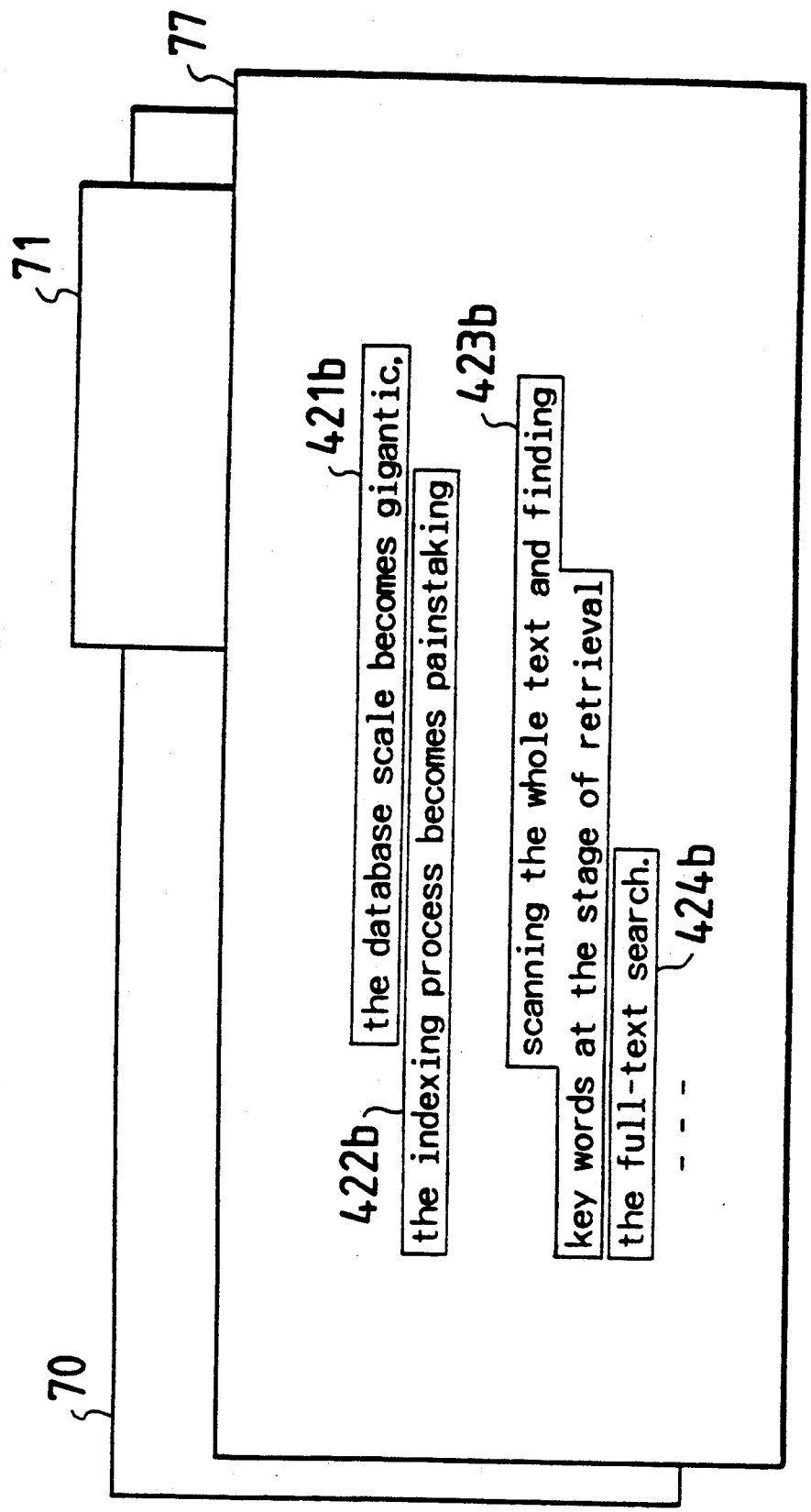

FIG. 9c showing the content of the document file 15C (FIGS. 1A and 1B) after the generation of the Document C shall be used instead for the description of the step 537. The matter part 41C and form part 42C in FIG. 9c shall be supposed the matter area and form area (the aforementioned parts on which the matter part 41C and form part 42C are grounded) of the original document buffer 6, respectively. First, the program 4 sets the head of a code part 363 in the matter part 41C, to a value "PP" expressive of the "quotation from another document" in correspondence with the head of the Document C. Further, it points through a pointer 851 a referred document part 41C1 which stores the document name "Document B" being a quotation source, and a referred address part 41C2 which stores the address range "100-111" of the quoted place 421b (FIG. 12c) in the Document B. Thus, the information items on the quotation from the place 421b (FIG. 12c) in the Document B are stored. The program 4 similarly stores information items on the quotations from the places 422b-424b (FIG. 12c) in the Document B, into the matter part 41C. Subsequently, it sets the values of the pertinent places of respective form element specifications (for example, form element specification 344 and form element specification 345) in the form part 42C, to the same values as those of the corresponding places in the form part 42B of the Document B (FIG. 9b), whereby the places 421c, 422c, 423c and 424c after the quotations are displayed on the window 77 as shown in FIG. 12d. The above operations are effected by the step 537.

Subsequently, in the input awaiting state (532), the user puts in the symbols and characters 77a, 77b, 77c and 77d and the control symbols (new paragraph symbols and blanks) for changing the layout of the places 421b, 422b, 423b and 424b (FIG. 12d) in the Document C as illustrated in FIG. 12e. Then, the program 4 executes a step 538 via the analysis (533) of the input content and the decision (534-536) to the effect of the new input. Likewise to the case of the step 537, the step 538 will be described with reference to FIG. 9c. By way of example, for the new input part 77a shown in FIG. 12d, the program 4 stores the kind of a text code ("KK" is a value expressing to the effect that the text code is the KEIS code), and subsequent concrete text codes into the corresponding places of the matter part 41C (FIG. 9c), and it sets the values of the corresponding places of the form part 42C (the above operations are effected by the step 538).

Thus, the Document C is generated in which the parts 421c, 422c, 423c and 424c quoted from the Document B and having the properly changed layout and the new input parts 77a, 77b, 77c and 77d are coexistent as shown in FIG. 12e. This Document C is also shown in FIG. 16b.

In the above way, the program 4 ends the series of steps 53a (the document generation) shown in FIG. 23a. On this occasion, the same parts as the matter part 41C and form part 42C shown in FIG. 9c have been respectively generated in the matter area and form area within the original document buffer 6.

Subsequently, in the input awaiting state (532), the user selects the "register document registration" from within the document handling menu 555 as shown in FIG. 12f. Then, via the analysis (533) of the input content and the decision 534 to the effect of the request for the register document registration, the program 4 executes a series of steps 53b (registering the generated document in the document file 15).

The program 4 first presents the document registering format 554 (within the menu storing area 5 in FIG. 1) as shown in FIG. 12f. Then, on the basis of input contents from the user (to the effects that the document name is "Document C" and that the person permitted is only the user himself/herself), the program 4 generates and stores a meta-information part 43C (FIG. 9c) which expresses the information items that the author of the Document C is named "shiraishi", that the date of generation is "November 25, 1987" and that the person permitted is only the user himself/herself ("NONE") (at a step 53b1 in FIG. 23b). Besides, it stores the contents of the matter area and form area of the buffer 6 as the matter part 41C and form part 42C of the original document storing area 16C (FIG. 9c), respectively, and it shuts the window 77 of the Document C (at a step 53b2). After the above process, 53b, the content of the document file 15C (FIGS. 1A and 1B) is as shown in FIG. 9c.

Subsequently, the program 4 executes the step 53c of automatically registering the arrangement into the document of the quotation source (Document B) in correspondence with the quotation of the other document (Document B) by the document C.

FIG. 9b shows the content of the document file 15B after the end of the step 53c. At this step 53c, the program 4 generates an arrangement name table 20B, causes the pointer 853 to point this table 20B, and automatically generates an arrangement name "View 1" and registers it into this table 20B. Subsequently, the program 4 generates a sub arrangement table 51B and registers a sub arrangement expressive of the "quotation from another document" (a sub arrangement name "Property 1" is also generated automatically). Further, a derived document 360 which stores the document name "Document C" of the quotation destination and a sub arrangement specification 361 in which the places (421b, 422b, 423b and 424b in FIG. 12c) in the quoted Document B are stored as symbols "R" are pointed through a pointer 85 from the sub arrangement table 51B, and this sub arrangement table 51B is pointed through a pointer 859 from the arrangement name table 20B.

In addition, both the values of the update influencing completion sign 300B of the arrangement name table 20B and the update influencing completion sign 301 of the sub arrangement table 51B are previously initialized to "0" by the program 4. In the above way, a direct information part 31B is generated. Besides, the program 4 generates (53c) a meta-information part 32B on the basis of the author of the Document C being the quotation destination of the Document B, the date of generation and the person permitted (the information items designated by the user at the registration of the Document C as shown in FIG. 12f). Owing to the above step 53c, the program 4 generates the arrangement fashion storing area 17B illustrated in FIG. 9b. Subsequently, the program 4 releases (59e) the one-document working area 112 (FIGS. 1A and 1B) allotted to the Document C.

Figure 12G:
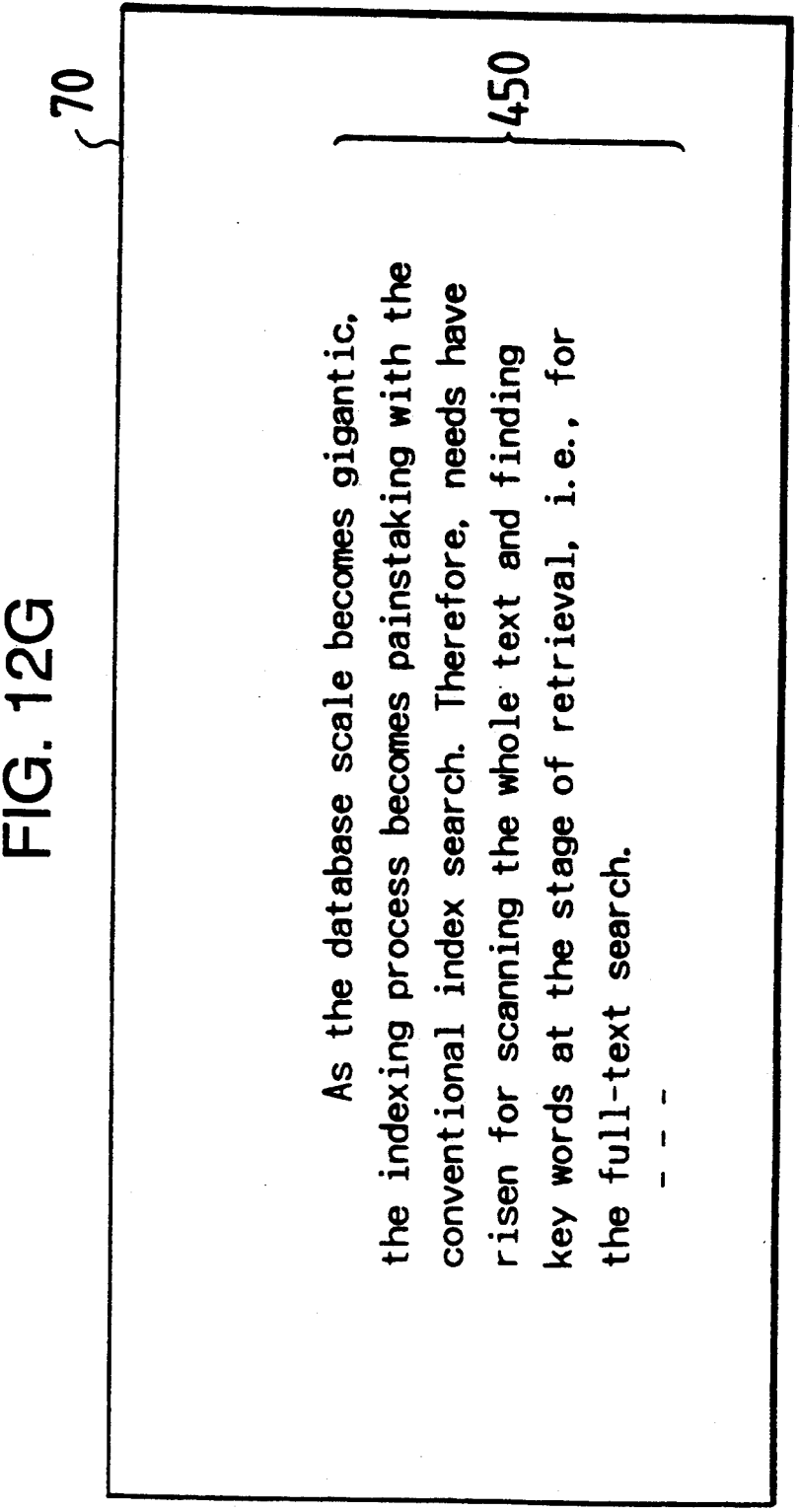

In the input awaiting state 50, the user applies an input to the effect of shutting the window 77 which is presenting the Document C. Then, via the analysis 51 of the input content and the decision 51a to the effect of the request for ending the handling of the Document C, the program 4 shuts (51b) the window 77 as the end of the handling of the Document C. Since the window 70 presenting the Document B is still open on the display 3, the program 4 renders a decision 51c to the effect that the Document C is not the last document, and it shifts its control to the handling of the Document B being presented on the window 70 and establishes the input awaiting state 50 on the window 70 (at a step 51e). Assuming in the above that no document other than the Document C is being handled, the program 4 ends the handling (51d) via a decision 51c to the effect that the Document C is the last document. After the step 53c, only the window 70 of the Document B is left as shown in FIG. 12g, and the input awaiting state (50) is established again.

In the above, there has been described the case where the user named "Shiraishi" generates the derived document "Document C" shown in FIG. 16b, from the original document "Document B" shown in FIG. 16a.

In the managing method of the present invention, the derived Document C is stored as the document file 15C (FIGS. 1A and 1B) the structure shown in FIG. 9c, and each part quoted from the Document B points the address range of the quoted place ("100–111" in the figure) as shown in the matter part 41C. Therefore, when the term "sakuinzuke" is altered into "indexing" in the quoted place 422b (FIG. 16a) within the Document B by way of example, the alteration is automatically reflected also in the corresponding place 422c of the Document C (FIG. 16b).

Besides, the original Document B is stored as the document file 15B (FIGS. 1A and 1B) in the structure shown in FIG. 9b, and the information items on the quotation of the Document B are stored as shown in the arrangement fashion storing area 17B. Therefore, any person utilizing the Document B can know the derivation of the Document C from the Document B and further refer to the content of the Document C.

B.3 Execute Arrangement:

Next, in conjunction with the interface examples in FIGS. 13a–13k, there will be described a case where the user named "Shiraishi" arranges the Document A into the fashion shown in FIG. 15a or FIG. 15b and then utilizes the arranged document. It is assumed that the Document A has been previously stored in the state shown in FIGS. 9A1 and 9A2 as the document file 15A (FIGS. 1A and 1B) by the steps explained before in conjunction with the interface examples of FIGS. 11a–11h in the "register arrangement". It is also assumed that the user has made a request for calling out the Document A in the input awaiting state 50 shown in FIGS. 17A1 and 17A2, and that the program 4 has fallen into the input awaiting state 55 (in FIG. 17b) via the analysis (51) of the input content, the decision 51a to the effect that the end of document handling is not requested, the step 52a of allotting the Document A to the one-document working area 111, the decision 52 to the effect of the request for calling out the Document A, and the step 54 for the call of the Document A and the initialization.

First, it is supposed that the user "Shiraishi" wants to arrange the Document A into the fashion shown in FIG. 15a and then utilize the arranged document.

In the input awaiting state (55) shown in FIG. 17b, the user selects the "execute arrangement" from within the arrangement handling menu 551 on the window 71, the selected item being to the effect that the Document A is to be arranged into a fashion already registered as an "arrangement". Then, the program 4 first executes a series of steps 66 (secrecy check and situation presentation) via a decision to the effect of the request for the "execute arrangement" as based on the analysis (56) of the input content, the decision 57 and the decisions 60–62.

Now, the detailed flow of the handling will be described with reference to FIGS. 20A1, 20A2, 20B1 and 20B2.

Figure 13A:
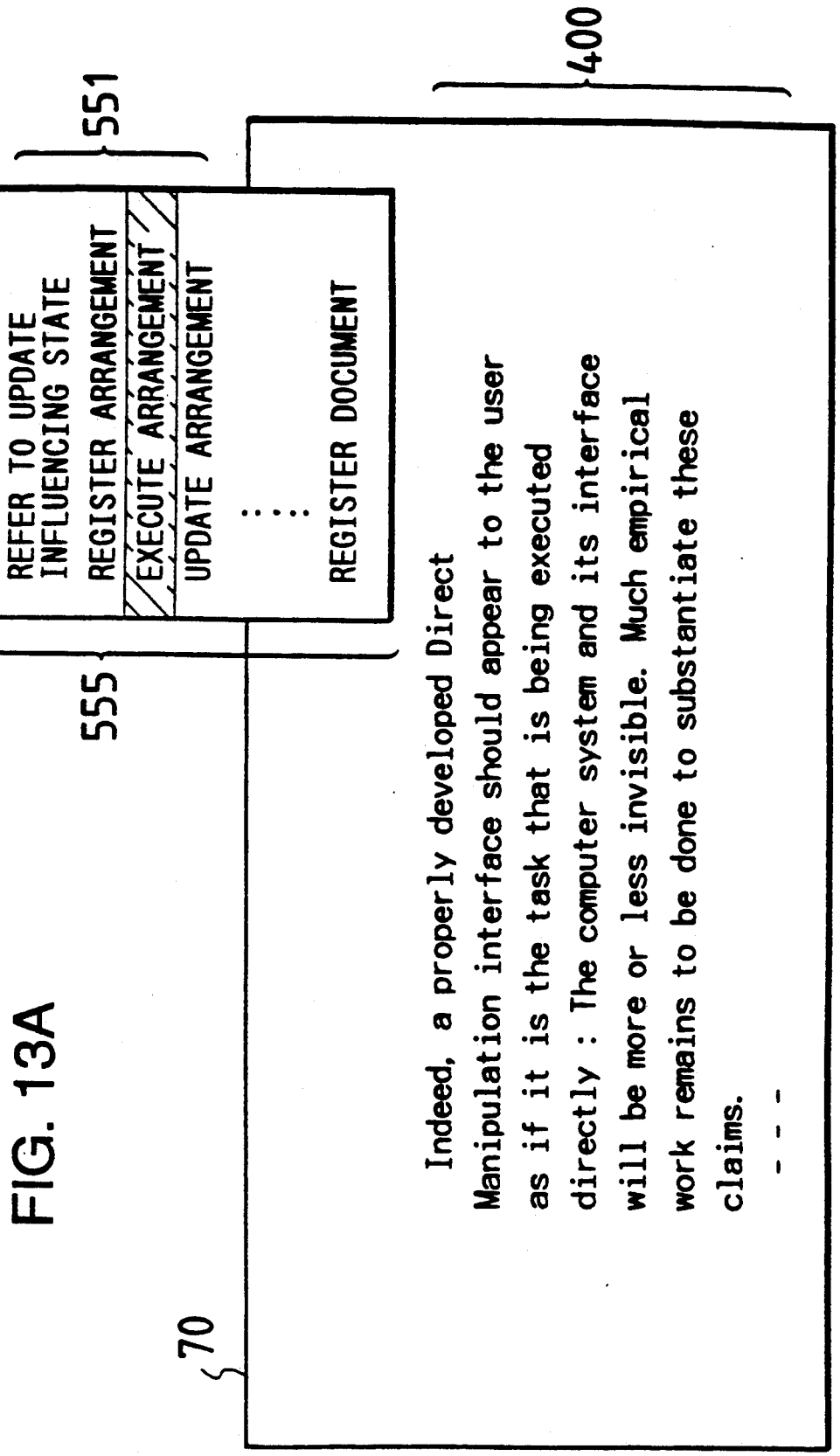
Figure 13B:
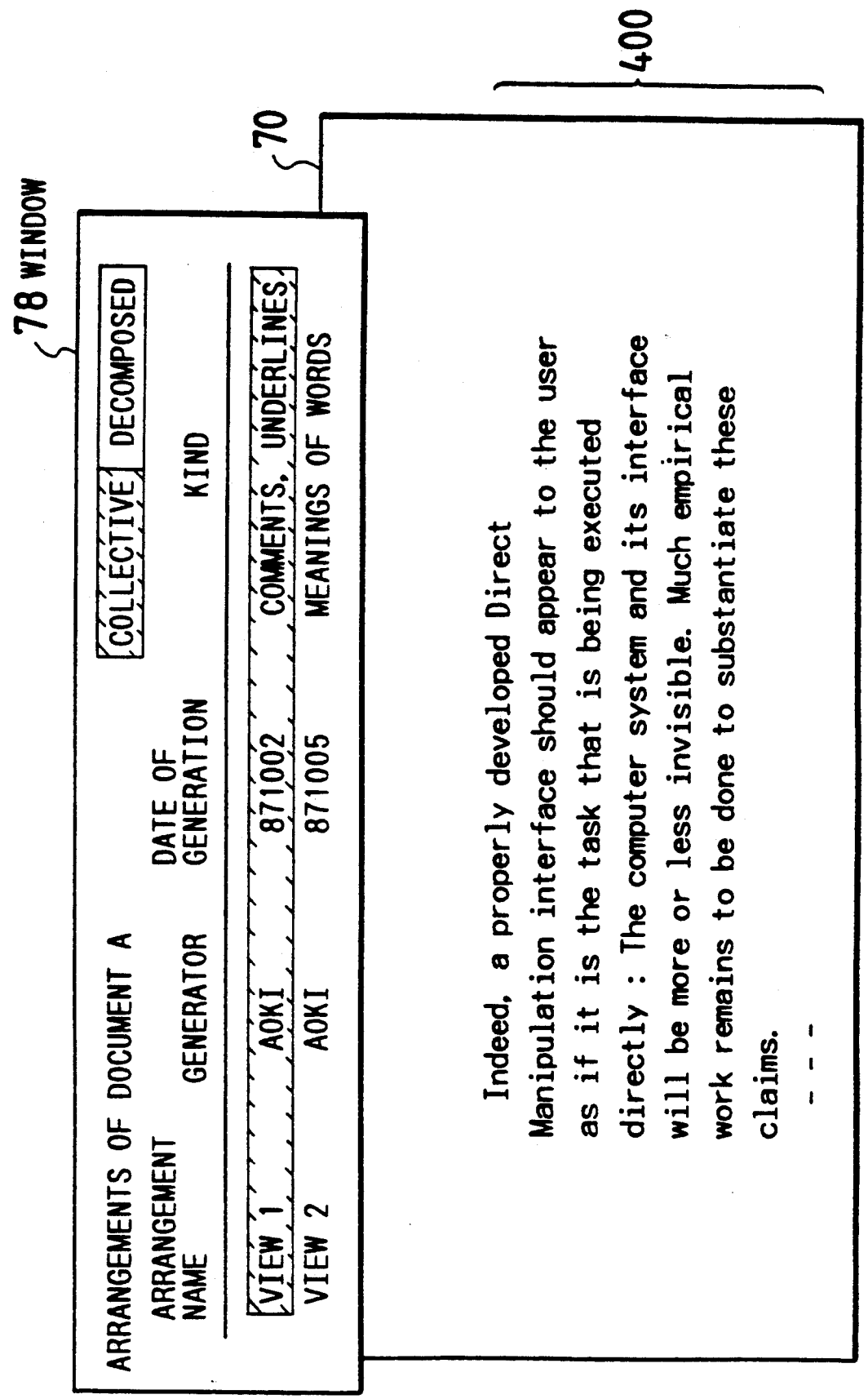

The program 4 first refers to the arrangement name table 20A and meta-information part 43A of the Document A as shown in FIGS. 9A1 and 9A2, and presents the list of those elements of the arrangement name table 20A which the current user "Shiraishi" is permitted to refer to, namely, "View 1" and "View 2", as shown in FIG. 13b. In the current case, all the values of the update influencing completion sign 300A are the value "0" expressive of the "influencing completion", so that a display to the effect of uncompleted update influencing is unnecessary. If any arrangement name has the value "1" expressive of "uncompleted influencing", a display to that effect is presented (the above operations are effected at a step 66b in FIGS. 20A1 and 20A2).

In an input awaiting state (66c), the user selects the arrangement "View 1" and "Collective" presented on the window 78 as illustrated in FIG. 13b, thereby to indicate to the effect that he/she wants to execute the arrangement "View 1" collectively. Then, the program 4 refers to the update influencing completion sign 300A (FIGS. 9A1 and 9A2) and decides (66a) to the effect that the update influencing has been completed for the selected arrangement "View 1", via a decision 66c1 to the effect that the user's input is not a request for arrangement decomposition, and it stores (706) all the sub arrangements of the selected arrangement "View 1" into the arrangement composing buffer 10 (with reference to the sub arrangement table 51A in FIGS. 9A1 and 9A2), via a decision 715 to the effect that the user's input is not a request for ending arrangement execution. Subsequently, the program 4 refers to the arrangement composing buffer 10 and the arrangement fashion file 21A (FIGS. 9A1 and 9A2) and displays (707) a result obtained by subjecting the Document A to the arrangement "View 1", as shown in FIG. 13c.

In FIG. 13c, the place 401 commented on (FIG. 15a) is flickered and displayed in the Document A on the window 70, and the underline affixed to the place 401 is displayed. Incidentally, when the user gives the display of another extent of the Document A on the window 70, all places commented on are flickered and displayed within the extent.

Subsequently, in an input awaiting state (708 in FIGS. 20B1 and 20B2), the user indicates to the effect that he/she wants to know the concrete content of the comment afforded to the flickered place 401. Then, the program 4 opens a window 80 and presents the content 404 of the comment (FIG. 15a) as shown in FIG. 13d, via a decision 70 to the effect of a request for presenting detailed information and a decision 710 to the effect of the presence of the detailed information based on the kind "comment" of the sub arrangement. By the way, if two or more places commented on are existent within the extent of the Document A displayed on the document window 70, all the concrete contents of the comments afforded to the places are displayed on the window 80. On that occasion, the flickered places on the window 70 and the concrete contents of the comments on the window 80 are held in correspondence by numbering which conforms to the sequence of the appearances of the pertinent places in the Document A (in FIG. 13d, No. "**1" expresses that the comment appears first in the Document A).

As thus far described, the user named "Shiraishi" can arrange the Document A into the fashion shown in FIG. 15a and utilize the arranged document owing to the procedure of steps that "the arrangement registered as "View 1" beforehand, namely, commenting and underlining are executed for the Document A".

Figure 13E:
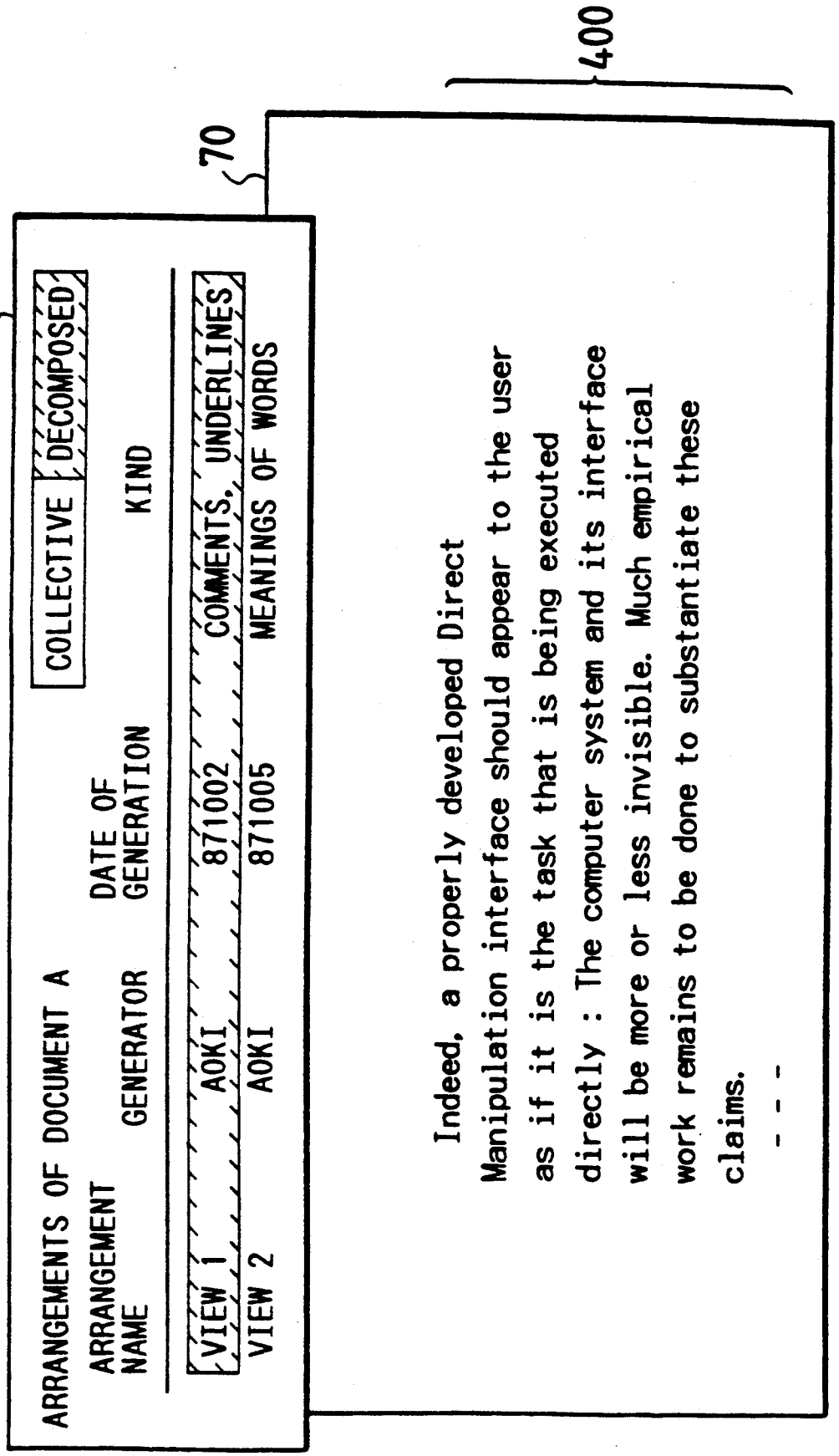
Figure 13F:
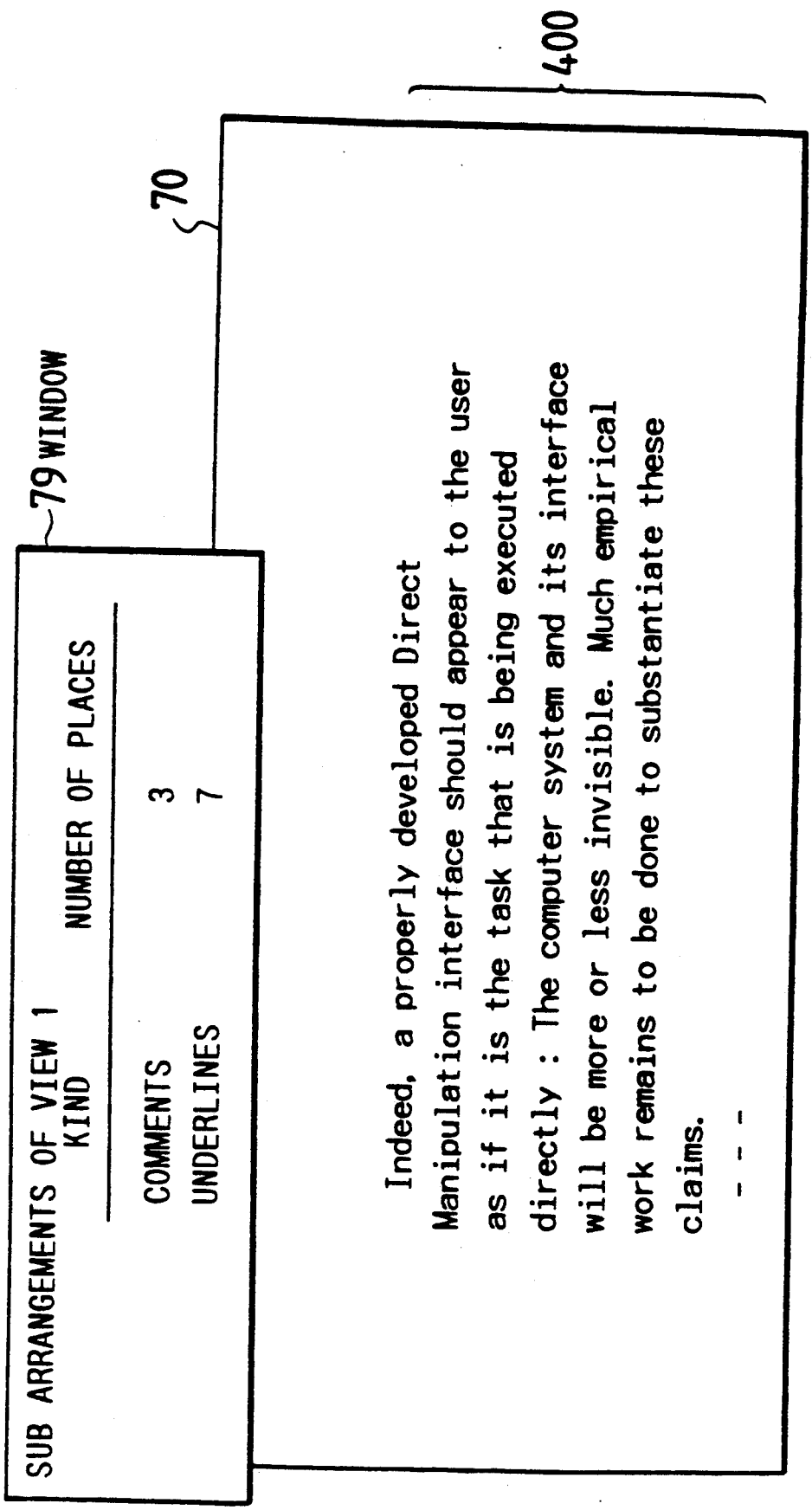

Next, it is assumed that the user wants to execute only the "comment" of the arrangement "View 1" with the "underlining" excluded. In the input awaiting state (708), the user selects the arrangement "View 1" and "Decomposed" presented on the window 78 as illustrated in FIG. 13e and indicates to the effect that he/she wants to decompose the arrangement "View 1" into sub arrangements. Then, via the decision 66c1 to the effect of the request for the arrangement decomposition, the program 4 refers to the arrangement fashion storing area 17A (FIGS. 9A1 and 9A2) and presents (66d) the outline of the content of the arrangement fashion file 21A appointed by the element "View 1" of the table 20A, as to the individual sub arrangements on the window 79 as shown in FIG. 13f. Subsequently, in an input awaiting state (66e), the user selects "Comments" from within the sub arrangements presented on the window 79 as illustrated in FIG. 13g. Then, the program 4 refers to the update influencing completion sign 301A and decides (66a) to the effect that the selected sub arrangement "comments", namely, "Property 1" has completed update influencing, and it stores (706) the selected sub arrangement "Property 1" into the arrangement composing buffer 10, via the decision 715 to the effect that the user's input is not the request for ending the arrangement execution. Subsequently, the program 4 refers to the arrangement composing buffer 10 and the arrangement fashion file 21A (FIGS. 9A1 and 9A2) and displays a result obtained by subjecting the Document A to the sub arrangement "Property 1", as shown in FIG. 13g, that is, it flickers and displays the place 401 commented on (707). In FIG. 13g, the place 401 is not underlined unlike the case of FIG. 13c. The subsequent request for presenting detailed information is made by steps similar to the foregoing.

Next, it is assumed that the user "Shiraishi" wants to arrange the Document A into the fashion shown in FIG. 15b (except the underline) and then utilize the arranged document.

Figure 8:
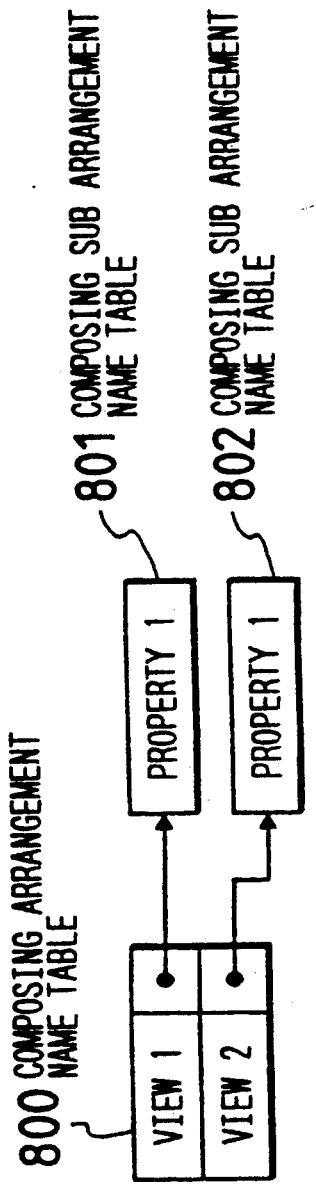
FIG. 8 is a diagram showing the content of an arrangement composing buffer (10) at an arrangement executing step (67) in FIGS. 17C1 and 17C2.
Figure 13H:
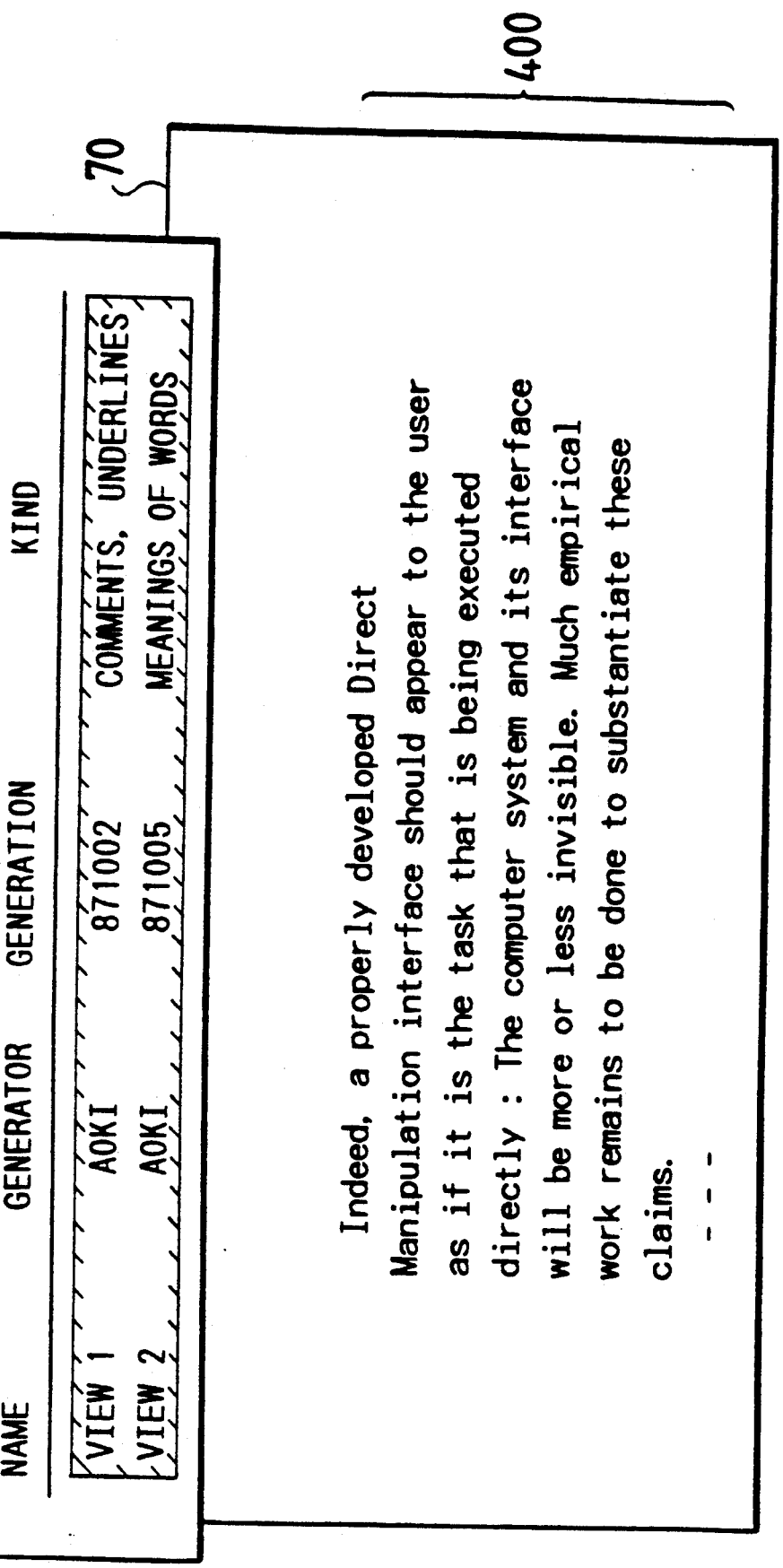

In the input awaiting state (708), the user opens the window 78 for displaying the list of the arrangements of the Document A and selects the arrangements "View 1" and "View 2" and the item "decomposed" as illustrated in FIG. 13h. Then, via the decision 70 to the effect that the user's input is not the request for presenting the detailed information and the decision 66c1 to the effect that the user's input is the request for the arrangement decomposition, the program 4 refers to the arrangement fashion storing area 17A (FIGS. 9A1 and 9A2) and presents (66d) the outlines of the contents of the arrangement fashion files 21A and 22A respectively appointed by the elements "View 1" and "View 2" of the table 20A, as to the individual sub arrangements on the window 79 as shown in FIG. 13i. Subsequently, in the input awaiting state (66e), the user selects the "comments" of the "view 1" and the "meaning" of the "View 2" from within the sub arrangements presented on the window 79, as illustrated in FIG. 13j. Then, the program 4 refers to the update influencing completion sign 300A of the arrangement fashion file 17A (FIGS. 9A1 and 9A2) and renders the decision 66a to the effect that both the selected sub arrangements have completed the update influencing. Further, the program 4 stores the combination of the sub arrangements into the arrangement composing buffer 10 via the decision 715 to the effect that the request for ending the arrangement execution is not pertinent. On this occasion, the content of the composing buffer 10 is as shown in FIG. 8. Referring to FIG. 8, the selected arrangement names "View 1" and "View 2" are stored in a composing arrangement name table 800, and the sub arrangement name "Property 1" selected for the arrangement names is stored in each of composing sub arrangement name tables 801 and 802 appointed by the respective arrangement names. Next, the program 4 refers to the arrangement composing buffer 10 (FIG. 8) and the arrangement fashion storing area 17A (FIGS. 9A1 and 9A2) and displays (707) a result obtained by subjecting the Document A to the selected sub arrangements in succession, as shown in FIG. 13j. In this figure, that place 401 of the Document A on the window 70 which is commented on and those words 402 and 403 thereof whose meanings are registered are flickered and displayed, and the place 401 and the places 402, 403 are respectively endowed with serial Nos. (**1 and *1, *2) in the corresponding sub arrangements. Incidentally, the window 80 and a window 81 are not opened yet at the stage of the end of the step 707.

Subsequently, in the input awaiting state (708), the user makes the request for presenting the detailed information items on the flickered places 401 and 402, 403 (FIG. 13j). Then, via the decision 70 to the effect of the request for presenting the detailed information and the decision 710 to the effect of the presence of the detailed information as based on referring to the kinds "comments" and "meaning" of the sub arrangements in the sub arrangement tables 51A and 52A, the program 4 opens the window 80 to present the concrete content 404 of the comment made on the place 401 and also opens the window 81 to present the meanings 405 afforded to the words 402 and 403, as illustrated in FIG. 13j. As stated before, the flickered places on the window 70 are held in correspondence with the concrete contents on the windows 80 and 81.

In this way, the user named "Shiraishi" decomposes the fashions registered as the "View 1" and "View 2" beforehand and composes the parts thereof to arrange the document, whereby he/she can utilize the Document A in the fashion shown in FIG. 15b (except the underline).

Subsequently, when the user makes the request for the end of the arrangement execution in the input awaiting state (708), the program 4 falls into the input awaiting state (55) via the decisions 70, 66a and 715, and the display 3 presents a state shown in FIG. 13k.

In the above, there have been described the cases where the user named "Shiraishi" arranges the Document A into the fashions shown in FIGS. 15a and 15b and then utilizes the arranged documents.

B.4 Updates of Original Document:

Next, there will be described a case where the user "Kuroda" being the author of the Document A updates the content of this document at the stage at which the document file 15A stores the information as shown in FIGS. 9A1 and 9A2.

In the input awaiting state 50, the user puts in a request for calling out the Document A. Then, the program 4 allots (52a) the one-document working area 111 (FIGS. 1A and 1B) the Document A via the analysis 51 of the input content and the decision 51a to the effect that the end of document handling is not pertinent, and it executes the step 54 (to be explained below) for the call of the Document A and the initialization.

At the step 54, the program 4 first copies the matter part 41A in the original document storing area 16A into the buffer 6 in the form shown in FIG. 2a and also copies the form part 42A into the buffer 6. Referring to FIG. 2a, the former matter part 311 corresponds to the matter part 41A and contains the text code train of the original document to-be-updated. The update specification part 312 saves places subjected to updates (such as insertion and deletion) in the former matter part 311, and detailed information associated therewith. The program 4 uses an original document updating process keeping part 322 configured of the former matter part 311 and the update specification part 312, at a step 60c (updating the original document with update information left behind) to be described later. Also, the updates of the form are made in the original document buffer 6 by a method similar to the above.

Now, in the input awaiting state 55 (on the display 3, the state shown in FIG. 13h), the user named "Kuroda" updates the place 401 (FIG. 15a) in the Document A presented on the document window 70, into "as if it is the directly executed task" by the use of the keyboard 1. Via the analysis (56) of the input content and the decision to the effect of the update of the original document (the decisions 57 and 60), the program 4 decides (60a) the presence of any registered arrangement because the arrangement fashion storing area 17A (FIGS. 9A1 and 9A2) is not NILL, and it executes the step 60c of updating the original document with the update information left behind.

Figure 2B:
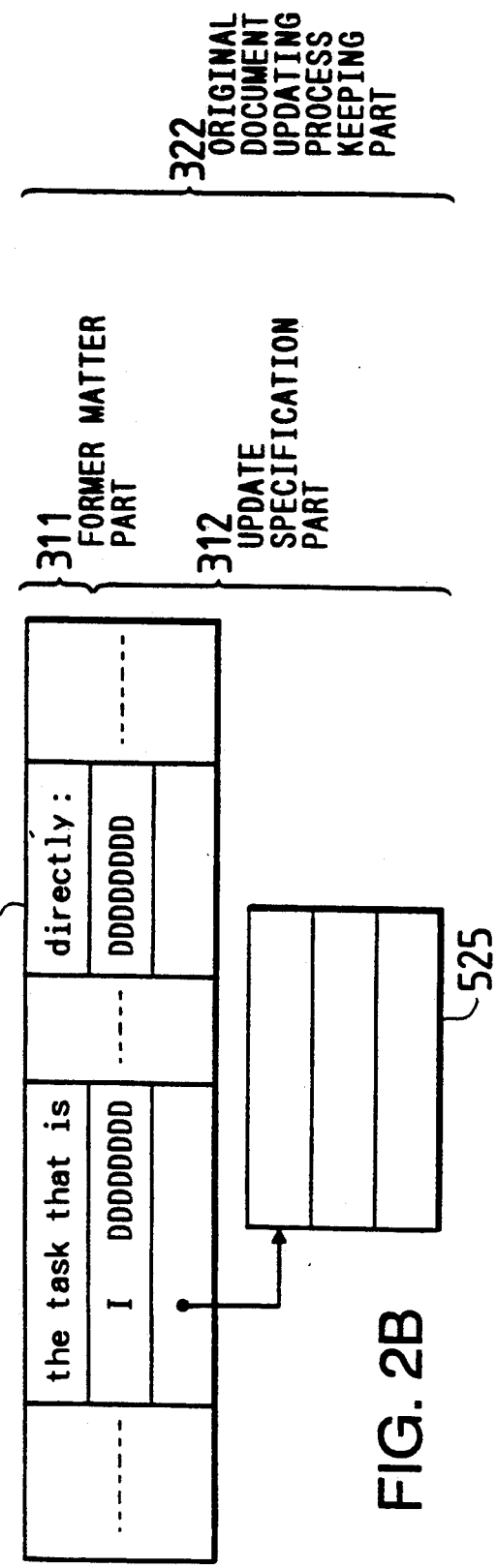

The content of the original document updating process keeping part 322 of the original document buffer 6 after the step 60c is illustrated in FIG. 2b. The contents of the updates of the Document A by the user are to first insert "directly executed" before "task" in "as if it is the task that is ... directly" in the place 401 of the Docuemnt A (FIG. 15a), and to further delete a part behind "task" and before ":". At the step 60c (updating the original document with the update information left behind), accordingly, the program 4 sets a symbol "I" expressive of the handling operation "insertion" into that place in the upper stage of the update specification part 321 (the second stage of the keeping part 322) which corresponds to the place subjected to the insertion in the former matter part 311 (the first stage), within an update base part 526 as shown in FIG. 2b. Further, it appoints a concrete insertion content 525 from that place in the lower stage of the update specification part 312 (the third stage) which corresponds to the above insertion place. Here, similarly to the update base part 526, the concrete insertion content 525 is constructed in a three-stage structure in order to keep the updating process. Besides, the program 4 sets symbols "D" expressive of the handling operation "deletion" into that place in the upper stage of the update specification part 312 which corresponds to the place subjected to the deletion in the former matter part 311. In this manner, the program 4 updates the original document while leaving the update information items of the Document A in the update specification part 312 (the above operations are effected at the step 60c).

Figure 3A:
FIGS. 3a-3c are diagrams showing the changes of the contents of an original document updating area (8) in a process for generating the updated original document.
Figure 3B:
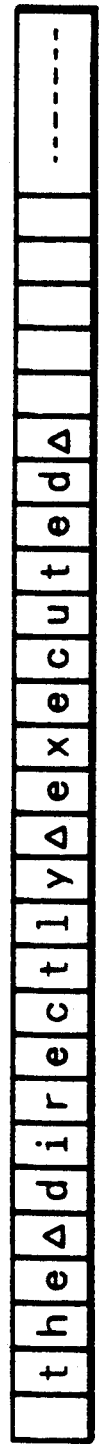
Figure 3C:
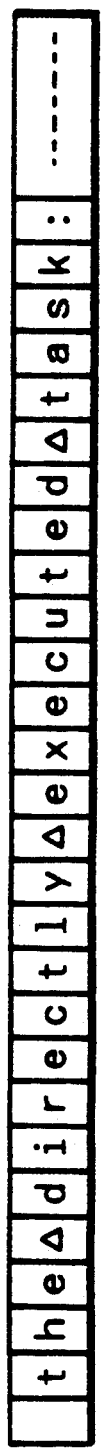

Thus, the program 4 ends the processing steps which are directly pertinent to the updates of the Document A. As will be explained below, however, a series of steps 59 for the registration of the Document A are also associated with the updates. More specifically, when the registration of the updated Document A is requested in the input awaiting state 55 subsequently to the foregoing by the user, the program 4 executes the series of steps 59 (automatic influencing on the arrangement, and the registration of the original document) via the analysis 56 of the input content and the decision 57 to the effect of the registration of the document. The detailed flow of the steps 59 is shown in FIGS. 18a–18e. The program 4 refers to the original document updating process-keeping part 322 (FIG. 2b) in the original document buffer 6 to generate the matter part 41A of the updated original document in the original document updating area 8, and also refers to the original document buffer 6 to generate the form part 42A of the updated document in the same area 8. A process for generating the matter part 41A of the updated Document A will be described with reference to FIG. 2b and FIGS. 3a–3c. The program 4 checks the upper stage of the update specification part 312 shown in FIG. 2b, from the head thereof. As to an extent not marked, the former matter part 311 is copied in the area 8 as it is (FIG. 3a), while as to the place with the mark "I" indicative of the insertion, the concrete insertion content appointed from the lower stage of the update specification part 312 is inserted as a new content immediately before that place in the area 8 (FIG. 3b). Besides as to the extent with the marks "D" indicative of the deletion in the upper stage of the update specification part 312, the process proceeds to delete the corresponding place in the former matter part 311 (FIG. 3c). The program 4 executes such operations till the tail of the original document updating process-keeping part 322 within the original document buffer 6, thereby to generate the matter part 41A of the updated Document A in the original document updating area 8 (FIGS. 1A and 1B). The form part 42A of the updated Document A is similarly generated in the area 8 (the above operations are effected at a step 59a).

B.5 Automatic influencing:

After the above step 59a, the program 4 executes a series of steps 59b (the automatic influencing of the updates of the original document on the registered arrangement) via a decision 602 rendered by reference to the arrangement name table 20A (FIGS. 9A1 and 9A2), to the effect that this table is not NILL. More specifically, as illustrated in FIGS. 9A1 and 9A2, the updates of the Document A are influenced on the respective arrangements registered as the sets of the arrangement names and arrangement fashion files in the arrangement fashion storing area 17A, in succession as far as the update influencing can be done by the system.

First, the program 4 points the first element "View 1" of the arrangement name table 20A (FIGS. 9A1 and 9A2) with a pointer P (603), it points with a pointer Q the first element "Property 1" of the sub arrangement table 51A appointed by the arrangement name "View 1" (604), and it clears the arrangement fashion buffer 7 (FIGS. 1A and 1B) and copies thereinto the sub arrangement specification 335 (FIGS. 9A1 and 9A2) appointed by the sub arrangement (605). Thenceforth, it influences the updates on the sub arrangement specification 335.

Figure 4A:
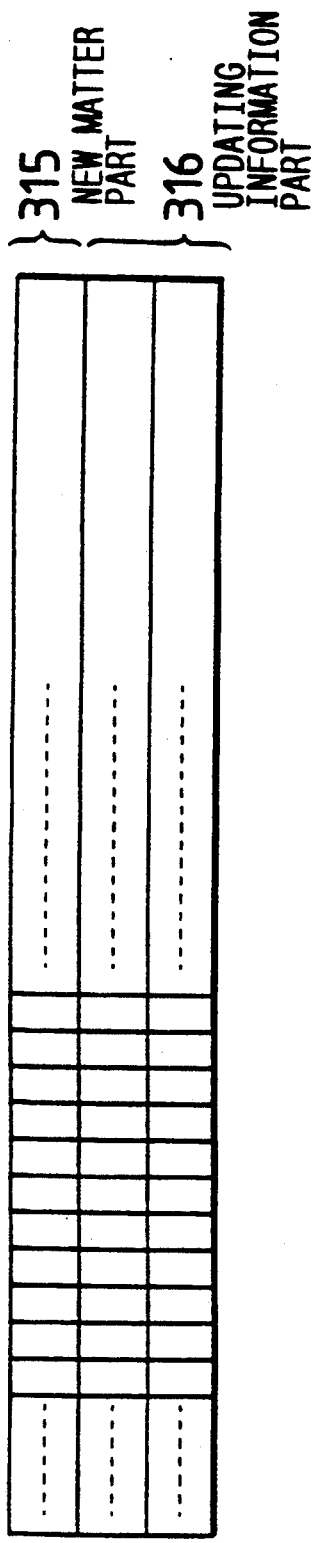

Subsequently, the program 4 refers to the updated Document A stored in the original document updating area 8 at the step 59a (FIG. 18a) and makes the prototype 528 of a new sub arrangement specification shown in FIG. 4a, in the arrangement fashion updating area 9 (606). Referring to FIG. 4a, a new matter part 315 corresponds to an updated sub arrangement specification 529 which corresponds to the text code train of the updated document A. Further, an updating information part 316 is configured of a check part 319 (the second stage of the prototype 528) for storing the update completion situation of the sub arrangement specification 335, and a part (the third stage of the prototype 528) for adding accessory information associated with the updates. This updating information part 316 serves to keep the updating process of the sub arrangement specification 335.

Subsequently to the step 606, the program 4 points the head of the upper stage of the update specification part 312 (FIG. 2b) in the original document buffer 6, with a pointer R (607). Thereafter, it executes a loop process "Loop-1" shown in FIG. 18b, which consists of a decision 608 as to whether or not the pointer R points the tail of the update specification part 312, a decision 609 as to whether or not the place pointed by the pointer R is blank, the step 610a or 610b of setting values in the corresponding places of the new matter part 315 and the checking part 319 in consequence of the decision 609, the step 611 of incrementing the pointer R by one in the upper stage of the update specification part 312, and the aforementioned decision 608. Thus, it sets values in corresponding places from the heads to the tails of the new matter part 315 and updating information part 316 (the second stage and third stage of the prototype 528 of the sub arrangement specification) within the arrangement fashion updating area 9, on the bases of information items from the head to the tail of the original document updating process keeping part 322.

Figure 4B:
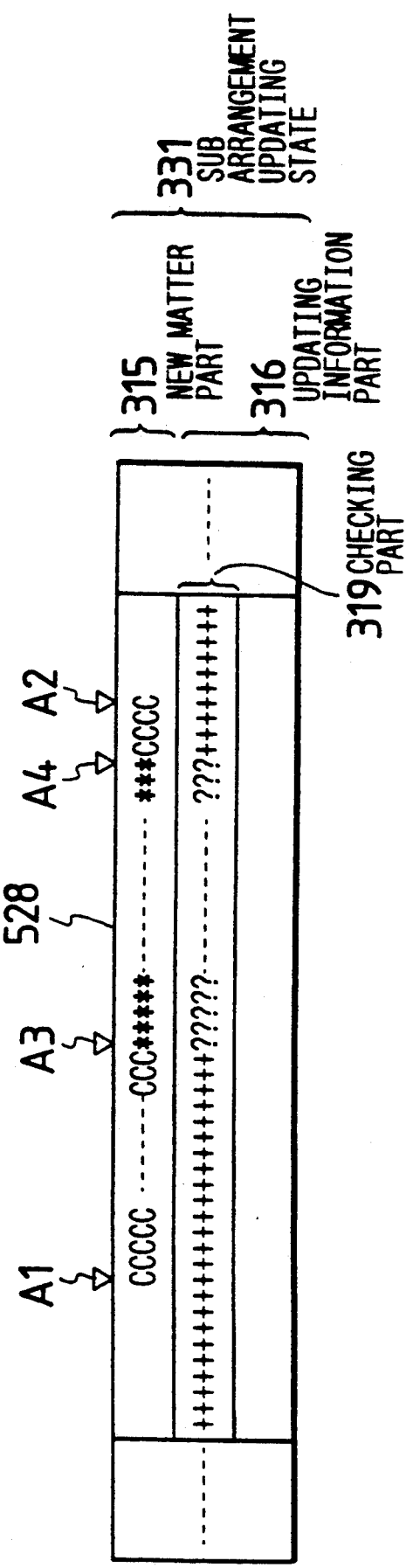

FIG. 4b shows the content of the arrangement fashion updating area 9 at the point of time at which the program 4 has ended the loop process "Loop-1" in accordance with the decision 608 to the effect that the pointer R points the tail of the update specification part 312. The loop process "Loop-1" will be described with reference to FIG. 4b and FIG. 2b. Symbols A1 and A2 in FIG. 4b denote places which correspond respectively to the head and tail of the updated content of the passage 401 (FIG. 15a) in the Document A.

In FIG. 2b, the value of that place of the upper stage of the update specification part 312 which precedes the place marked with "I" is blank. In the blank place, therefore, the program 4 executes the step 610a via the decision 609 to the effect that the pointer R points the blank, in the loop process "Loop-1". Thus, the program 4 sets the values of corresponding places in the former arrangement specification 335 (FIGS. 9A1 and 9A2) within the arrangement specification buffer 7, into the new matter part 315 shown in FIG. 4b (that is, it sets the blanks before the place A1 and the values "C" expressive of the "comment" into places A1-A3), and it sets values "+" expressing that the values of the new matter part 315 have "been determined", into the places A1-A3 of the checking part 319. As will be described later, however, the value "+" at this stage does not express the final "determination", but the value of the new matter part 315 can be altered by a later revision step 614a or 614b.

Besides, for the place in which the value of the upper stage of the update specification part 312 in FIG. 2b is "I", the program 4 executes the step 610b via the decision 609 to the effect that the pointer R does not point a blank. Thus, the program 4 sets the values of places A3-A4 corresponding to the extent of the insertion content within the new matter part 315 shown in FIG. 4b, the extent beginning with the place as to which the value of the upper stage of the update specification part 312 (FIG. 2b) is "I", to values "*" expressive of being "unknown", and it sets the values of the checking part 319 to values "?" to the effect that the values of the new matter part 315 are undetermined.

Similarly to the above, the program 4 sets the respective values "C" and "+" into those places A4-A2 of the new matter part 315 and checking part 319 (FIG. 4b) which correspond to places having "task" as the values of the former matter part 311 in FIG. 2b. The places which have "task" as the values of the former matter part 311 do not have their contents altered, but they merely have their positions moved. Incidentally, the extent within which the upper stage of the update specification part 312 (FIG. 2b) exhibits the values "D" is an extent to be deleted, so that no corresponding places exist in the new sub arrangement specification 528 (FIG. 4b). Besides, the original document is not updated behind a place as to which the value of the former matter part 311 in FIG. 2b is ":", so that the same values as those preceding the place A1 are set in the places of the new matter part 315 and checking part 319 (FIG. 4b) succeeding the place A2.

When the program 4 has executed the above loop process "Loop-1" up to the tail of the update specification part 312 (FIG. 2b) within the original document buffer 6, the values are completely set in the new matter part 315 and checking part 319 within the arrangement fashion updating area 9, as shown in FIG. 4b. However, after ending the loop process "Loop-1" on the basis of the decision 608 to the effect that the pointer R points the tail of the update specification part 312, the program 4 further executes a loop process "Loop-2" shown in FIG. 18c, in which the values in the arrangement fashion updating area 9 are revised with reference to the knowledge base 12 (FIG. 10). The loop process "Loop-2" is a process in which, while a part to which any rule in the knowledge base 12 is applicable exists in the new matter part 315 within the arrangement fashion updating area 9 (a decision 612), the values of the new matter part 315 and checking part 319 are revised (the step 614a or 614b) on the basis of the corresponding rule of the knowledge base 12 (a decision 613).

Here, the knowledge base 12 will be described with reference to FIG. 10. The knowledge base 12 stores the rules for influencing the updates of the original document on the sub arrangements, in the form that the values of a sub arrangement updated pattern part 103 are given in correspondence with the values of a sub arrangement kind part 101 and a sub arrangement updating pattern part 102. A value "*" in the sub arrangement updating pattern part 102 denotes being "currently undetermined", while a value "?" in the updated pattern part 103 denotes being "automatically undeterminable". For example, a rule 104 stipulates that, if the original document has been updated within an underlined extent (L) and the value of the sub arrangement corresponding to the updated place is currently undetermined, the undetermined value shall be set at the "underline", i.e., "L". Accordingly, the update can be influenced on any case falling under the rule 104, automatically by the system. In addition, a rule 105 stipulates that, if the whole extent commented on has been moved or copied, the same comment shall be afforeded to the movement destination or copy destination. Besides, a rule 106 is similar in an updating pattern to the rule 104, but it is different in an updated pattern therefrom. More specifically, in case of the comment, when the original document has been updated within an extent commented on, the gist of the entire extent might change. Therefore, the value of the updated pattern part 103 is set to be "undeterminable", i.e., "?".

Here, the loop process "Loop-2" which revises the values in the arrangement fashion updating area 9 in succession will be described with reference to FIGS. 4b and 4c respectively showing the internal states of the arrangement fashion updating area 9 before and after this loop process "Loop-2".

The program 4 first refers to the sub arrangement kind part 101 and sub arrangement updating pattern part 102 of the knowledge base 12 (FIG. 10), to decide whether or not the part to which any rule of the knowledge base 12 is applicable exists in the arrangement fashion updating area 9 (612).

Now, an extent from the place A1 to the place A2 of the new matter part 315 in FIG. 4b agrees with the pattern of the sub arrangement updating pattern part 102 of the rule 106 in the knowledge base 12, so that the program 4 renders the decision 612 to the effect of the existence of the part to which the rule of the knowledge base 12 is applicable. Further, since the value of the sub arrangement updated pattern part 103 of the rule 106 is "?", the program 4 executes the step 614a to be described below, via the decision 613 to the effect that the updated pattern is underminable.

At the step 614a, the program 4 first revises the values of the new matter part 315 into the values "*" and sets them as shown in FIG. 4c, for that part (the extent from the place A1 to the place A2) in FIG. 4b to which the rule 106 of the knowledge base 12 is to be applied. Subsequently, the program 4 revises the values of the checking part 319 into values "$" and sets them for those places in FIG. 4b in which the values of the checking part 319 are "+" and in which the values of the new matter part 315 are "C" (Case-1), and it revises the values of the checking part 319 into the values "?" and sets them for the places in which the values of the checking part 319 are "?" and in which the values of the new matter part 315 are "*" (Case-2). Further, the combination between an original document former matter part 317 which contains the Document A to-be-updated and a former matter part 318 which is configured of a sub arrangement specification 522 and a detailed matter part 521 to-be-updated within the extent (the place A1 - the place A2) for applying the rule 106, is added to the head of this extent through a pointer 10A. Here, in the original document former matter part 317, the updated places (B1-B2) are endowed with marks "*" indicating to that effect.

By the way, although this case does not appear in FIG. 4b, the program 4 revises the values of the checking part 319 into the values "?" and sets them for places in which the values of the checking part 319 are "?" and in which the values of the new matter part 315 are blank (Case-3). Besides, assuming that the places of "C" in FIG. 4b are of "L", the rule 104 of the knowledge base 12 is applicable to the extent from the place A1 to the place A2. Therefore, the program 4 revises the values of the new matter part 315 and those of the checking part 319 as to the extent into the values "L" and "+" and sets them, respectively (the step 614b), via the decision 613 to the effect that the updated pattern is determinable.

Via the decision 612 to the effect that the new matter part 315 no longer contains a part to which any rule in the knowledge base 12 is applicable, the program 4 ends the above loop process "Loop-2". Then, it refers to the checking part 319 (FIG. 4c) from the head to the tail thereof and decides to the effect of the existence of the extent (from the place A1 to the place A2) all the values of which are not "+" (615 in FIGS. 18D1 and 18D2), and it sets to "1" the value of the update influencing completion sign 301A (FIG. 9a) of the sub arrangement (the first element of the sub arrangement table 51A) pointed by the pointer Q (616b). By the way, assuming that the values of the checking part 319 (FIG. 4c) are "+" from the head to the tail thereof, the program 4 sets the value of the update influencing completion sign 310A (FIGS. 9A1 and 9A2) to "0" (616a) via the decision 615 to that effect.

Subsequently, the program 4 replaces (617) the sub arrangement specification 335 (FIGS. 9A1 and 9A2) of the sub arrangement pointed by the pointer Q, with a sub arrangement updating state 331 (FIG. 4c). Further, the program 4 renders a decision 618 to the effect that the sub arrangement "Property 1" pointed by the pointer Q is not the final element of the sub arrangement table 51A, and it increments the pointer Q by one (619) so as to execute the automatic influencing process for the next sub arrangement "Property 2" similarly to the above. Thereafter, via the decision 618 to the effect that the sub arrangement "Property 2" pointed by the pointer Q is the final element, a decision 620 to the effect that the arrangmeent name "View 1" pointed by the pointer P is not the final element of the arrangement name table 20A, and a decision 622 to the effect that there is any element of the sub arrangement table 51A as to which the values of the update influencing completion sign 301A is not "0", the program 4 sets to "1" (622b) the value of the update influencing completion sign 300A as to the first element of the arrangement name table 20A currently pointed by the pointer P, and it increments the pointer P by one (621) so as to execute the automatic influencing process similar to the above for the next arrangement name "View 2". In case of the arrangement name "View 2", the program 4 sets the value of the update influencing completion sign 300A to "0" (622a) via the decision 622 to the effect that the values of the update influencing completion sign 302A are "0" as to all the elements of the sub arrangement table 52A.

In the above way, the program 4 handles all the sub arrangements in the arrangement fashion storing area 17A (FIGS. 9A1 and 9A2), namely, all the elements of the sub arrangement tables 51A and 51B (the above handling operations are executed by the series of steps 59b). FIGS. 5a and 5b show the states of the arrangement fashion storing area 17A before and after the series of steps 59b, respectively. In FIG. 5a, all the values of the update influencing completion sign 301A and the update influencing completion sign 300A are initialized to "0". In contrast, in FIG. 5b, the value of the first element of the update influencing completion sign 301A is "1", and the value of the first element of the update influencing completion signa 300A is accordingly "1".

Subsequently to the above, the program 4 stores the updated Document A and update information in the original document storing area 16A (59c) via the decision 620 to the effect that the arrangement name pointed by the pointer P is the final element of the arrangement name table 20A. More specifically, the matter part 41A and form part 42A shown in FIGS. 9A1 and 9A2 are respectively replaced with the updated ones (as to the matter part 41A, one shown in FIG. 3c) contained in the origianl document updating area 8 (a step 59c1 in FIG. 18e), and the document registering format 554 is presented as shown in FIG. 12f, so as to update the meta-information part 43A in accordance with the content of the input of the user (59c2). By the way, since the Document A does not quote any other document unlike the derived Document C, nothing is done as the step 59d of automatically registering the arrangement in the document being the quotation source. After the step 59c, the one-document working area 111 is released (59e).

Thus, the program 4 ends the series of steps 59 (automatic influencing on the arrangement, and the registration of the original document) concerning the Document A and establishes the input awaiting state 50 again.

B.6 Inquiry influencing:

Next, in conjunction with the interface examples in FIGS. 14a–14h, there will be described an inquiry influencing process (200) in which, in order to influence the update of the original document on the registered arrangement, the program 4 solves through inquiring of the user the place that could not been solved by the process 59b (the automatic influencing of the update of the original document on the registered arrangement) explained in the "register document" before. As indicated in FIGS. 17C1 and 17C2, the inquiry influencing process 200 is a process which, when any of sub arrangements designated for the "execute arrangement" or the "updating of the arrangement" has not completed update influencing (a decision 66a), is executed for completing the update influencing of such sub arrangement prior to the "execute arrangement" or the "updating of the arrangement", or it is a process which, when any sub arrangement has not completed update influencing (a decision 64b) after the presentation of the update influencing situation (the step 64a), is executed for completing the update influencing of one of such sub arrangements designated by the user. The detailed flow of the inquiry influencing process 200 is shown in FIGS. 22A1–22B2.

It is now assumed that the Document A has been updated and registered as described before and that the process 59b (the automatic influencing of the update of the original document on the registered arrangement) has already been executed, with the result that the arrangement fashion storing area 17A is in the state shown in FIG. 5b. As indicated by the update influencing completion sign 310A in FIG. 5b, the second element of the sub arrangement table 51A appoints a sub arrangement specification 520 and has completed the update influencing thereof, but the first element appoints an updating state part 331 and has not completed the update influencing thereof yet.

When the user makes the request for calling out the Document A in the input awaiting state 50, the program 4 executes the analysis 51 of the input content, the decision 51a to the effect that the request for ending the document handling is not pertinent, the step 52a of allotting the one-document working area 111 to the Document A, the decision 52 to the effect that the request for calling out the Document A is pertinent, and the step 54 of calling out the Document A and initializing the respective areas. A state shown in FIG. 14a is presented on the display 3.

Figure 14A:
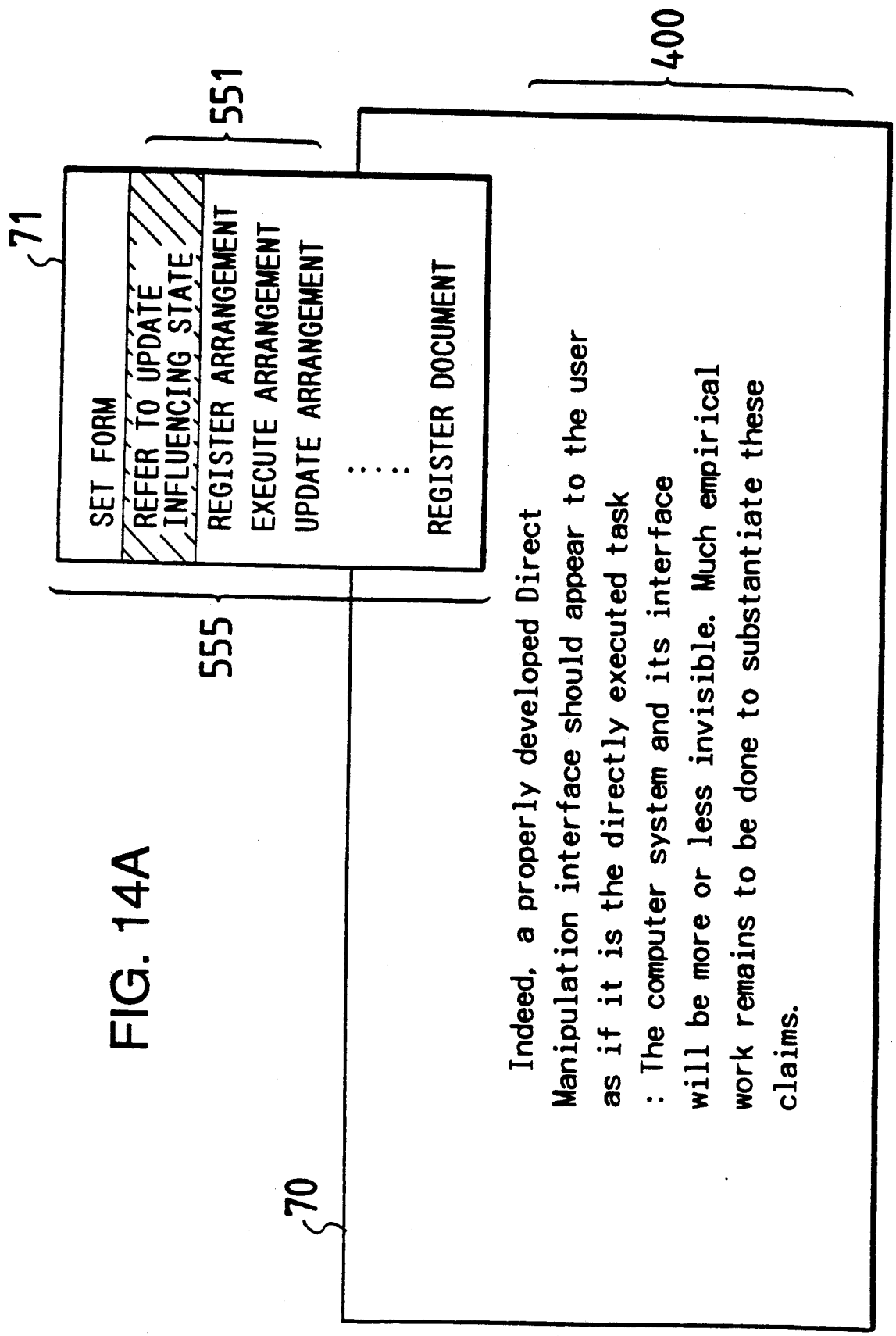

In the input awaiting state (55), the user selects "Refer to update influencing state" from within the document handling menu 555 presented on the window 71 as illustrated in FIG. 14a. Then, the program 4 presents the update influencing situation of the Document A on the window as shown in FIG. 5b (64a), via the analysis 56 of the input content and the decision (the decision 57 and the decisions 60–64) to the effect that the user's input is the request for the reference to the update influencing situation. Subsequently, the program 4 renders the decision 64b to the effect of the presence of any arrangement which has not completed update influencing. In an input awaiting state (64c), the user selects the arrangement "View 1" presented on the window 78, as an object for the update influencing. Then, the program 4 refers to the arrangement fashion storing area 17A (especially, the update influencing completion sign 301A) under the state of FIG. 5b again and stores one of the sub arrangements of the "View 1" requiring the update influencing, into the arrangement fashion buffer 7 (FIGS. 1A and 1B) (621).

Figure 6A:
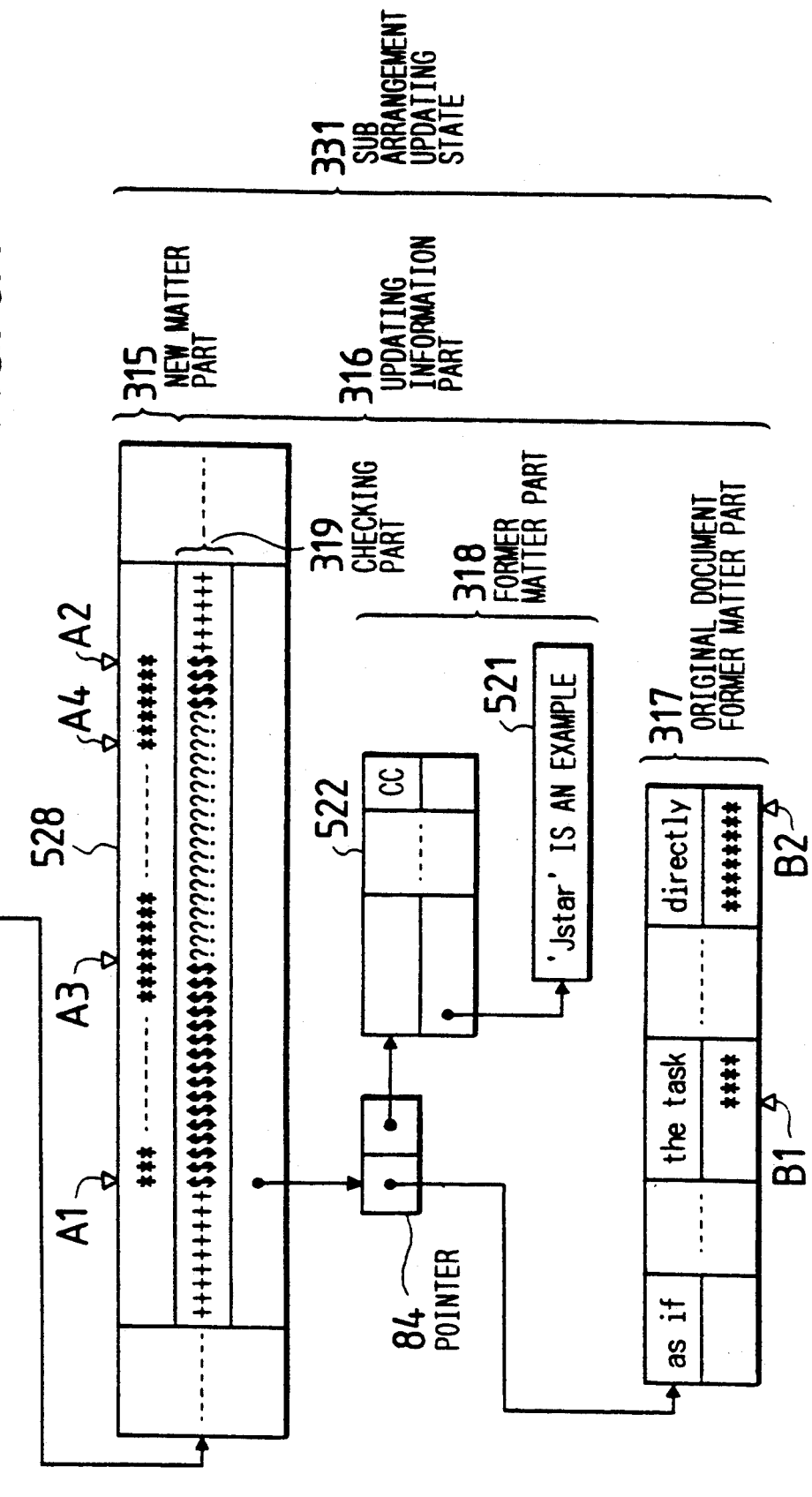
FIGS. 6a-6b are diagrams showing the change of the contents of an arrangement fashion buffer (7) before and after the step (200) in FIGS. 17C1 and 17C2.

At the end of the step 621, the state of the arrangement fashion buffer 7 is as shown in FIG. 6a. In FIG. 6a, an uncompleted arrangement name table 313 stores the arrangement name of the arrangement requiring the update influencing (the arrangement name "View 1" as to which the value of the update influencing completion sign 300A of the arrangement name table 20A shown in FIG. 5b is "1"), while an uncompleted sub arrangement table 314 stores that one of the sub arrangements owned by the element "View 1" of the uncompleted arrangement name table 313 which requires the update influencing (for the "View 1" in FIG. 5b, the sub arrangement "Property 1" as to which the value of the update influencing completion sign 301A of the sub arrangement table 51A is "1"). In addition, the element "Property 1" of the uncompleted arrangement element table 314 appoints the sub arrangement updating state 331 likewise to the element "Property 1" of the sub arrangement table 51A in FIG. 5b.

Thereafter, the program 4 refers to the arrangement fashion storing area 17A (FIGS. 9A1 and 9A2) and presents the list of the sub arrangements not having completed the update influencing, on the window 78 as shown in FIG. 14b (622).

Subsequently, in an input awaiting state (623), the user selects the sub arrangement "Property 1" as an object for the update influencing, as illustrated in FIG. 14c. Then, the program 4 flickers and displays a place 406 which requires the update influencing based on the inquiring of the user, as to the selected sub arrangement "Property 1" (624). When, in an input awaiting state (625), the user makes a request for the detailed information of "Why is the update influencing required?", the program 4 presents the detailed information as shown in FIG. 14d (640) via decisions 626–627 to the effect of the request for the detailed information. In FIG. 14d, the place 406 which requires the update influencing based on the inquiring of the user is flickered and displayed on the window 70 in such a manner that the updated places and other places of the original document are respectively distinguishable. Here, those updated places of the original document which are flickered and displayed are the series of places whose contents or positions have been altered in the original document, that is, they signify the extent (the place A3-the place A2) from the head of the places as to which the values of the checking part 319 in FIG. 5b are "?", to the place immediately preceding the places as to which the values are "+".

Besides, on the window 82, there are presented those accessory information items associated with the flickered place 406 which have been added (FIG. 6c) in the process 59b (the automatic influencing of the update of the original documetn on the registered arrangement), that is, the former matter part 318 (to the effect that the comment "Jstar is an example" has been afforded) and the original document former matter part 317 (the content of the Document A to-be-updated corresponding to the flickered places: the updated places B1–B2 corresponding to the places A3–A2 are flickeringly displayed).

Figure 6B:
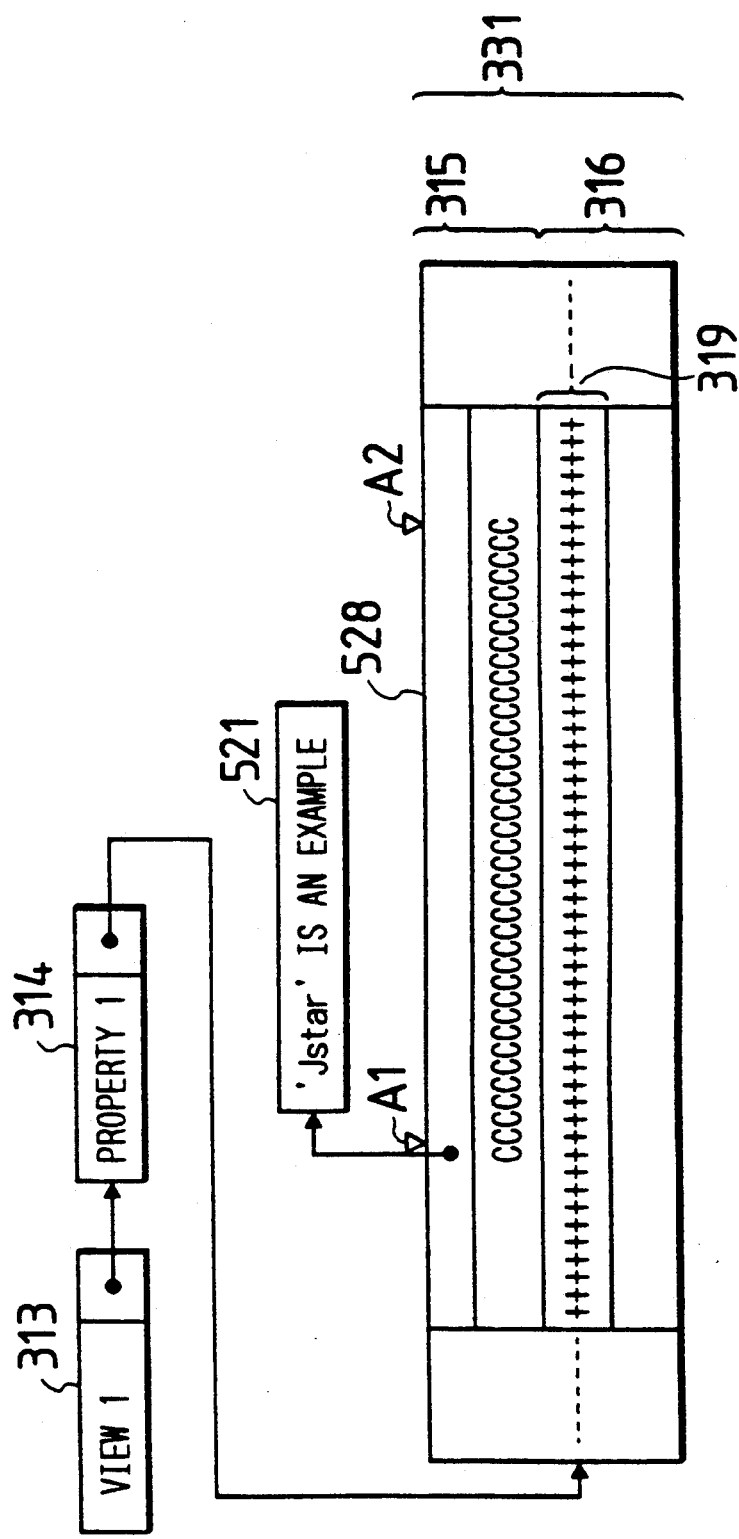
Figure 14E:
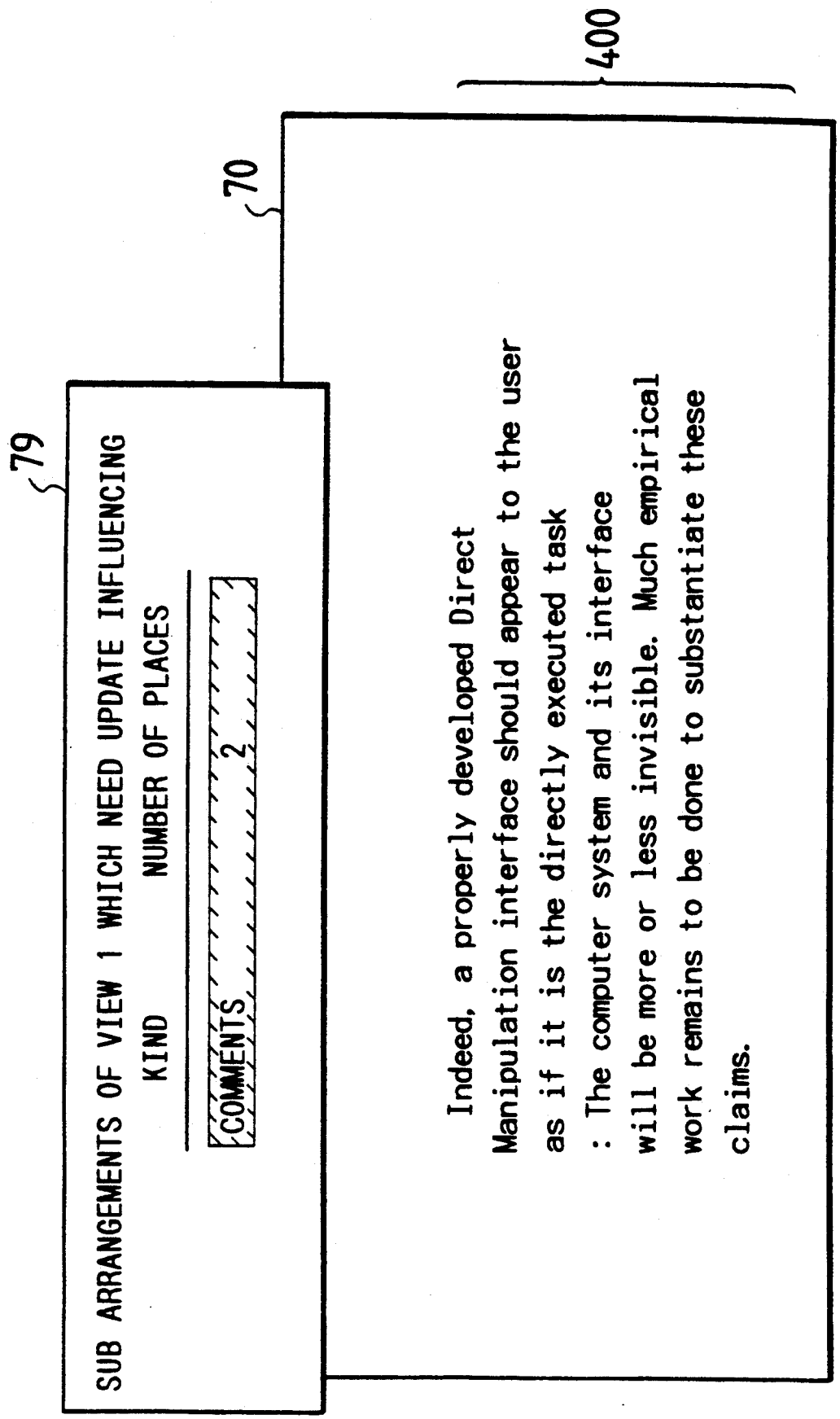

Thereafter, the user renders decisions as to how the updates of the Document A are influenced on the sub arrangement "Property 1", on the basis of the flickered places on the window 70 and the detailed information on the window 82. On the basis of the user's responses, the program 4 operates on to complete the update influencing. In the input awaiting state (625) shown in FIG. 14d, the user gives an input to the effect that the comment 404 has been determined to be left, as in the Document A to-be-updated". Then, via a decision (decisions 626–628) indicating to the effect that the user, has "determined", the program 4 revises the corresponding places (the extent A1–A2) of the new matter part 315 in the arrangement fashion buffer 7 shown in FIG. 6a, into the values "C" in the former matter part 318 and sets them, and it also adds the detailed information (the concrete content of the comment) (a step 630 in FIGS. 22B1 and 22B2). Further, it revises the values of the corresponding places (the extent A1–A2) of the checking part 319, into the values "+" expressive of the "determination" and sets them, and it deletes the former matter part 318 and original document former matter part 317 which are no longer necessary (631). As a result, the content of the buffer 7 becomes as shown in FIG. 6b. Thus, the program 4 ends the update influencing process for the first one of the places which require the update influencing based on the inquiring of the user (the place flickeringly displayed on the window 70 in FIG. 14c). The program 4 erases the flickering on the window 70 and shuts the window 82, thereby to end the display that the first place requires the update influencing, and the presentation of the detailed information concerned therewith (632). Further, it decrements the "number of corresponding places" on the window 79 by one as illustrated in FIG. 14e, thereby to revisedly display the outline of the sub arrangement which needs the update influencing (6320).

The program 4 executes a loop process extending from the input awaiting state 625 to a decision 633 as to whether or not the update influencing has been ended for the sub arrangement being currently processed, thereby to perform the update influencing process for each of the places requiring the update influencing, in a manner to dialogue with the user as described above. When the program 4 has ended the update influencing for the sub arrangement being currently processed, it renders the decision 633 to the effect of the end of the update influencing as to the sub arrangement. Subsequently, it replaces the sub arrangement updating state 311 (FIG. 5b) in the arrangement fashion storing area 17A being the state before the inquiring of the user, with the new matter part 315 (refer to FIG. 6b) in the buffer 7 under the update influencing completion state, it sets the value of the corresponding part of the update influencing completion sign 301A shown in FIG. 5b, to "0", and it deletes the sub arrangement "Property 1" being currently processed, from the uncompleted sub arrangement table 314 (FIG. 6b) in the buffer 7 (634). Incidentally, in a case where the user has given an input to the effect of "deleting the comment 404" in the input awaiting state 625 shown in FIG. 14d, the program 4 renders the decision (626–629) that the input is to the effect of "deletion". Subsequently, it sets the corresponding places (the extent A1–A2) of the new matter part 315 shown in FIG. 6a, to blanks (629a), and it sets the values of the check part 319 (631). Thenceforth, it executes the same process as in the case of the input to the effect of the "determination".

Via a decision 635 to the effect that all the elements of the uncompleted sub arrangement table 314 being currently processed have been deleted, the program 4 deletes the arrangement name "View 1" appointing the uncompleted sub arrangement table 314, from the uncompleted arrangement name table 313, and it revises the value of the corresponding part of the update influencing completion sign 300A shown in FIG. 5b, into "0" and sets this value (636). Incidentally, while any element still remains in the uncompleted element table 314, the program 4 returns to the input awaiting state 625 again after the decision 635. Thus, the respective elements of the uncompleted sub arrangement table are successively subjected to the update influencing process based on the inquiring of the user, similarly to the foregoing.

Figure 14F:
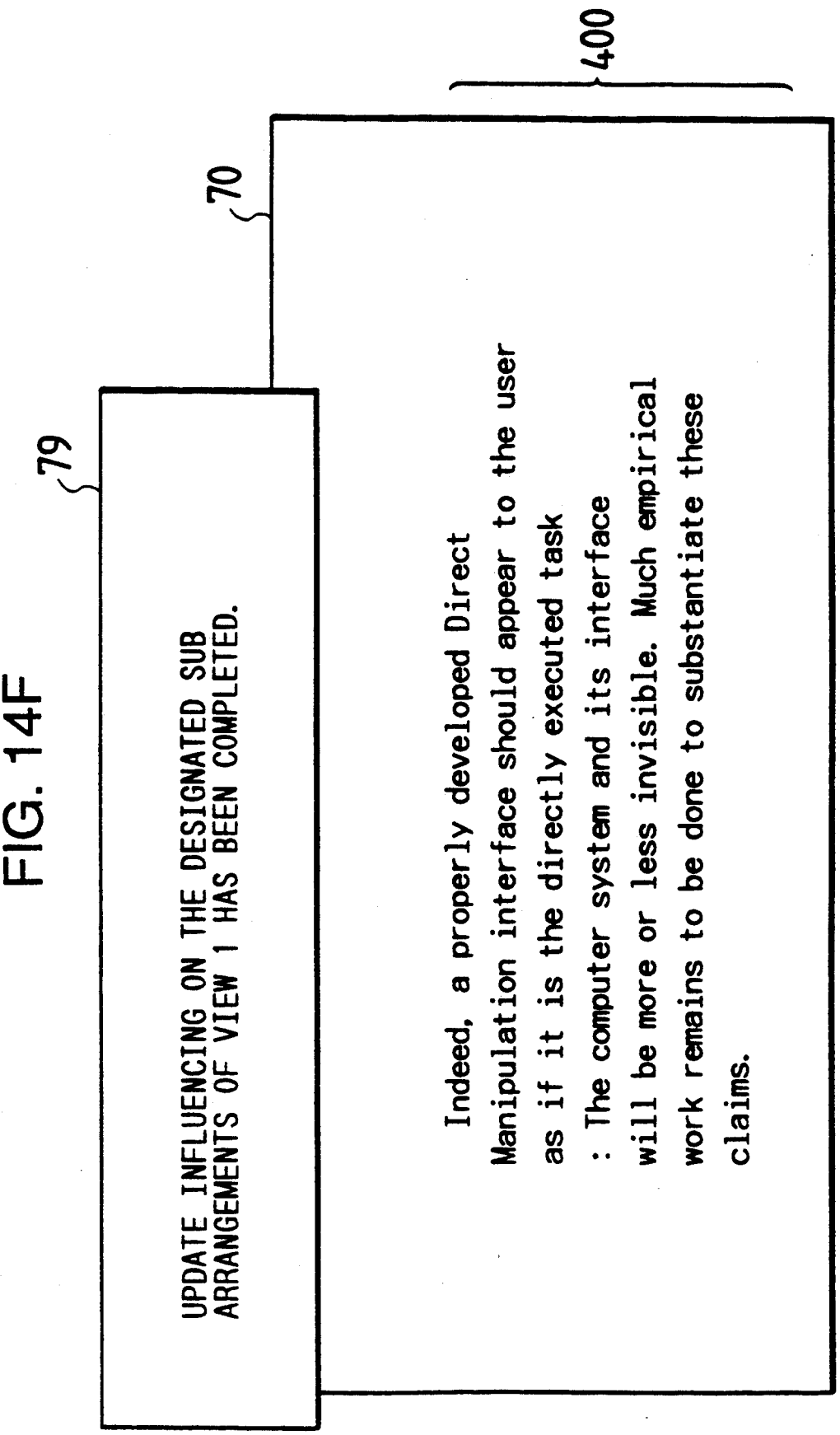
Figure 14G:
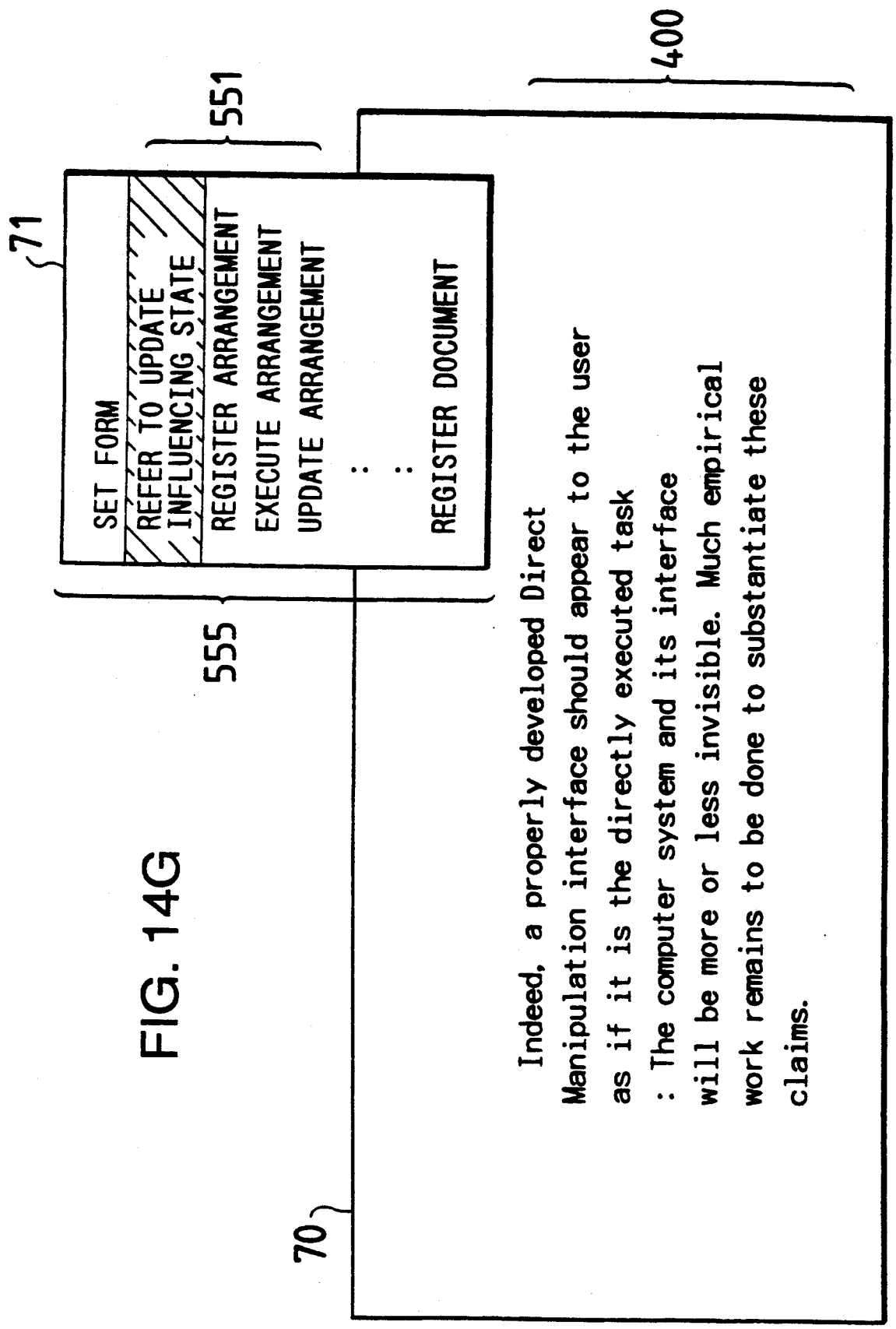
Figure 14H:
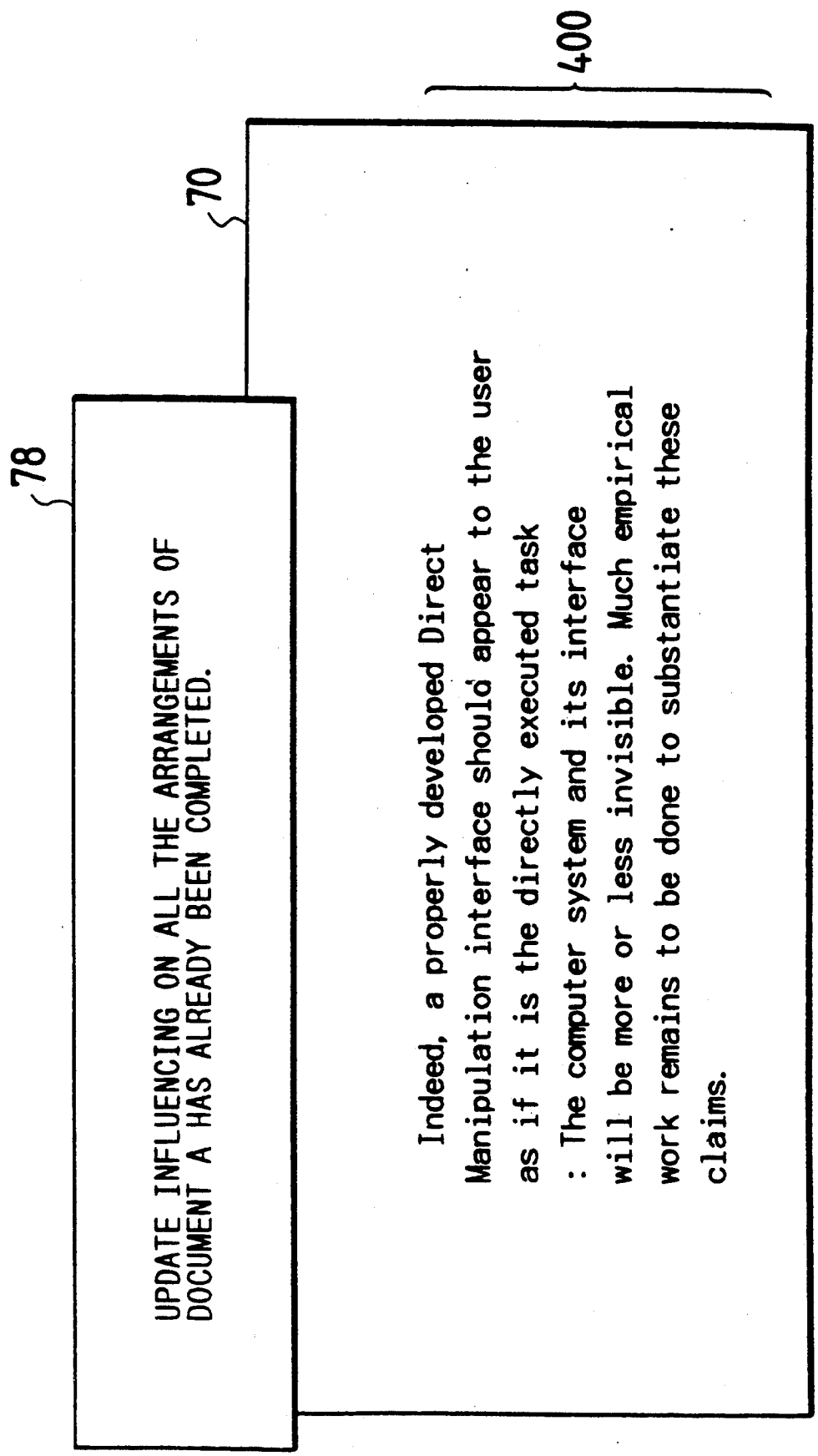

Subsequently, via a decision 637 to the effect that all the elements of the uncompleted arrangement name table 313 have been deleted, the program 4 outputs a message to the effect that the update influencing has ended for all the sub arrangements selected by the user as shown in FIG. 14c, onto the window 79 as illustrated in FIG. 14f (638), whereby the series of steps 200 (the inquiry influencing) is ended. At this stage, the arrangement fashion storing area 17A is under a state shown in FIG. 5c. In this figure, all the values of the update influencing completion signs 300A and 301A are the values "0" expressive of the "influencing completion", and the first and second elements of the table 51A appoint the sub arrangement specifications 528 and 520, respectively. Subsequently to the above, in the input awaiting state 55 (FIG. 17b), the user selects the "refer to update influencing state" again from within the arrangement handling menu 551 presented on the window 71, as illustrated in FIG. 14g. Then, via the analysis 56 of the input content and the decision (the decision 57 and the decisions 60–64) to the effect of the reference to the update influencing situation, the program 4 refers to the update influencing completion sign 300A within the arrangement name table 20A shown in FIG. 5c and renders the decision 64b to the effect that the update influencing has been completed for all the arrangements", because all the values of the completion sign 300A are "0" Subsequently, as shown in FIG. 14h, the program 4 outputs on the window 78 a message to the effect that the update influencing has been executed on all the arrangements registered for the Document A presented on the document window 70, and it establishes the input awaiting state 55 again.

In the above, there has been described the case where, in the series of steps 200 (the inquiry influencing), the user responds to the inquiries about all the places which need the update influencing. It is now assumed that, at a stage at which the update influencing is not completed, the user gives an input to the effect of a "request for ending the update influencing" in the input awaiting state 624. Then, via the decision 626 to the effect of the request for the end, the program 4 replaces the sub arrangement updating state 331 (FIG. 5b) in the arrangement fashion storing area 71A being the state before the inquiring of the user, with the new matter part 315 in the buffer 7 under a state under which the update influencing has been executed halfway, and it ends the inquiry influencing process 200 (639). In this case, the value of the update influencing completion sign 301A remains "1", so that the program 4 restarts the inquiry influencing 200 when the user has made the request for the execution of the arrangement, the updating of the arrangement or the reference to the update influencing situation later. In the above, the inquiry influencing process 200 at the request for the reference to the update influencing situation has been described in conjunction with the interface examples in FIGS. 14a–14h. The inquiry influencing process 200 at the request for the execution of the arrangement or the updating of the arrangement proceeds similarly.

B.7 Updates of Arrangement:

Next, the step (69) of updating the arrangement as shown in FIG. 17c will be described in conjunction with the interface examples in FIGS. 24a–24h. It is assumed that the document file 15A has been brought into the state shown in FIG. 9c beforehand by the procedure of steps already described, and that the user named "Shiraishi" wants to delete the comment 404 afforded to the passage 401 shown in FIG. 15a, from the arrangements registered for the Document A. It is also assumed that the input awaiting state (55) has been established via the flow from the step 50 to the step 54 in FIGS. 17A1 and 17A2.

Figure 24C:
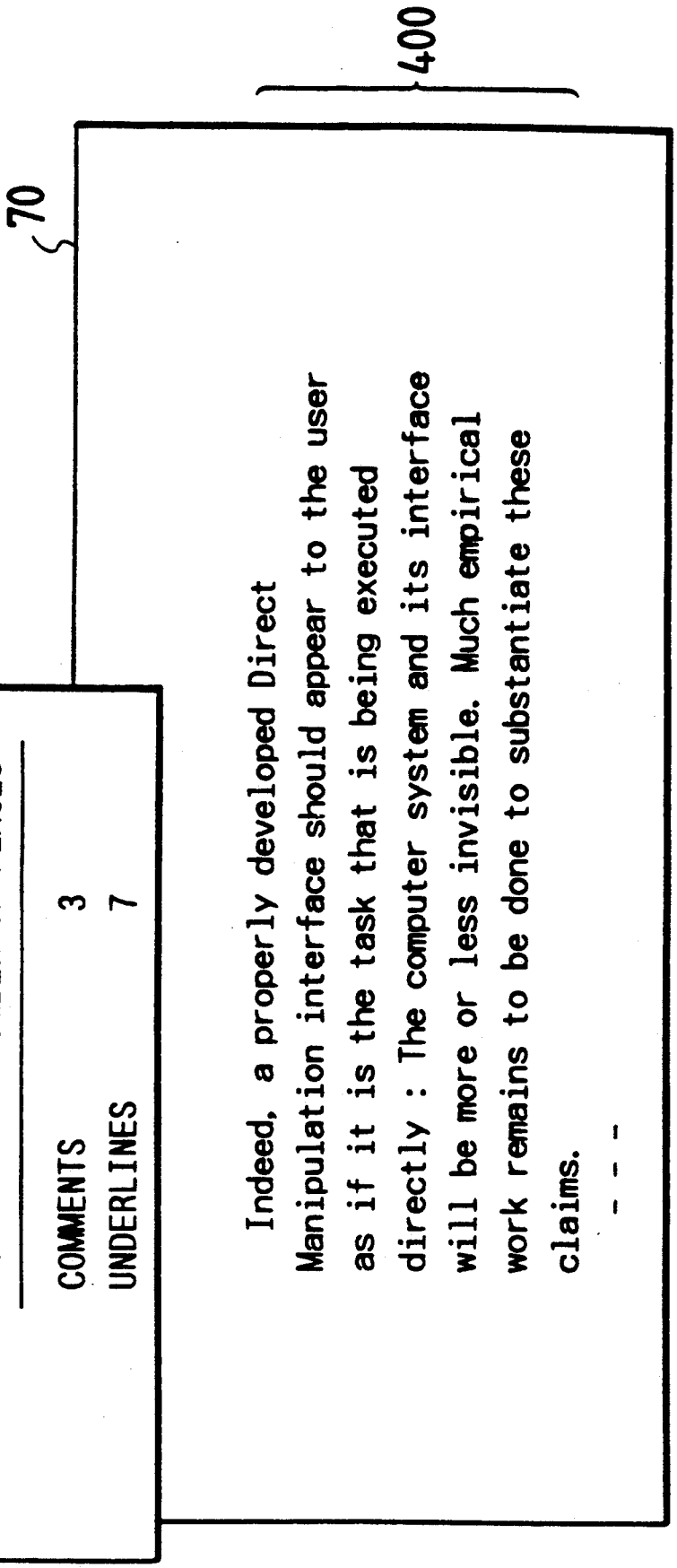
Figure 24D:
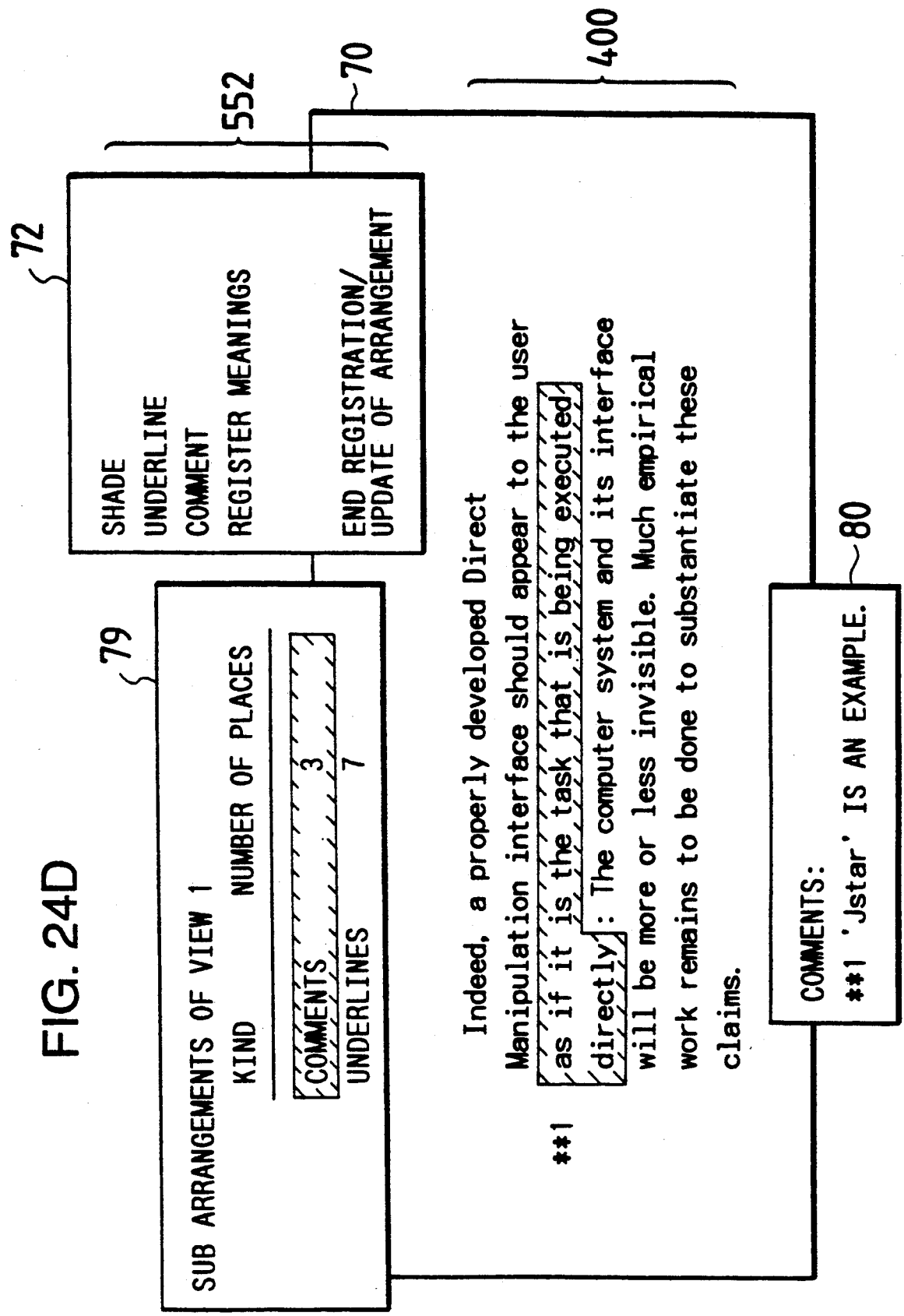

In the input awaiting state (55), the user selects the "update arrangement" signifying that he/she wants to update the registered arrangement, from within the document handling menu 555 as illustrated in FIG. 24a. Then, the program 4 executes the series of steps 66 (secrecy check and situation presentation) via the flow from the step 56 to the decision 63. The detailed flow of the process 66 is shown in FIGS. 20A1 and 20A2. The program 4 first refers to the arrangement name table 20A shown in FIGS. 9A1 and 9A2 and further refers to the meta-information part 32A and meta-information part 31A respectively appointed by the elements "View 1" and "View 2" of the table 20A, and it presents the list of the arrangements to which the current user "Shiraishi" is permitted to refer, that is, the outlines of the arrangements "View 1" and "View 2" (66b). Now that all the values of the update influencing completion sign 300A of the arrangement name table 20A in FIGS. 9A1 and 9A2 are the values "0" expressive of "completed influencing", any of the arrangements need not be indicated to the effect of uncompleted update influencing, at the step 66b. In the input awaiting state (66c), the user selects the "View 1" from within the list of the arrangements presented on the window 78, as illustrated in FIG. 24b. Then, the program 4 refers to the arrangement fashion file 21A appointed by the selected arrangement name "View 1" within the arrangement fashion storing area 17A shown in FIGS. 9A1 and 9A2 and presents the outlines of the sub arrangements of the arrangement "View 1" on the window 79 as illustrated in FIG. 24c. Subsequently, in the input awaiting state (66e), the user selects "Property 1" from among the sub arrangements presented on the window 79. Then, the program 4 executes the series of steps 69 (the updating of arrangement) via the decision 66a, because the value of the update influencing completion sign 301A shown in FIGS. 9A1 and 9A2, corresponding to this sub arrangement is "0" expressive of the "influencing completion". The details of the process 69 are shown in FIGS. 21a–21d. As seen from these figures, the process 69 includes a process 69a (preparation for the execution and updating of arrangement), a process 69b (updating of direct information) and a process 69c (updating of meta-information) as its main constituents. Many of the individual steps of the constituent process are common to the individual steps of the process 67 (execute arrangement) or the process 65 (register arrangement). Via a decision 772 and as the series of steps 69a (preparation for the execution and updating of arrangement), the program 4 presents the arrangement kind menu 552 on the window 72 as shown in FIG. 24d (a step 651), stores the sub arrangement name of the sub arrangement "Property 1" in the arrangement composing buffer 10 (706), refers to the buffer 10 and arrangement fashion storing area 17A and displays a result obtained by subjecting the Document A to the sub arrangement "Property 1" (707) (the result is the flickered part of the Document A in FIG. 24d), and copies the sub arrangement name "Property 1" and sub arrangement specification 335 of the pertinent sub arrangement from the arrangement fashion storing area 17A into the buffer 7 (773). Subsequently, in an input awaiting state (774 in FIG. 21b), the user makes a request for the presentation of detailed information on the flickered part. Then, via a decision 775, a decision 70 and a decision 710, the program 4 presents the detailed information, namely, the concrete content of a comment made on the flickered part, on the window 80 as illustrated in FIG. 24d (711).

Thus, the user named "Shiraishi" can acknowledge the content of the currently registered arrangement before the updating thereof. If the request for the presentation of detailed information is made as to the sub arrangement which does not have the detailed information such as "underline", the program 4 outputs a message to the effect that "there is no detailed information" (712). The above is the series of steps 69a (the preparation for the execution and updating of the arrangement).

Figure 24E:
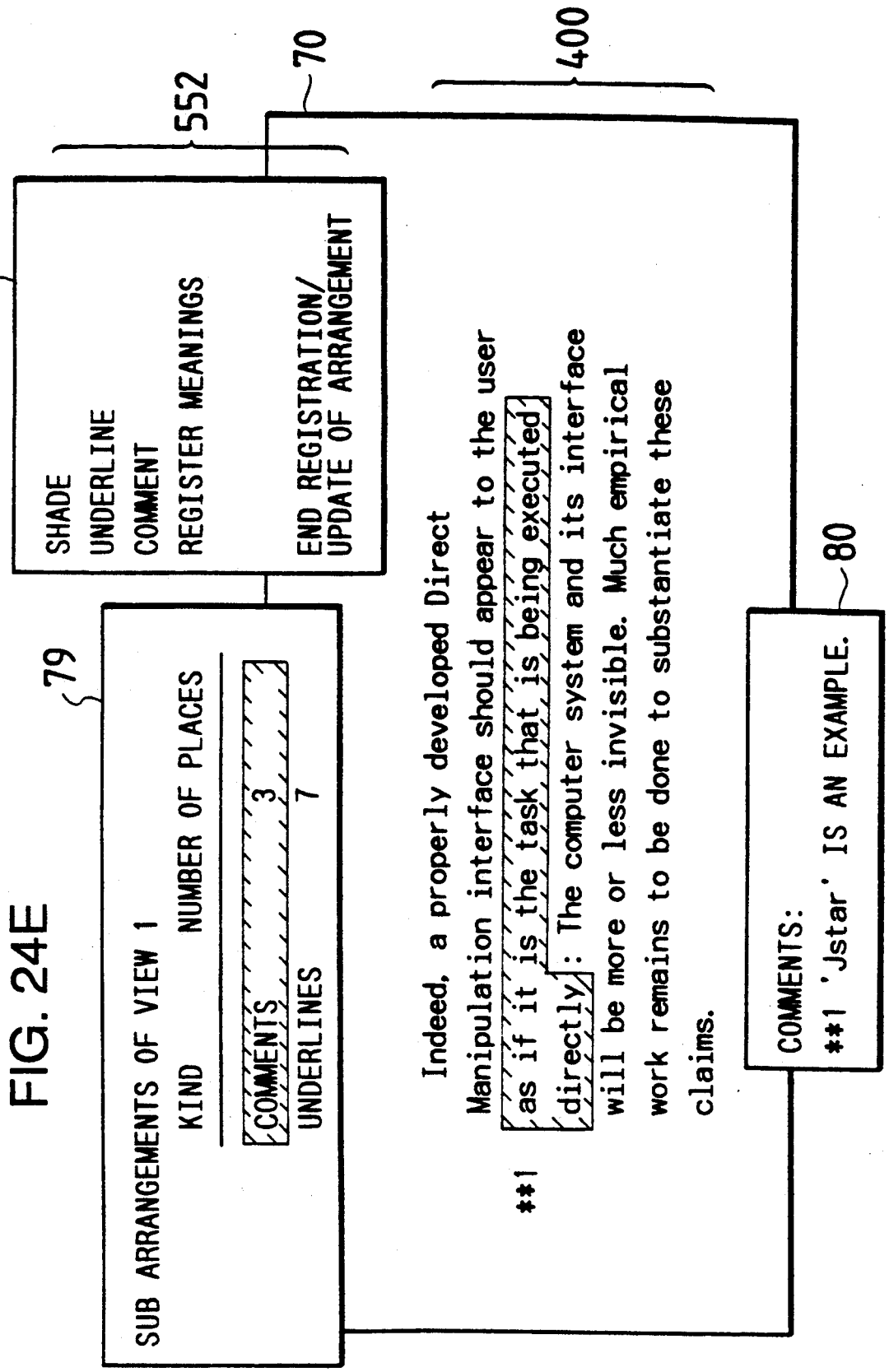
Figure 24F:
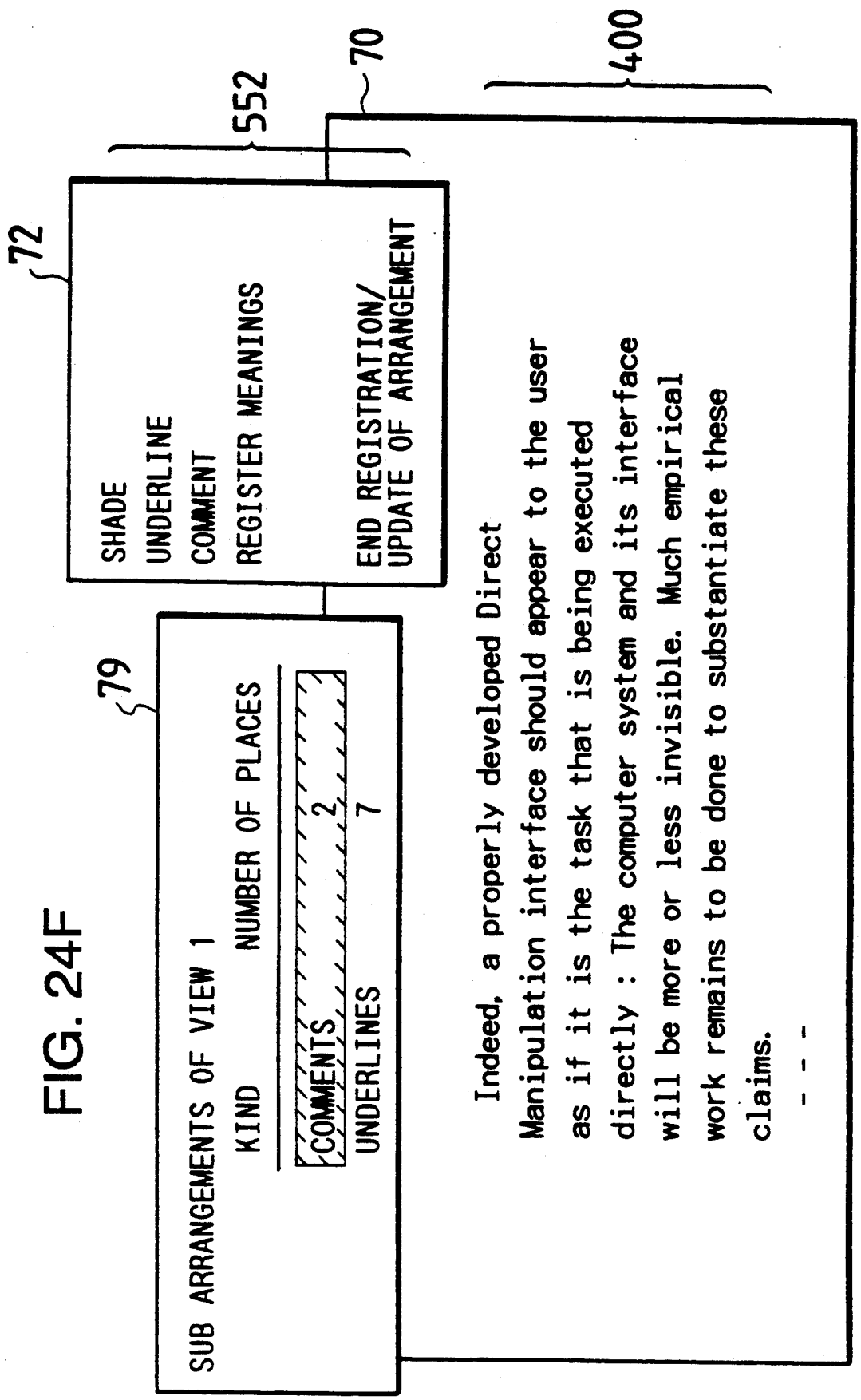
Figure 24G:
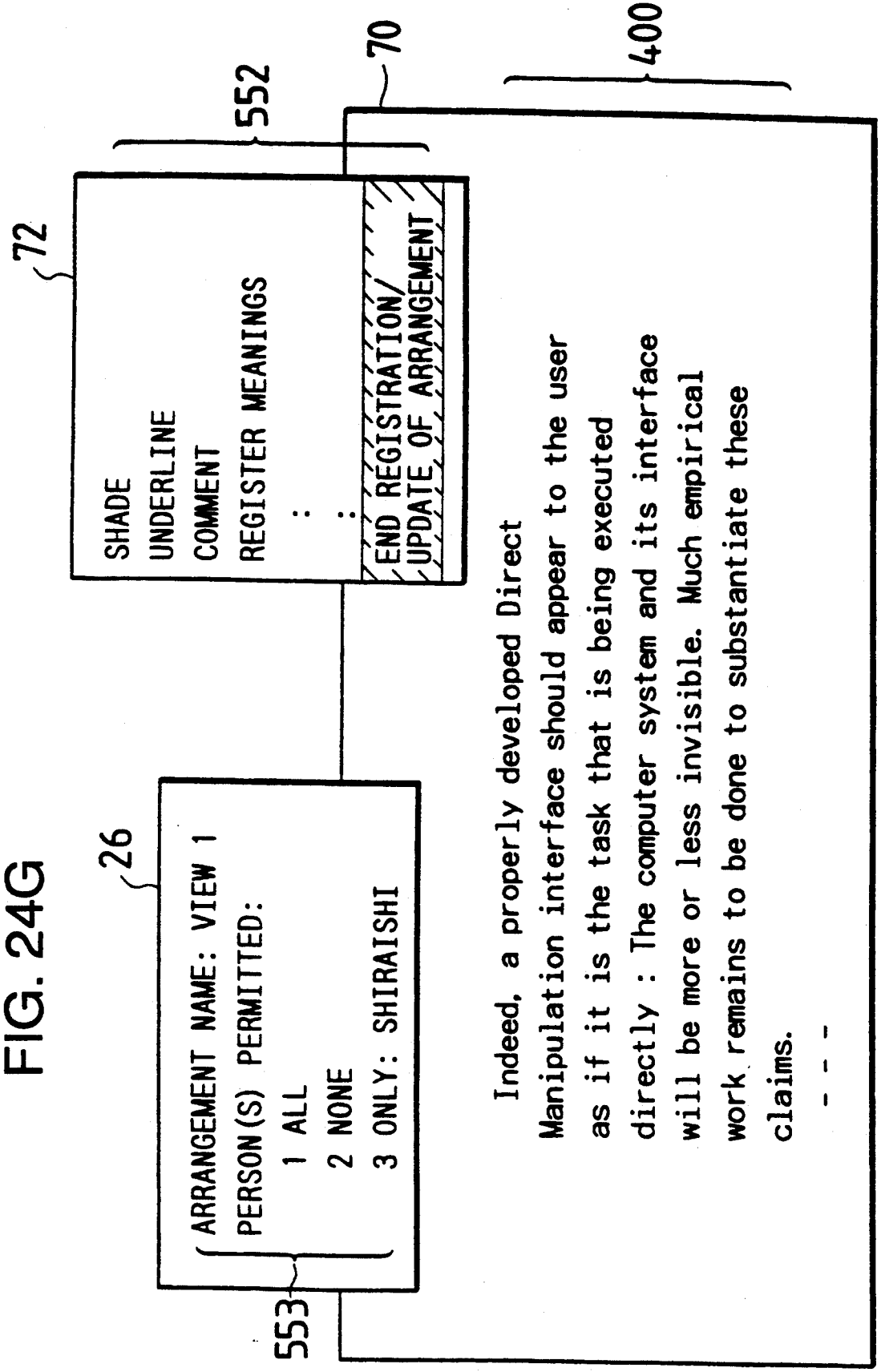
Figure 24H:
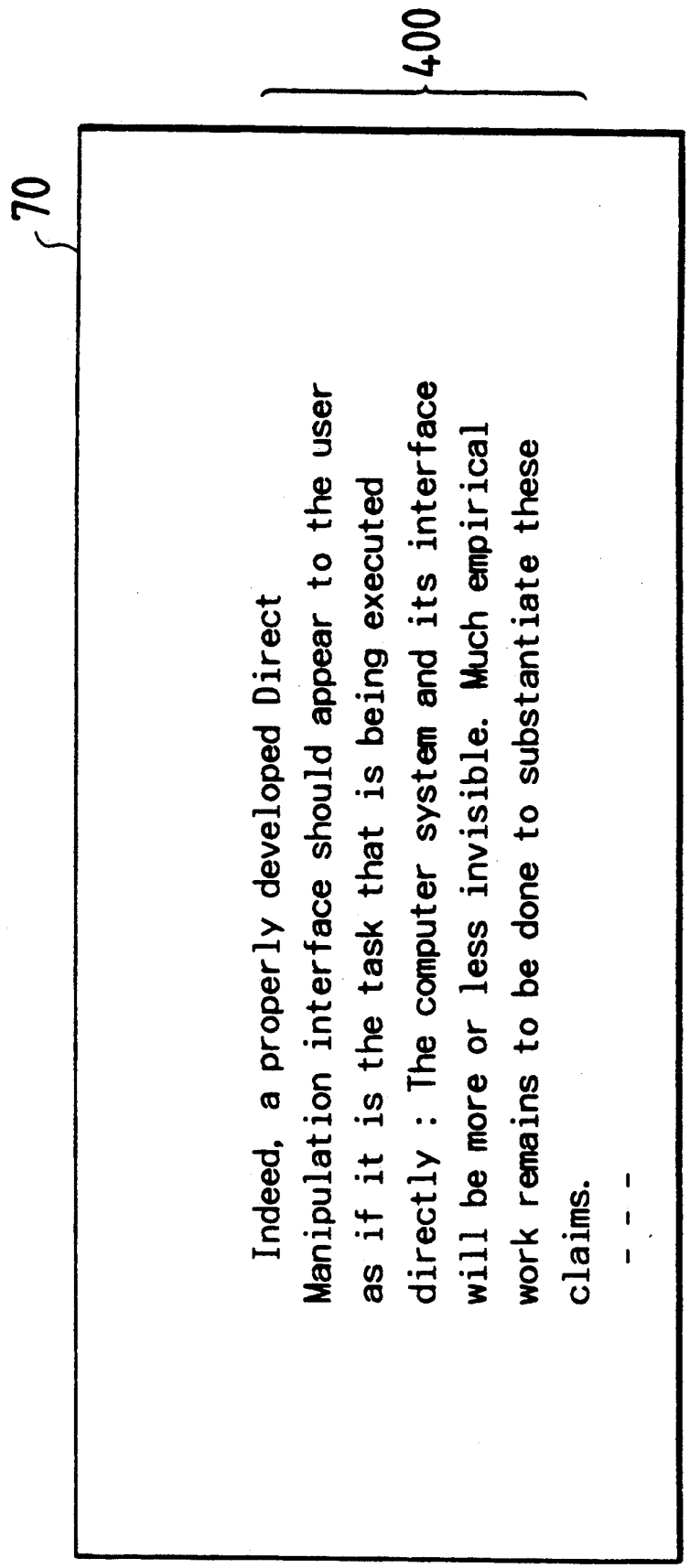

Subsequently, the user wants to delete the comment. In the input awaiting state (774), he/she selects the corresponding passage in the Document A with the mouse 2 as illustrated in FIG. 24e and simultaneously depresses a "delete key" and a "function" key on the keyboard 1, thereby to make a request for deleting the pertinent sub arrangement. Then, the program 4 executes the series of steps 69b (the updating of direct information) shown in FIG. 21c. More specifically, via a decision 655, the program 4 updates the selected place in the sub arrangement specification 335 within the buffer 7, from the values "C" expressive of "comment" into the values "blank" expressive of "not corresponding" and further deletes the detailed information (the concrete content of the comment) appointed from the head of the selected place in the sub arrangement specification 335 (657). Thus, the selected comment is deleted from the sub arrangement "Property 1" of the arrangement "View 1" of the Document A. Then, via a decision 658, the program 4 displays to the effect of decrease in the number of places of comments by one, on the window 79 as illustrated in FIG. 24f (6601). Subsequently, in the input awaiting state (774), the user selects "Request for ending the updating of arrangement" from within the arrangement kind menu 552 as illustrated on the window 72 in FIG. 24g. Then, the program 4 presents the arrangement registering format 553 and establishes an input awaiting state as shown in FIG. 24g (662), via the decision 775 (FIG. 21b) to the effect that the user's input is the request for ending the updating of the arrangement and a decision 661 (FIG. 21d) to the effect that the arrangement fashion buffer 7 is not empty. At the step 662, however, the arrangement name "View 1" already registered is automatically entered in the item of the arrangement name, unlike the case of registering the arrangement for the first time. Subsequently, the program 4 refers to the updated sub arrangement in the buffer 7 and substitutes the referred content for the sub arrangement specification 335 of the arrangement fashion storing area 17A (6641). Thus, the series of steps 69b (the updating of direct information) are ended. Next, the program 4 executes the process 69c (the updating of meta-information). More specifically, the program 4 generates a meta-information part and substitutes it for the meta-information part 31A in the arrangement fashion storing area 17A (69c), on the basis of the content of the input from the user to the arrangement registering format 553 to the effect that the person permitted to refer to the arrangement is "Shiraishi". Thereafter, the program 4 ends the presentation of the menu 552 as well as the arrangement registering format 553 (665). Then, a state shown in FIG. 24h is presented on the display 3.

Thus far, the series of steps 69 (the updating of arrangement) have been explained by taking the case of deleting part of the registered arrangement, as an example. In the above, the user's operation of simultaneously depressing the "delete key" and "function key" on the keyboard 1 has been held in correspondence with the instruction to the effect of deleting the specified place from the sub arrangement. Similarly, the operation that, after selecting a place in a document with the mouse 2, the user depresses a "ditto key" on the keyboard 1 and further selects part of the place (flickered place) of the Document A with the comment registered, by the use of the mouse 2, can be brought into correspondence with an instruction to the effect of expanding a place for registering a comment, into the former place selected with the mouse as added to the latter place selected with the mouse. Besides, the user can supplement a registered content to the existing arrangement through the same steps as those of the registration of the arrangement in such a way that the program 4 executes a flow extending from the decision 655 to a step 660.

In the foregoing, the details of the operations of the documents managing program 4 have been described.

As described above, this embodiment permits users to multifariously arrange an identical literature or generated document and even the same user to do so according to time and circumstances. Also, it permits the plurality of users to share accessory information items on the document so as to choose them and with secrecy kept. In addition, starting from one document, the users can know the derivation of another document therefrom or refer to the content of the derived docuemtn. Moreover, when an original document has been updated, the updates can be influenced on the arrangement fashion and derived document of the original document.

Figure 7A:
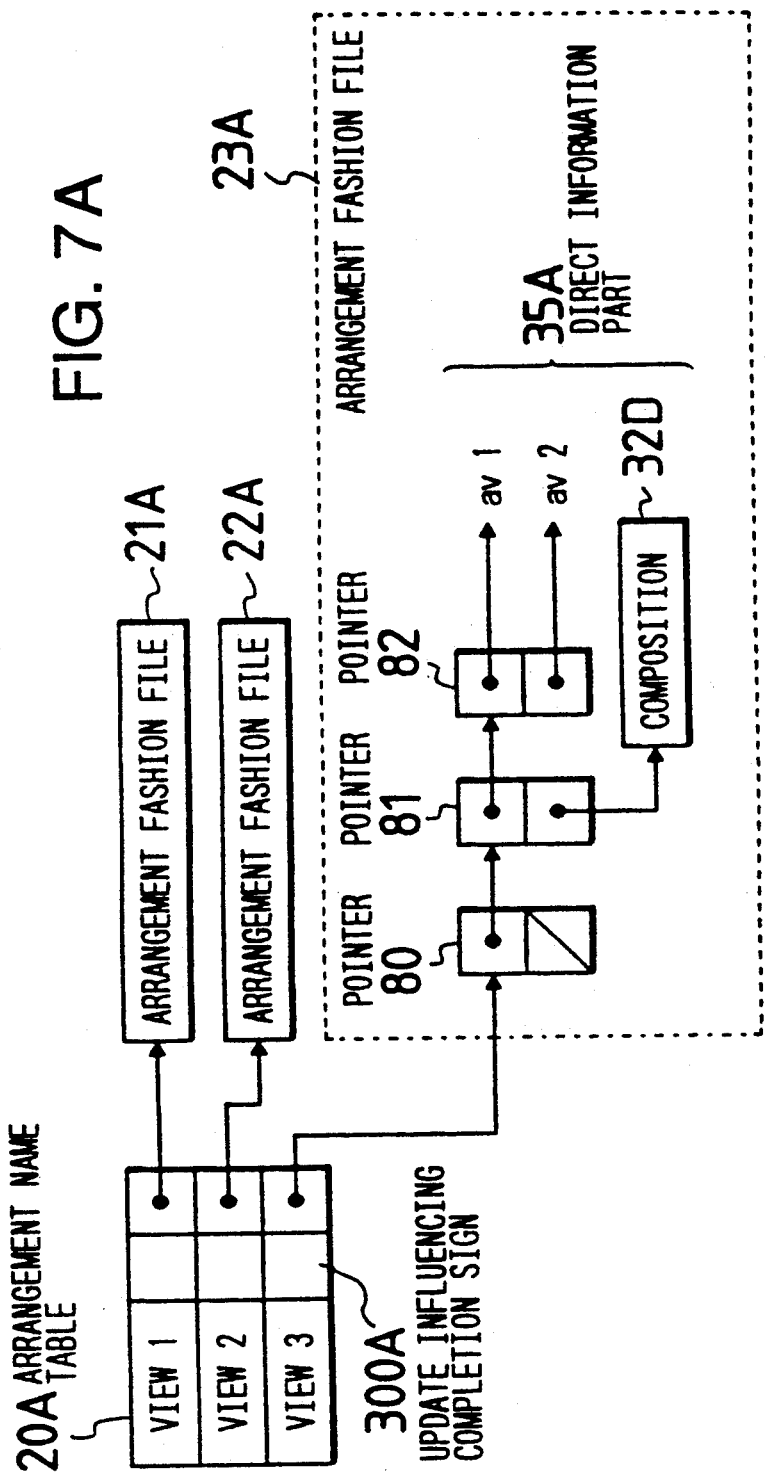
FIGS. 7a-7b are diagrams each showing that status of the arrangement fashion storing area (17A) in a document file (15A) which is different from the status in FIGS. 1A and 1B.

By the way, although FIGS. 9A1 and 9A2 has illustrated the case of generating the individual arrangements and the individual sub arrangements from the beginning, a new arrangement may well be registered as the composition of two or more existing arrangements as illustrated in the form of the arrangement fashion storing area 17A of the Document A in FIG. 7a. Referring to the figure, the first element "View 1" and second element "View 2" are registered in an arrangement name table 20A, and they appoint respective arrangement fashion files 21A and 22A. The third element "View 3" is further registered in the table 20A, and it appoints an arrangement fashion file 23A. In the arrangement fashion file 23A, a composition instruction part 32D storing to the effect of the "composition of arrangements" is pointed through pointers 80 and 81, and information items on the arrangements to be composed are pointed through a pointer 82. Symbols "av1" and "av2" in the figure denote addresses which express the locations of the arrangement fashion files 21A and 22A appointed by the arrangement names "View 1" and "View 2" already registered in the table 20A, respectively. Incidentally, meta-information items in the case of composing the arrangements are expressed by meta-information items on the respective arrangement to-be-composed. Therefore, only a direct information part 35A is pointed from the pointer 80, and a meta-information part is NILL.

Figure 7B:
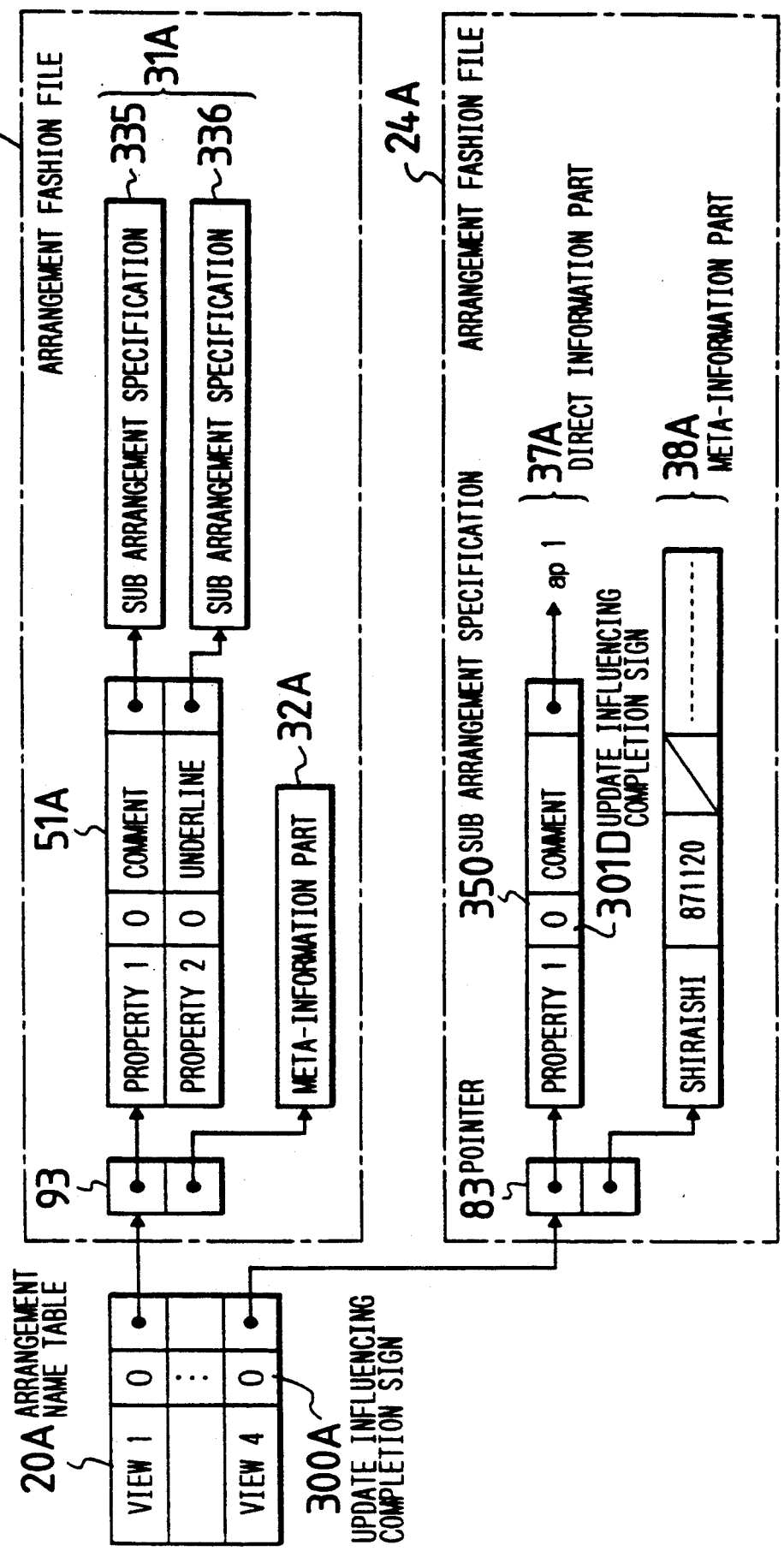

Moreover, as illustrated in FIG. 7b, a new sub arrangement can be registered as being identical to an existing sub arrangement. In the figure, the fourth element of a table 20A appoints a direct information part 37A and a meta-information part 38A through a pointer 83, and a sub arrangement specification 350 appoints an address "ap1" which expresses the location of a sub arrangement specification 335 in an arrangement fashion file 21A appointed by an arrangement name "View 1" already registered in the table 20A. A meta-information part 32A stores meta-information on the sub arrangement specification 335. By the way, symbol 301D denotes an update influencing completion sign.

As an example of application of the present invention, it is mentioned that a basic program is stored as an original document and that parts to be revised and described for a specified purpose such as performance evaluation are managed in the form of various arrangements. According to this example, in case of the version-up of the basic program, the updates thereof may be influenced on the respective arrangements by the method described before, and it is dispensed with that the user updates individual programs associated with the basic program, in succession as in the prior art. Therefore, the application produces the effect that the updates of the basic program can be readily coped with.

What is claimed is:

1. A text document managing method adapted for generating plural text documents derived from an original text document executed by a computer system which includes a display and a character input apparatus comprising the steps of:
   (a) storing the original text document within the computer system, with characters included in the original text document being stored as representative character codes;
   (b) displaying the original text document on the display of the computer system in terms of the characters, in response to a request by a user;
   (c) responsive to the user's inputting of one arrangement information through the character input apparatus of the computer system, arranging the original document to generate one derived document obtained as a result of the arranging of the original text document by the one arrangement information;
   (d) storing the inputted one arrangement information in connection with the original document within the computer system;
   (e) repeating the steps (b) to (d) at least one time so that another derived document is generated in response to another arrangement information inputted by the user, whereby a plurality of arrangement information for a plurality of derived documents generated from the original document are stored in connection with the original document;
   (f) displaying a list of the plurality of arrangement information stored for the original document as an aid for the user's selection of at least one of the plurality of arrangement information;
   (g) re-generating one of the plurality of derived documents from both the original document and one selected derived-document information selected by a user; and,
   (h) generating a further derived document which is a composition of plural ones of the plurality of derived documents already generated from the original text document by combining plural ones of the plurality of stored arrangement information, in response to the user's selection of the plural ones of the plurality of stored arrangement information, at said step (e).

2. The text document managing method according to claim 1, further comprising the step of storing the combined plural ones of the plurality of stored arrangement information as further arrangement information in connection with the original text document.

3. A documents text document managing method adapted for generating plural text documents derived from an original text document executed by a computer system which includes a display and a character input apparatus comprising the steps of:
   (a) storing the original text document within the computer system, with characters included in the original text document being stored as representative character codes;
   (b) displaying the original text document on the display of the computer system in terms of the characters, in response to a request by a user;
   (c) responsive to the user's inputting of one arrangement information through the character input apparatus of the computer system, arranging the original document to generate one derived document obtained as a result of the arranging of the original text document by the one arrangement information;
   (d) storing the inputted one arrangement information in connection with the original document within the computer system;
   (e) repeating the steps (b) to (d) at least one time so that another derived document is generated in response to another arrangement information inputted by the user, whereby a plurality of arrangement information for a plurality of derived documents generated from the original document are stored in connection with the original document;
   (f) displaying a list of the plurality of arrangement information stored for the original document as an aid for the user's selection of at least one of the plurality of arrangement information;
   (g) re-generating one of the plurality of derived documents from both the original document and one selected derived-document information selected by a user;
   (h) storing, at the step (d) user information together with the one arrangement information, the user information serving to identify a user who can avail the one arrangement information; and,
   (i) discriminating, at said step (f), whether or not the user having selected the one arrangement information can avail the selected one arrangement information, on the basis of the user information which has already been stored together with the one selected arrangement information.

4. A documents text document managing method adapted for generating plural text documents derived from an original text document executed by a computer system which includes a display and a character input apparatus comprising the steps of:
   (a) storing the original text document within the computer system, with characters included in the original text document being stored as representative character codes;
   (b) displaying the original text document on the display of the computer system in terms of the characters, in response to a request by a user;
   (c) responsive to the user's inputting of one arrangement information through the character input apparatus of the computer system, arranging the original document to generate one derived document obtained as a result of the arranging of the original text document by the one arrangement information;
   (d) storing the inputted one arrangement information in connection with the original document within the computer system;

(e) repeating the steps (b) to (d) at least one time so that another derived document is generated in response to another arrangement information inputted by the user, whereby a plurality of arrangement information for a plurality of derived documents generated from the original document are stored in connection with the original document;

(f) displaying a list of the plurality of arrangement information stored for the original document as an aid for the user's selection of at least one of the plurality of arrangement information;

(g) re-generating one of the plurality of derived documents from both the original document and one selected arrangement information selected by a user; and, (h) responsive to a user's inputting of a location of a part to be cited within the original text document and a document identifier assigned to another original text document, as part of information to make the another original text document, and during the user's inputting of information to make the another original text document, storing the inputted location and the inputted document identifier, as further another arrangement information in connection with the original text document within the computer system.

5. A documents text document managing method executed by a computer system which includes a display and a character input apparatus, comprising the steps of:

(a) storing at least one original document within the computer system, with characters included in the original document being stored as character codes;

(b) storing a plurality of derived-document information in connection with the original document within the computer system, each derived-document information being one required to generate one of a plurality of derived documents by arrangement of the original document in accordance with the derived document information; and (c) responsive to a user's subsequent updating of the original document, detecting a part within the plurality of stored derived-document information to be updated so as to reflect the subsequent updating of the original document, on a basis of a knowledge database prepared within the computer system for the detecting, and then updating the detected part.

6. The documents managing method according to claim 5, further comprising the steps of:

(d) notifying a user of the part within the plurality of stored derived-document information, in case the step (c) has found that it cannot be decided whether or not the part should be updated; and (e) updating the part in response to update information subsequently inputted by the user.

7. A text document managing method executed by a computer system which includes a display and a character input apparatus, comprising the steps of:

(a) storing at least one original document within the computer system, with characters included in the original document being stored as character codes;

(b) displaying the original document on the display of the computer system as the characters, in response to a request by a user;

(c) the user inputting one arrangement information through the character input apparatus of the computer system, for arranging the original document and generating one derived document as a result of the arranging;

(d) storing the one arrangement information in connection with the original document within the computer system;

(e) repeating the steps (b) to (d) at least one time so that another derived document is generated in response to another arrangement information inputted by a user, whereby a plurality of arrangement information for a plurality of derived documents generated from the original document are stored in connection with the original document;

(f) displaying a list of the plurality of arrangement information stored for the original document as an aid for user's selection of at least one of the plurality of arrangement information;

(g) generating further another arrangement information which is a composition of at least two of the plurality of arrangement information, in response to a user's selection of said at least two arrangement information at said step (f); and (h) re-generating one of the plurality of derived documents from both the original document and one of the arrangement information in response to a user's selection of said one arrangement information at said step (f), and generating further another derived document from both the original document and the further another arrangement information generated at said step (g) in response to the user's selection of said at least two of arrangement information at said step (g).

8. The documents managing method according to claim 7, wherein:

said step (c) includes the step of the user's inputting a plurality of combined information as said one arrangement information, each combined information comprising location of a part within the original document, a kind of arrangement to be executed to that part and contents of the arrangement;

said step (d) includes the steps of classifying the plurality of combined information into groups to each of which part of the plurality of combined information which have a same kind of arrangement, and then storing the respective groups as a plurality of partial arrangement information for the arrangement information stored at the step (d) in connection with the original document; and said step (f) includes the step of further displaying, in response to user's initial selection of one of the arrangement information stored in connection with the original program, a list of the plurality of partial arrangement information stored for the selected one arrangement information, for subsequent selection by the user.

9. The documents managing method according to claim 7, further comprising the step of storing the arrangement information generated at said step (g), as new arrangement information in connection with the original document.

10. The documents managing method according to claim 7, wherein:

said step (d) includes the steps of the user inputting information for identifying a user who can avail the arrangement information, and then storing the user identifying information as part of the arrangement information; and said step (f) includes the step of detecting whether or not a user can utilize the one selected arrangement information, on the basis of the user identifying information contained in the selected arrangement information.

11. The documents managing method according to claim 7, wherein said step (b) includes the step of:
responsive to a user's inputting of a location of a part to be cited within the original document and a document identifier assigned to another original document, as part of information to make the another original document, during the user's inputting of information to make the another original document, storing the inputted location and the inputted document identifier as further another arrangement information in connection with the original document.

12. A text document managing method executed by a computer system which includes a display and a character input apparatus, comprising the steps of:
(a) storing at least one original document within the computer system, with characters included in the original document are stored as character codes;
(b) storing at least one derived-document information for generating at least one derived document in connection with the original document within the computer system, the derived-document information being one required to generate the one derived document by arrangement of the original document; and
(c) responsive to a user's subsequent updating of the original document, detecting a part within said at least one stored derived-document information to be updated so as to reflect the subsequent updating of the original document and an updating method of that part, on the basis of predetermined rules prepared within the computer system for the detecting, and then updating the detected part by the detected updating method.

13. The documents managing method according to claim 12, further comprising the steps of:
(d) notifying the user of the part within said at least one derived-document information, in case the step (c) has found that it cannot be decided whether or not the part is to update or what updating is to be applied to the part; and
(e) updating the part in response to update information subsequently inputted by the user.

14. A text document managing method adapted for generating plural text documents derived from an original text document executed by a computer system which includes a display and a character input apparatus comprising the steps of:
(a) storing the original text document within the computer system, with characters included in the original text document being stored as representative character codes;
(b) displaying the original text document on the display of the computer system in terms of the characters, in response to a request by a user;
(c) responsive to the user's inputting of one arrangement information through the character input apparatus of the computer system, arranging the original document to generate one derived document as a result of the arranging of the original text document by the one arrangement information;
(d) storing the inputted one arrangement information in connection with the original document within the computer system;
(e) repeating the steps (b) to (d) at least one time so that another derived document is generated in response to another arrangement information inputted by the user, whereby a plurality of arrangement information for a plurality of derived documents generated from the original document are stored in connection with the original document;
(f) displaying a list of the plurality of arrangement information stored for the original document as an aid for the user's selection of at least one of the plurality of arrangement information; and,
(g) re-generating one of the plurality of derived documents from both the original document and one selected arrangement information selected by a user.

* * * * *

UNITED STATES PATENT AND TRADEMARK OFFICE
CERTIFICATE OF CORRECTION

PATENT NO. : 5,280,574
DATED : January 18, 1994
INVENTOR(S) : Yoko Mizuta, et al.

It is certified that error appears in the above-identified patent and that said Letters Patent is hereby corrected as shown below:

Claim 3, column 36, line 34, delete "derived-document" and substitute therefor --arrangement--.

Claim 5, column 37, line 27, delete "documents".

Claim 12, column 39, line 20, delete "with" and substitute --wherein--.

Signed and Sealed this

Thirty-first Day of May, 1994

Attest:

BRUCE LEHMAN

*Attesting Officer*     *Commissioner of Patents and Trademarks*